(12) United States Patent
Johannes et al.

(10) Patent No.: US 12,539,227 B2
(45) Date of Patent: Feb. 3, 2026

(54) APPARATUS AND METHODS FOR RECEIVING DISCHARGED URINE

(71) Applicant: PureWick Corporation, El Cajon, CA (US)

(72) Inventors: Ashley Marie Johannes, Atlanta, GA (US); Eric Alan Rehm, Lawrenceville, GA (US); Andrew L. Meyer, Atlanta, GA (US); Raymond J. Newton, Bonsall, CA (US); Jason Glithero, McDonough, GA (US)

(73) Assignee: PureWick Corporation, Covington, GA (US)

( * ) Notice: Subject to any disclaimer, the term of this patent is extended or adjusted under 35 U.S.C. 154(b) by 700 days.

(21) Appl. No.: 16/433,773

(22) Filed: Jun. 6, 2019

(65) Prior Publication Data

US 2019/0282391 A1    Sep. 19, 2019

Related U.S. Application Data

(63) Continuation-in-part of application No. PCT/US2018/015968, filed on Jan. 30, 2018.
(Continued)

(51) Int. Cl.
*A61F 5/453* (2006.01)
*A61F 5/44* (2006.01)
(Continued)

(52) U.S. Cl.
CPC ............ *A61F 5/453* (2013.01); *A61F 5/4404* (2013.01); *A61F 5/4405* (2013.01); *A61F 5/443* (2013.01);
(Continued)

(58) Field of Classification Search
CPC ...... A61F 5/453; A61F 5/4401; A61F 5/4408; A61F 5/448; A61F 5/449; A61F 5/455; A61F 13/471; A61F 6/04
See application file for complete search history.

(56) References Cited

U.S. PATENT DOCUMENTS

| 670,602 | A | 3/1901 | Baker |
| 737,443 | A | 8/1903 | Mooers |
| (Continued) | | | |

FOREIGN PATENT DOCUMENTS

| AU | 2018216821 A1 | 8/2019 |
| AU | 2021299304 A1 | 2/2023 |
| (Continued) | | |

OTHER PUBLICATIONS

US 9,908,683 B2, 03/2018, Sandhausen et al. (withdrawn)
(Continued)

*Primary Examiner* — Ariana Zimbouski
*Assistant Examiner* — Alessandro R Del Priore
(74) *Attorney, Agent, or Firm* — Ballard Spahr LLP

(57) ABSTRACT

A system suitable for collecting and transporting urine away from the body of a person or animal may include a urine collecting assembly having a body, a sealing flange, and a reservoir within the body and partially defined by the sealing flange. The sealing flange can define an opening such that the interior of the body is accessible via the opening. A peripheral edge of the opening can be configured to seal around a shaft of a penis of a user disposed through the opening. The urine collecting assembly can also include an outlet in fluidic communication with the reservoir. The urine collecting assembly can be arranged such that a fluid can flow into the body from the urethral opening of the user's penis, collect in the reservoir, and flow out of the outlet.

28 Claims, 27 Drawing Sheets

Related U.S. Application Data

(60) Provisional application No. 62/452,437, filed on Jan. 31, 2017.

(51) Int. Cl.
 *A61F 5/443* (2006.01)
 *A61F 5/445* (2006.01)
 *A61F 13/15* (2006.01)
 *A61M 25/00* (2006.01)

(52) U.S. Cl.
 CPC .............. *A61F 5/445* (2013.01); *A61F 13/15* (2013.01); *A61F 5/4401* (2013.01); *A61F 2013/15146* (2013.01); *A61M 25/0017* (2013.01)

(56) References Cited

U.S. PATENT DOCUMENTS

| | | | |
|---|---|---|---|
| 1,015,905 A | 1/1912 | Northrop | |
| 1,032,841 A | 7/1912 | Koenig | |
| 1,178,644 A | 4/1916 | Johnson | |
| 1,387,726 A | 8/1921 | Karge | |
| 1,742,080 A | 12/1929 | Jones | |
| 1,979,899 A | 11/1934 | Obrien et al. | |
| 2,241,010 A | 5/1941 | Chipley | |
| 2,262,772 A | 11/1941 | Peder | |
| 2,326,881 A | 8/1943 | Packer | |
| 2,379,346 A | 6/1945 | Farrell | |
| 2,485,555 A | 10/1949 | Bester | |
| 2,571,357 A | 10/1951 | Charles | |
| 2,613,670 A | 10/1952 | Edward | |
| 2,616,426 A | 11/1952 | Adele | |
| 2,644,234 A | 7/1953 | Earl | |
| 2,648,335 A | 8/1953 | Chambers | |
| 2,789,560 A * | 4/1957 | Weimer | A61F 5/453 604/349 |
| 2,859,786 A | 11/1958 | Tupper | |
| 2,944,551 A | 7/1960 | Carl | |
| 2,968,046 A | 1/1961 | Duke | |
| 2,971,512 A | 2/1961 | Reinhardt | |
| 3,032,038 A | 5/1962 | Swinn | |
| 3,077,883 A | 2/1963 | Hill | |
| 3,087,938 A | 4/1963 | Hans et al. | |
| 3,114,916 A | 12/1963 | Hadley | |
| 3,169,528 A | 2/1965 | Knox et al. | |
| 3,171,506 A | 3/1965 | Therkel | |
| 3,175,719 A | 3/1965 | Herndon | |
| 3,194,238 A | 7/1965 | Breece | |
| 3,198,994 A | 8/1965 | Hildebrandt et al. | |
| 3,221,742 A | 12/1965 | Egon | |
| 3,312,221 A | 4/1967 | Overment | |
| 3,312,981 A | 4/1967 | Mcguire et al. | |
| 3,349,768 A | 10/1967 | Keane | |
| 3,362,590 A | 1/1968 | Gene | |
| 3,366,116 A | 1/1968 | Huck | |
| 3,398,848 A | 8/1968 | Donovan | |
| 3,400,717 A | 9/1968 | Bruce et al. | |
| 3,406,688 A | 10/1968 | Bruce | |
| 3,424,163 A | 1/1969 | Gravdahl | |
| 3,425,471 A | 2/1969 | Yates | |
| 3,434,565 A | 3/1969 | Fischer | |
| 3,511,241 A | 5/1970 | Lee | |
| 3,512,185 A | 5/1970 | Ellis | |
| 3,520,300 A | 7/1970 | Flower | |
| 3,528,423 A | 9/1970 | Lee | |
| 3,608,552 A | 9/1971 | Broerman | |
| 3,613,123 A | 10/1971 | Langstrom | |
| 3,648,700 A * | 3/1972 | Warner | A61F 6/04 D24/105 |
| 3,651,810 A | 3/1972 | Ormerod | |
| 3,661,155 A | 5/1972 | Lindan | |
| 3,683,918 A | 8/1972 | Pizzella | |
| 3,699,815 A | 10/1972 | Holbrook | |
| 3,726,277 A | 4/1973 | Hirschman | |
| 3,742,952 A | 7/1973 | Magers et al. | |
| 3,742,953 A * | 7/1973 | Lee | A61F 5/453 604/352 |
| 3,757,355 A | 9/1973 | Allen et al. | |
| 3,788,324 A | 1/1974 | Lim | |
| 3,843,016 A | 10/1974 | Bornhorst et al. | |
| 3,863,638 A | 2/1975 | Rogers et al. | |
| 3,863,798 A | 2/1975 | Kurihara et al. | |
| 3,864,759 A | 2/1975 | Horiuchi | |
| 3,865,109 A | 2/1975 | Elmore et al. | |
| 3,881,486 A | 5/1975 | Fenton | |
| 3,881,489 A | 5/1975 | Hartwell | |
| 3,915,189 A | 10/1975 | Holbrook et al. | |
| 3,931,650 A | 1/1976 | Miller | |
| 3,998,228 A | 12/1976 | Poidomani | |
| 3,999,550 A * | 12/1976 | Martin | A61F 5/453 604/353 |
| 4,006,793 A | 2/1977 | Robinson | |
| 4,015,604 A | 4/1977 | Csillag | |
| 4,020,843 A | 5/1977 | Kanall | |
| 4,022,213 A * | 5/1977 | Stein | A61F 5/453 604/350 |
| 4,027,776 A | 6/1977 | Douglas | |
| 4,031,897 A | 6/1977 | Graetz | |
| 4,064,962 A | 12/1977 | Hunt | |
| 4,069,817 A | 1/1978 | Fenole et al. | |
| 4,084,589 A | 4/1978 | Kulvi | |
| 4,096,897 A | 6/1978 | Cammarata | |
| 4,116,197 A | 9/1978 | Bermingham | |
| 4,180,178 A | 12/1979 | Turner | |
| 4,187,953 A | 2/1980 | Turner | |
| 4,194,508 A | 3/1980 | Anderson | |
| 4,200,102 A | 4/1980 | Duhamel et al. | |
| 4,202,058 A | 5/1980 | Anderson | |
| 4,203,503 A | 5/1980 | Bertotti et al. | |
| 4,209,076 A | 6/1980 | Bertotti et al. | |
| 4,223,677 A | 9/1980 | Anderson | |
| 4,233,025 A | 11/1980 | Larson et al. | |
| 4,233,978 A | 11/1980 | Hickey | |
| 4,246,901 A | 1/1981 | Frosch et al. | |
| 4,253,542 A | 3/1981 | Ruspa et al. | |
| 4,257,418 A | 3/1981 | Hessner | |
| 4,270,539 A | 6/1981 | Frosch et al. | |
| 4,280,498 A | 7/1981 | Jensen | |
| 4,281,655 A | 8/1981 | Terauchi | |
| 4,292,916 A | 10/1981 | Bradley et al. | |
| 4,330,239 A | 5/1982 | Gannaway | |
| 4,345,341 A | 8/1982 | Saito | |
| 4,349,029 A | 9/1982 | Mott | |
| 4,352,356 A | 10/1982 | Tong | |
| 4,360,933 A | 11/1982 | Kimura et al. | |
| 4,365,363 A | 12/1982 | Windauer | |
| 4,375,841 A | 3/1983 | Vielbig | |
| 4,387,726 A | 6/1983 | Denard | |
| 4,403,991 A | 9/1983 | Hill | |
| 4,421,511 A | 12/1983 | Steer et al. | |
| 4,425,130 A | 1/1984 | Desmarais | |
| 4,446,986 A | 5/1984 | Bowen et al. | |
| 4,453,938 A | 6/1984 | Brendling | |
| 4,457,314 A | 7/1984 | Knowles | |
| 4,476,879 A | 10/1984 | Jackson | |
| 4,526,688 A | 7/1985 | Schmidt et al. | |
| 4,528,703 A | 7/1985 | Kraus | |
| 4,533,354 A | 8/1985 | Jensen et al. | |
| 4,533,357 A | 8/1985 | Hall | |
| D280,438 S | 9/1985 | Wendt | |
| 4,551,141 A | 11/1985 | McNeil | |
| 4,553,968 A | 11/1985 | Komis | |
| 4,568,341 A | 2/1986 | Mitchell et al. | |
| 4,581,026 A | 4/1986 | Schneider | |
| 4,583,983 A | 4/1986 | Einhorn et al. | |
| 4,589,516 A | 5/1986 | Inoue et al. | |
| 4,601,716 A | 7/1986 | Smith | |
| 4,610,675 A | 9/1986 | Triunfol | |
| 4,620,333 A | 11/1986 | Ritter | |
| 4,626,250 A | 12/1986 | Schneider | |
| 4,627,846 A | 12/1986 | Ternstroem | |
| 4,631,061 A | 12/1986 | Martin | |
| 4,650,477 A | 3/1987 | Johnson | |

(56) References Cited

U.S. PATENT DOCUMENTS

| | | | |
|---|---|---|---|
| 4,655,754 A | 4/1987 | Richmond et al. | |
| 4,656,675 A * | 4/1987 | Fajnsztajn | A61F 5/453 |
| | | | 600/580 |
| 4,681,570 A | 7/1987 | Dalton | |
| 4,681,572 A | 7/1987 | Tokarz et al. | |
| 4,681,577 A | 7/1987 | Stern et al. | |
| 4,692,160 A | 9/1987 | Nussbaumer | |
| 4,707,864 A | 11/1987 | Ikematsu et al. | |
| 4,713,065 A | 12/1987 | Koot | |
| 4,713,066 A | 12/1987 | Komis | |
| 4,723,953 A | 2/1988 | Pratt et al. | |
| 4,735,841 A | 4/1988 | Sourdet | |
| 4,743,236 A | 5/1988 | Manschot | |
| 4,747,166 A | 5/1988 | Kuntz | |
| 4,752,944 A | 6/1988 | Conrads et al. | |
| 4,759,753 A * | 7/1988 | Schneider | A61F 5/453 |
| | | | 604/352 |
| 4,769,215 A | 9/1988 | Ehrenkranz | |
| 4,771,484 A | 9/1988 | Mozell | |
| 4,772,280 A | 9/1988 | Rooyakkers | |
| 4,784,654 A | 11/1988 | Beecher | |
| 4,790,830 A * | 12/1988 | Hamacher | A61M 5/32 |
| | | | 604/274 |
| 4,790,835 A | 12/1988 | Elias | |
| 4,791,686 A | 12/1988 | Taniguchi et al. | |
| 4,795,449 A | 1/1989 | Schneider et al. | |
| 4,798,603 A | 1/1989 | Meyer et al. | |
| 4,799,928 A | 1/1989 | Crowley | |
| 4,804,377 A | 2/1989 | Hanifl et al. | |
| 4,812,053 A | 3/1989 | Bhattacharjee | |
| 4,813,943 A | 3/1989 | Smith | |
| 4,820,291 A | 4/1989 | Terauchi et al. | |
| 4,820,297 A | 4/1989 | Kaufman et al. | |
| 4,841,728 A | 6/1989 | Jean et al. | |
| 4,846,818 A | 7/1989 | Keldahl et al. | |
| 4,846,819 A | 7/1989 | Welch | |
| 4,846,824 A | 7/1989 | Schultz et al. | |
| 4,846,909 A | 7/1989 | Klug et al. | |
| 4,865,595 A | 9/1989 | Heyden | |
| 4,880,417 A | 11/1989 | Yabrov et al. | |
| 4,882,794 A | 11/1989 | Stewart | |
| 4,883,465 A | 11/1989 | Brennan | |
| 4,886,498 A | 12/1989 | Newton | |
| 4,886,508 A | 12/1989 | Washington | |
| 4,886,509 A | 12/1989 | Mattsson | |
| 4,889,532 A | 12/1989 | Metz et al. | |
| 4,889,533 A | 12/1989 | Beecher | |
| 4,890,691 A | 1/1990 | Ching-Ho | |
| 4,895,140 A | 1/1990 | Bellak | |
| 4,903,254 A | 2/1990 | Haas | |
| 4,904,248 A | 2/1990 | Vaillancourt | |
| 4,905,692 A | 3/1990 | More | |
| 4,911,262 A | 3/1990 | Tani et al. | |
| 4,930,997 A | 6/1990 | Bennett | |
| 4,936,838 A | 6/1990 | Cross et al. | |
| 4,950,262 A | 8/1990 | Takagi | |
| 4,955,922 A | 9/1990 | Terauchi | |
| 4,957,487 A | 9/1990 | Gerow | |
| 4,965,460 A | 10/1990 | Tanaka et al. | |
| 4,986,823 A | 1/1991 | Anderson et al. | |
| 4,987,849 A | 1/1991 | Sherman | |
| 5,002,541 A * | 3/1991 | Conkling | A61F 5/44 |
| | | | 604/324 |
| 5,004,463 A | 4/1991 | Nigay | |
| 5,013,308 A | 5/1991 | Sullivan et al. | |
| 5,031,248 A | 7/1991 | Kemper | |
| 5,045,077 A | 9/1991 | Blake | |
| 5,045,283 A | 9/1991 | Patel | |
| 5,049,144 A | 9/1991 | Payton | |
| 5,053,339 A | 10/1991 | Patel | |
| 5,057,092 A | 10/1991 | Webster | |
| 5,058,088 A | 10/1991 | Haas et al. | |
| 5,071,347 A | 12/1991 | Mcguire | |
| 5,078,707 A | 1/1992 | Peter | |
| 5,084,037 A | 1/1992 | Barnett | |
| 5,100,396 A | 3/1992 | Zamierowski | |
| 5,102,404 A | 4/1992 | Goldberg et al. | |
| 5,112,324 A | 5/1992 | Wallace | |
| 5,137,033 A | 8/1992 | Norton | |
| 5,147,301 A | 9/1992 | Ruvio | |
| 5,176,667 A | 1/1993 | Debring | |
| 5,195,997 A | 3/1993 | Carns | |
| 5,196,654 A | 3/1993 | Diflora et al. | |
| 5,199,444 A | 4/1993 | Wheeler | |
| 5,203,699 A | 4/1993 | Mcguire | |
| 5,244,458 A | 9/1993 | Takasu | |
| 5,246,454 A | 9/1993 | Peterson | |
| 5,267,988 A | 12/1993 | Farkas | |
| 5,275,307 A | 1/1994 | Freese | |
| 5,282,795 A | 2/1994 | Finney | |
| 5,294,983 A | 3/1994 | Ersoz et al. | |
| 5,295,979 A | 3/1994 | Delaurentis et al. | |
| 5,295,983 A | 3/1994 | Kubo | |
| 5,300,052 A | 4/1994 | Kubo | |
| 5,304,749 A | 4/1994 | Crandell | |
| 5,312,383 A | 5/1994 | Kubalak | |
| 5,318,550 A | 6/1994 | Cermak et al. | |
| 5,330,457 A | 7/1994 | Cohen | |
| 5,330,459 A | 7/1994 | Lavon et al. | |
| 5,334,174 A | 8/1994 | Street | |
| 5,340,840 A | 8/1994 | Park et al. | |
| 5,382,244 A | 1/1995 | Telang | |
| 5,397,315 A | 3/1995 | Schmidt et al. | |
| 5,409,014 A | 4/1995 | Napoli et al. | |
| 5,409,475 A | 4/1995 | Steer | |
| 5,411,495 A | 5/1995 | Willingham | |
| 5,423,784 A | 6/1995 | Metz | |
| 5,423,788 A | 6/1995 | Rollins et al. | |
| 5,437,836 A | 8/1995 | Yamada | |
| 5,456,246 A | 10/1995 | Schmieding et al. | |
| 5,466,229 A | 11/1995 | Elson et al. | |
| 5,478,334 A | 12/1995 | Bernstein | |
| 5,499,977 A | 3/1996 | Marx | |
| 5,543,042 A | 8/1996 | Filan et al. | |
| D373,928 S | 9/1996 | Green | |
| 5,582,604 A | 12/1996 | Ahr et al. | |
| 5,592,950 A | 1/1997 | Kopelowicz | |
| 5,593,389 A | 1/1997 | Chang | |
| 5,605,161 A | 2/1997 | Cross | |
| 5,614,699 A | 3/1997 | Yashiro et al. | |
| 5,618,277 A | 4/1997 | Goulter | |
| 5,628,735 A | 5/1997 | Skow | |
| 5,632,736 A | 5/1997 | Block | |
| 5,636,643 A | 6/1997 | Argenta et al. | |
| 5,637,104 A | 6/1997 | Ball et al. | |
| 5,662,633 A | 9/1997 | Doak et al. | |
| 5,674,212 A | 10/1997 | Osborn et al. | |
| 5,678,564 A | 10/1997 | Lawrence et al. | |
| 5,678,654 A | 10/1997 | Uzawa | |
| 5,681,297 A | 10/1997 | Hashimoto et al. | |
| 5,687,429 A | 11/1997 | Rahlff | |
| 5,695,485 A | 12/1997 | Duperret et al. | |
| 5,700,254 A | 12/1997 | Mcdowall et al. | |
| 5,701,612 A | 12/1997 | Daneshvar | |
| 5,705,777 A | 1/1998 | Flanigan et al. | |
| 5,735,835 A | 4/1998 | Holland | |
| 5,752,944 A | 5/1998 | Dann et al. | |
| 5,763,333 A | 6/1998 | Suzuki et al. | |
| 5,772,644 A | 6/1998 | Bark et al. | |
| 5,792,132 A | 8/1998 | Garcia | |
| 5,827,243 A | 10/1998 | Palestrant | |
| 5,827,247 A | 10/1998 | Kay | |
| 5,827,250 A | 10/1998 | Fujioka et al. | |
| 5,827,257 A | 10/1998 | Fujioka et al. | |
| D401,699 S | 11/1998 | Herchenbach et al. | |
| 5,859,393 A | 1/1999 | Cummins et al. | |
| 5,865,378 A | 2/1999 | Hollinshead et al. | |
| 5,873,869 A | 2/1999 | Hammons et al. | |
| 5,876,393 A | 3/1999 | Ahr et al. | |
| 5,887,291 A | 3/1999 | Bellizzi | |
| 5,891,125 A | 4/1999 | Plumley | |
| 5,894,608 A | 4/1999 | Birbara | |
| 5,895,349 A | 4/1999 | Tihon | |
| D409,303 S | 5/1999 | Oepping | |

(56) References Cited

U.S. PATENT DOCUMENTS

| | | | |
|---|---|---|---|
| 5,911,222 A | 6/1999 | Lawrence et al. | |
| 5,956,782 A | 9/1999 | Olguin | |
| 5,957,904 A | 9/1999 | Holland | |
| 5,968,026 A | 10/1999 | Osborn et al. | |
| 5,972,505 A | 10/1999 | Phillips et al. | |
| 6,007,526 A | 12/1999 | Passalaqua et al. | |
| 6,039,060 A | 3/2000 | Rower | |
| 6,050,983 A | 4/2000 | Moore et al. | |
| 6,059,762 A | 5/2000 | Boyer et al. | |
| 6,063,064 A | 5/2000 | Tuckey et al. | |
| 6,098,625 A | 8/2000 | Winkler | |
| 6,105,174 A | 8/2000 | Karlsten et al. | |
| 6,113,582 A * | 9/2000 | Dwork | A61F 5/453 604/351 |
| 6,117,163 A | 9/2000 | Bierman | |
| 6,123,398 A | 9/2000 | Arai et al. | |
| 6,129,718 A | 10/2000 | Wada et al. | |
| 6,131,964 A | 10/2000 | Sareshwala | |
| 6,152,902 A | 11/2000 | Christian et al. | |
| 6,164,569 A | 12/2000 | Hollinshead et al. | |
| 6,177,606 B1 | 1/2001 | Etheredge et al. | |
| 6,209,142 B1 | 4/2001 | Mattsson et al. | |
| 6,220,050 B1 | 4/2001 | Cooksey | |
| 6,244,311 B1 | 6/2001 | Hand et al. | |
| 6,248,096 B1 | 6/2001 | Dwork et al. | |
| 6,263,887 B1 | 7/2001 | Dunn | |
| 6,283,246 B1 | 9/2001 | Nishikawa | |
| 6,296,627 B1 | 10/2001 | Edwards | |
| 6,311,339 B1 | 11/2001 | Kraus | |
| 6,316,688 B1 | 11/2001 | Hammons et al. | |
| 6,336,919 B1 | 1/2002 | Davis et al. | |
| 6,338,729 B1 | 1/2002 | Wada et al. | |
| 6,352,525 B1 | 3/2002 | Wakabayashi | |
| 6,394,988 B1 | 5/2002 | Hashimoto | |
| 6,395,956 B1 | 5/2002 | Glasgow et al. | |
| 6,398,742 B1 | 6/2002 | Kim | |
| 6,406,463 B1 | 6/2002 | Brown | |
| 6,409,712 B1 | 6/2002 | Dutari et al. | |
| 6,415,888 B2 | 7/2002 | An et al. | |
| 6,416,500 B1 | 7/2002 | Wada et al. | |
| 6,423,045 B1 | 7/2002 | Wise et al. | |
| 6,428,521 B1 | 8/2002 | Droll | |
| 6,428,522 B1 | 8/2002 | Dipalma et al. | |
| 6,446,454 B1 | 9/2002 | Lee et al. | |
| 6,461,340 B1 | 10/2002 | Lenker et al. | |
| 6,467,570 B1 | 10/2002 | Herold | |
| 6,475,198 B1 | 11/2002 | Lipman et al. | |
| 6,479,726 B1 | 11/2002 | Cole et al. | |
| 6,491,673 B1 | 12/2002 | Palumbo et al. | |
| 6,508,794 B1 | 1/2003 | Palumbo et al. | |
| 6,524,292 B1 | 2/2003 | Dipalma et al. | |
| 6,540,729 B1 | 4/2003 | Wada et al. | |
| 6,547,771 B2 | 4/2003 | Robertson et al. | |
| 6,551,293 B1 | 4/2003 | Mitchell | |
| 6,569,133 B2 | 5/2003 | Cheng et al. | |
| D476,518 S | 7/2003 | Doppelt | |
| 6,592,560 B2 | 7/2003 | Snyder et al. | |
| 6,610,038 B1 | 8/2003 | Dipalma et al. | |
| 6,618,868 B2 | 9/2003 | Minnick | |
| 6,620,142 B1 | 9/2003 | Flueckiger | |
| 6,629,651 B1 | 10/2003 | Male et al. | |
| 6,635,037 B1 | 10/2003 | Bennett | |
| 6,635,038 B2 | 10/2003 | Scovel | |
| 6,652,495 B1 | 11/2003 | Walker | |
| 6,666,850 B1 | 12/2003 | Ahr et al. | |
| 6,685,684 B1 | 2/2004 | Falconer | |
| 6,695,828 B1 | 2/2004 | Dipalma et al. | |
| 6,699,174 B1 | 3/2004 | Bennett | |
| 6,700,034 B1 | 3/2004 | Lindsay et al. | |
| 6,702,793 B1 | 3/2004 | Sweetser et al. | |
| 6,706,027 B2 | 3/2004 | Harvie et al. | |
| 6,732,384 B2 | 5/2004 | Scott | |
| 6,736,977 B1 | 5/2004 | Hall et al. | |
| 6,740,066 B2 | 5/2004 | Wolff et al. | |
| 6,764,477 B1 | 7/2004 | Chen et al. | |
| 6,783,519 B2 | 8/2004 | Samuelsson | |
| 6,796,974 B2 | 9/2004 | Palumbo et al. | |
| 6,814,547 B2 | 11/2004 | Childers et al. | |
| 6,849,065 B2 | 2/2005 | Schmidt et al. | |
| 6,857,137 B2 | 2/2005 | Otto | |
| 6,885,690 B2 | 4/2005 | Aggerstam et al. | |
| 6,888,044 B2 | 5/2005 | Fell et al. | |
| 6,893,425 B2 | 5/2005 | Dunn et al. | |
| 6,912,737 B2 | 7/2005 | Ernest et al. | |
| 6,918,899 B2 | 7/2005 | Harvie | |
| 6,979,324 B2 | 12/2005 | Bybordi et al. | |
| 7,018,366 B2 | 3/2006 | Easter | |
| 7,066,411 B2 | 6/2006 | Male et al. | |
| 7,122,023 B1 | 10/2006 | Hinoki | |
| 7,125,399 B2 | 10/2006 | Miskie | |
| 7,131,964 B2 | 11/2006 | Harvie | |
| 7,135,012 B2 | 11/2006 | Harvie | |
| 7,141,043 B2 | 11/2006 | Harvie | |
| D533,972 S | 12/2006 | La | |
| 7,160,273 B2 | 1/2007 | Greter et al. | |
| 7,166,092 B2 | 1/2007 | Elson et al. | |
| 7,171,699 B2 | 2/2007 | Ernest et al. | |
| 7,171,871 B2 | 2/2007 | Kozak | |
| 7,179,951 B2 | 2/2007 | Krishnaswamy-mirle et al. | |
| 7,181,781 B1 | 2/2007 | Trabold et al. | |
| 7,186,245 B1 | 3/2007 | Cheng et al. | |
| 7,192,424 B2 | 3/2007 | Cooper | |
| 7,219,764 B1 | 5/2007 | Forbes | |
| 7,220,250 B2 | 5/2007 | Suzuki et al. | |
| D562,975 S | 2/2008 | Otto | |
| 7,335,189 B2 | 2/2008 | Harvie | |
| 7,358,282 B2 | 4/2008 | Krueger et al. | |
| 7,390,320 B2 | 6/2008 | Machida et al. | |
| 7,438,706 B2 | 10/2008 | Koizumi et al. | |
| 7,488,310 B2 | 2/2009 | Yang | |
| 7,491,194 B1 | 2/2009 | Oliwa | |
| D591,106 S | 4/2009 | Dominique et al. | |
| 7,513,381 B2 | 4/2009 | Heng et al. | |
| 7,520,872 B2 | 4/2009 | Biggie et al. | |
| D593,801 S | 6/2009 | Wilson et al. | |
| 7,540,364 B2 | 6/2009 | Sanderson | |
| 7,549,511 B2 | 6/2009 | Marocco | |
| 7,549,512 B2 | 6/2009 | Newberry | |
| 7,585,293 B2 | 9/2009 | Vermaak | |
| 7,588,560 B1 | 9/2009 | Dunlop | |
| 7,637,905 B2 | 12/2009 | Saadat et al. | |
| 7,658,730 B2 | 2/2010 | Conley | |
| 7,665,359 B2 | 2/2010 | Barber | |
| 7,682,347 B2 | 3/2010 | Parks et al. | |
| 7,687,004 B2 | 3/2010 | Allen | |
| 7,695,459 B2 | 4/2010 | Gilbert et al. | |
| 7,695,460 B2 | 4/2010 | Wada et al. | |
| 7,699,818 B2 | 4/2010 | Gilbert | |
| 7,699,831 B2 | 4/2010 | Bengtson et al. | |
| 7,722,584 B2 | 5/2010 | Tanaka et al. | |
| 7,727,206 B2 | 6/2010 | Gorres | |
| 7,740,620 B2 | 6/2010 | Gilbert et al. | |
| 7,749,205 B2 | 7/2010 | Tazoe et al. | |
| 7,755,497 B2 | 7/2010 | Wada et al. | |
| 7,766,887 B2 | 8/2010 | Burns et al. | |
| 7,803,144 B1 * | 9/2010 | Vollrath | A61F 5/453 604/351 |
| D625,407 S | 10/2010 | Koizumi et al. | |
| 7,806,879 B2 | 10/2010 | Brooks et al. | |
| 7,811,272 B2 | 10/2010 | Lindsay et al. | |
| 7,815,067 B2 | 10/2010 | Matsumoto et al. | |
| 7,833,169 B2 | 11/2010 | Hannon | |
| 7,857,806 B2 | 12/2010 | Karpowicz et al. | |
| 7,866,942 B2 | 1/2011 | Harvie | |
| 7,871,385 B2 | 1/2011 | Levinson et al. | |
| 7,875,010 B2 | 1/2011 | Frazier et al. | |
| 7,901,389 B2 | 3/2011 | Mombrinie | |
| 7,927,320 B2 | 4/2011 | Goldwasser et al. | |
| 7,927,321 B2 | 4/2011 | Marland | |
| 7,931,634 B2 | 4/2011 | Swiecicki et al. | |
| 7,939,706 B2 | 5/2011 | Okabe et al. | |
| 7,946,443 B2 | 5/2011 | Stull et al. | |
| 7,947,025 B2 | 5/2011 | Buglino et al. | |
| 7,963,419 B2 | 6/2011 | Burney et al. | |

(56) References Cited

U.S. PATENT DOCUMENTS

| | | |
|---|---|---|
| 7,976,519 B2 | 7/2011 | Bubb et al. |
| 7,993,318 B2 | 8/2011 | Olsson et al. |
| 8,015,627 B2 | 9/2011 | Baker et al. |
| 8,016,071 B1 | 9/2011 | Martinus et al. |
| 8,028,460 B2 | 10/2011 | Williams |
| 8,047,398 B2 | 11/2011 | Dimartino et al. |
| 8,083,094 B2 | 12/2011 | Caulfield et al. |
| 8,128,608 B2 | 3/2012 | Thevenin |
| 8,167,860 B1 | 5/2012 | Siegel |
| 8,181,651 B2 | 5/2012 | Pinel |
| 8,181,819 B2 | 5/2012 | Burney et al. |
| 8,211,063 B2 | 7/2012 | Bierman et al. |
| 8,221,369 B2 | 7/2012 | Parks et al. |
| 8,241,262 B2 | 8/2012 | Mahnensmith |
| 8,277,426 B2 | 10/2012 | Wilcox et al. |
| 8,287,508 B1 | 10/2012 | Sanchez |
| 8,303,554 B2 | 11/2012 | Tsai et al. |
| 8,322,565 B2 | 12/2012 | Caulfield et al. |
| 8,337,477 B2 | 12/2012 | Parks et al. |
| D674,241 S | 1/2013 | Bickert et al. |
| 8,343,122 B2 | 1/2013 | Gorres |
| 8,343,125 B2 | 1/2013 | Kawazoe et al. |
| 8,353,074 B2 | 1/2013 | Krebs |
| 8,353,886 B2 | 1/2013 | Bester et al. |
| D676,241 S | 2/2013 | Merrill |
| 8,388,587 B1 | 3/2013 | Gmuer et al. |
| 8,388,588 B2 | 3/2013 | Wada et al. |
| D679,807 S | 4/2013 | Burgess et al. |
| 8,425,482 B2 | 4/2013 | Khoubnazar |
| 8,434,586 B2 | 5/2013 | Pawelski et al. |
| 8,449,510 B2 | 5/2013 | Martini et al. |
| D684,260 S | 6/2013 | Lund et al. |
| 8,470,230 B2 | 6/2013 | Caulfield et al. |
| 8,479,941 B2 | 7/2013 | Matsumoto et al. |
| 8,479,949 B2 | 7/2013 | Henkel |
| 8,500,719 B1 | 8/2013 | Simpson et al. |
| 8,512,301 B2 | 8/2013 | Ma |
| 8,529,530 B2 | 9/2013 | Koch et al. |
| 8,535,284 B2 | 9/2013 | Joder et al. |
| 8,546,639 B2 | 10/2013 | Wada et al. |
| 8,551,062 B2 | 10/2013 | Kay |
| 8,551,075 B2 | 10/2013 | Bengtson |
| 8,568,376 B2 | 10/2013 | Delattre et al. |
| D694,404 S | 11/2013 | Burgess et al. |
| 8,585,683 B2 | 11/2013 | Bengtson et al. |
| 8,586,583 B2 | 11/2013 | Hamblin et al. |
| 8,652,112 B2 | 2/2014 | Johannison et al. |
| 8,669,412 B2 | 3/2014 | Fernkvist et al. |
| D702,973 S | 4/2014 | Norland et al. |
| 8,703,032 B2 | 4/2014 | Menon et al. |
| D704,330 S | 5/2014 | Cicatelli |
| D704,510 S | 5/2014 | Mason et al. |
| D705,423 S | 5/2014 | Walsh Cutler |
| D705,926 S | 5/2014 | Burgess et al. |
| 8,714,394 B2 | 5/2014 | Wulf |
| 8,715,267 B2 | 5/2014 | Bengtson et al. |
| 8,757,425 B2 | 6/2014 | Copeland |
| 8,777,032 B2 | 7/2014 | Biesecker et al. |
| 8,808,260 B2 | 8/2014 | Koch et al. |
| 8,864,730 B2 | 10/2014 | Conway et al. |
| 8,881,923 B2 | 11/2014 | Higginson |
| 8,882,731 B2 | 11/2014 | Suzuki et al. |
| 8,936,585 B2 | 1/2015 | Carson et al. |
| D729,581 S | 5/2015 | Boroski |
| 9,028,460 B2 | 5/2015 | Medeiros |
| 9,056,698 B2 | 6/2015 | Noer |
| 9,078,792 B2 | 7/2015 | Ruiz |
| 9,145,879 B2 | 9/2015 | Pirovano et al. |
| 9,173,602 B2 | 11/2015 | Gilbert |
| 9,173,799 B2 | 11/2015 | Tanimoto et al. |
| 9,187,220 B2 | 11/2015 | Biesecker et al. |
| 9,199,772 B2 | 12/2015 | Krippendorf |
| 9,233,020 B2 | 1/2016 | Matsumiya |
| 9,248,058 B2 | 2/2016 | Conway et al. |
| 9,308,118 B1 | 4/2016 | Dupree et al. |
| 9,309,029 B2 | 4/2016 | Incorvia et al. |
| 9,333,281 B2 | 5/2016 | Giezendanner et al. |
| 9,381,108 B2 | 7/2016 | Longoni et al. |
| 9,382,047 B2 | 7/2016 | Schmidtner et al. |
| 9,402,424 B2 | 8/2016 | Roy |
| 9,456,937 B2 | 10/2016 | Ellis |
| 9,480,595 B2 | 11/2016 | Baham et al. |
| 9,517,865 B2 | 12/2016 | Albers et al. |
| D777,941 S | 1/2017 | Piramoon |
| 9,533,806 B2 | 1/2017 | Ding et al. |
| 9,550,611 B2 | 1/2017 | Hodge |
| 9,555,930 B2 | 1/2017 | Campbell et al. |
| 9,623,159 B2 | 4/2017 | Locke |
| D789,522 S | 6/2017 | Burgess et al. |
| 9,687,849 B2 | 6/2017 | Bruno et al. |
| 9,694,949 B2 | 7/2017 | Hendricks et al. |
| 9,709,048 B2 | 7/2017 | Kinjo |
| 9,713,547 B2 | 7/2017 | Lee et al. |
| 9,732,754 B2 | 8/2017 | Huang et al. |
| 9,737,433 B2 | 8/2017 | Joh |
| 9,752,564 B2 | 9/2017 | Arceno et al. |
| 9,788,992 B2 | 10/2017 | Harvie |
| D804,907 S | 12/2017 | Sandoval |
| 9,868,564 B2 | 1/2018 | McGirr et al. |
| D814,239 S | 4/2018 | Arora |
| D817,484 S | 5/2018 | Lafond |
| 9,968,908 B2 | 5/2018 | Ladrech et al. |
| 10,010,393 B1 | 7/2018 | Nguyen et al. |
| 10,037,640 B2 | 7/2018 | Gordon |
| 10,058,470 B2 | 8/2018 | Phillips |
| 10,098,990 B2 | 10/2018 | Koch et al. |
| D835,264 S | 12/2018 | Mozzicato et al. |
| D835,779 S | 12/2018 | Mozzicato et al. |
| D840,533 S | 2/2019 | Mozzicato et al. |
| D840,534 S | 2/2019 | Mozzicato et al. |
| 10,225,376 B2 | 3/2019 | Perez Martinez |
| 10,226,376 B2 | 3/2019 | Sanchez et al. |
| 10,258,517 B1 | 4/2019 | Maschino et al. |
| D848,612 S | 5/2019 | Mozzicato et al. |
| 10,307,305 B1 | 6/2019 | Hodges |
| 10,335,121 B2 | 7/2019 | Desai |
| D856,512 S | 8/2019 | Cowart et al. |
| 10,376,406 B2 | 8/2019 | Newton |
| 10,376,407 B2 | 8/2019 | Newton |
| 10,390,989 B2 | 8/2019 | Sanchez et al. |
| D858,144 S | 9/2019 | Fu |
| 10,406,039 B2 | 9/2019 | Villarreal |
| 10,407,222 B2 | 9/2019 | Allen |
| 10,478,356 B2 | 11/2019 | Griffin |
| 10,500,108 B1 | 12/2019 | Maschino et al. |
| 10,502,198 B2 | 12/2019 | Stumpf et al. |
| 10,538,366 B2 | 1/2020 | Pentelovitch et al. |
| 10,569,938 B2 | 2/2020 | Zhao et al. |
| 10,577,156 B2 | 3/2020 | Dagnelie et al. |
| RE47,930 E | 4/2020 | Cho |
| 10,618,721 B2 | 4/2020 | Vazin |
| D884,390 S | 5/2020 | Wang |
| 10,669,079 B2 | 6/2020 | Freedman et al. |
| D892,315 S | 8/2020 | Airy |
| 10,730,672 B2 | 8/2020 | Bertram et al. |
| 10,737,848 B2 | 8/2020 | Philip et al. |
| 10,765,854 B2 | 9/2020 | Law et al. |
| 10,766,670 B2 | 9/2020 | Kittmann |
| 10,799,386 B1 | 10/2020 | Harrison |
| 10,806,642 B2 | 10/2020 | Tagomori et al. |
| D901,214 S | 11/2020 | Hu |
| 10,849,799 B2 | 12/2020 | Nishikawa et al. |
| 10,857,025 B2 | 12/2020 | Davis et al. |
| 10,865,017 B1 | 12/2020 | Cowart et al. |
| 10,889,412 B2 | 1/2021 | West et al. |
| 10,913,581 B2 | 2/2021 | Stahlecker |
| D912,244 S | 3/2021 | Rehm et al. |
| 10,952,889 B2 | 3/2021 | Newton et al. |
| 10,973,378 B2 | 4/2021 | Ryu et al. |
| 10,973,678 B2 | 4/2021 | Newton et al. |
| 10,974,874 B2 | 4/2021 | Ragias et al. |
| 11,000,401 B2 | 5/2021 | Ecklund et al. |
| 11,002,165 B2 | 5/2021 | Poulin |
| D923,365 S | 6/2021 | Wang |

(56) References Cited

U.S. PATENT DOCUMENTS

| | | |
|---|---|---|
| 11,026,829 B2 | 6/2021 | Harvie |
| 11,027,900 B2 | 6/2021 | Liu |
| 11,045,346 B2 | 6/2021 | Argent et al. |
| D928,946 S | 8/2021 | Sanchez et al. |
| 11,090,183 B2 | 8/2021 | Sanchez et al. |
| 11,160,695 B2 | 11/2021 | Febo et al. |
| 11,160,697 B2 | 11/2021 | Maschino et al. |
| 11,168,420 B2 | 11/2021 | Kinugasa et al. |
| 11,179,506 B2 | 11/2021 | Barr et al. |
| 11,199,116 B2 | 12/2021 | Ostromecki et al. |
| 11,207,206 B2 | 12/2021 | Sharma et al. |
| 11,226,376 B2 | 1/2022 | Yamauchi et al. |
| 11,253,389 B2 | 2/2022 | Sharma et al. |
| 11,253,407 B2 | 2/2022 | Miao et al. |
| 11,326,586 B2 | 5/2022 | Milner et al. |
| 11,369,508 B2 | 6/2022 | Ecklund et al. |
| 11,369,524 B2 | 6/2022 | Hubbard et al. |
| 11,376,152 B2 | 7/2022 | Sanchez et al. |
| 11,382,786 B2 | 7/2022 | Sanchez et al. |
| 11,382,788 B2 | 7/2022 | Hjorth et al. |
| 11,389,318 B2 | 7/2022 | Radl et al. |
| 11,395,871 B2 | 7/2022 | Radl et al. |
| 11,399,990 B2 | 8/2022 | Suyama |
| 11,426,303 B2 | 8/2022 | Davis et al. |
| 11,504,265 B2 | 11/2022 | Godinez et al. |
| 11,529,252 B2 | 12/2022 | Glithero et al. |
| 11,547,788 B2 | 1/2023 | Radl et al. |
| 11,806,266 B2 | 11/2023 | Sanchez et al. |
| 11,839,567 B2 | 12/2023 | Davis et al. |
| D1,010,109 S | 1/2024 | Ecklund et al. |
| 11,857,716 B2 | 1/2024 | Lee et al. |
| 11,865,030 B2 | 1/2024 | Davis et al. |
| 11,890,221 B2 | 2/2024 | Ulreich et al. |
| 11,911,160 B2 | 2/2024 | Woodard et al. |
| 11,925,575 B2 | 3/2024 | Newton |
| 11,938,053 B2 | 3/2024 | Austermann et al. |
| 11,944,740 B2 | 4/2024 | Hughett et al. |
| 11,994,122 B2 | 5/2024 | Bodain |
| 11,998,475 B2 | 6/2024 | Becker et al. |
| 12,023,457 B2 | 7/2024 | Mann et al. |
| 12,042,422 B2 | 7/2024 | Davis et al. |
| D1,038,385 S | 8/2024 | Ecklund et al. |
| 12,064,372 B2 | 8/2024 | Godinez et al. |
| 12,070,432 B2 | 8/2024 | Tourchak et al. |
| 12,090,083 B2 | 9/2024 | Ecklund et al. |
| 12,133,813 B2 | 11/2024 | Ulreich et al. |
| 12,138,195 B2 | 11/2024 | Alder et al. |
| 12,186,229 B2 | 1/2025 | Davis et al. |
| 12,245,966 B2 | 3/2025 | Newton |
| 2001/0037097 A1 | 11/2001 | Cheng et al. |
| 2001/0037098 A1 | 11/2001 | Snyder |
| 2001/0054426 A1 | 12/2001 | Knudson et al. |
| 2002/0019614 A1 | 2/2002 | Woon |
| 2002/0026161 A1 | 2/2002 | Grundke |
| 2002/0026163 A1 | 2/2002 | Grundke |
| 2002/0042945 A1 | 4/2002 | Sands |
| 2002/0087131 A1 | 7/2002 | Wolff et al. |
| 2002/0091364 A1 | 7/2002 | Prabhakar |
| 2002/0189992 A1 | 12/2002 | Schmidt et al. |
| 2002/0193760 A1 | 12/2002 | Thompson |
| 2002/0193762 A1 | 12/2002 | Suydam |
| 2003/0004436 A1 | 1/2003 | Schmidt et al. |
| 2003/0032931 A1 | 2/2003 | Grundke et al. |
| 2003/0032944 A1 | 2/2003 | Cawood |
| 2003/0073964 A1 | 4/2003 | Palumbo et al. |
| 2003/0074724 A1 | 4/2003 | Sands |
| 2003/0120178 A1 | 6/2003 | Heki |
| 2003/0129178 A1 | 7/2003 | Wegman et al. |
| 2003/0157859 A1 | 8/2003 | Ishikawa |
| 2003/0181880 A1 | 9/2003 | Schwartz |
| 2003/0195484 A1 | 10/2003 | Harvie |
| 2003/0204173 A1 | 10/2003 | Burns et al. |
| 2003/0233079 A1 | 12/2003 | Parks et al. |
| 2004/0006321 A1 | 1/2004 | Cheng et al. |
| 2004/0015141 A1 | 1/2004 | Cheng et al. |
| 2004/0056122 A1 | 3/2004 | Male et al. |
| 2004/0084465 A1 | 5/2004 | Luburic |
| 2004/0127872 A1 | 7/2004 | Petryk et al. |
| 2004/0128749 A1 | 7/2004 | Scott |
| 2004/0143229 A1 | 7/2004 | Easter |
| 2004/0147863 A1 | 7/2004 | Diaz et al. |
| 2004/0147894 A1 | 7/2004 | Mizutani et al. |
| 2004/0147895 A1 | 7/2004 | Mizutani et al. |
| 2004/0158221 A1 | 8/2004 | Mizutani et al. |
| 2004/0176731 A1 | 9/2004 | Cheng et al. |
| 2004/0176746 A1 | 9/2004 | Forral |
| 2004/0181201 A1 | 9/2004 | Mizutani et al. |
| 2004/0191919 A1 | 9/2004 | Unger et al. |
| 2004/0194792 A1 | 10/2004 | Zhuang et al. |
| 2004/0200936 A1 | 10/2004 | Opperthauser |
| 2004/0207530 A1 | 10/2004 | Nielsen |
| 2004/0236292 A1 | 11/2004 | Tazoe et al. |
| 2004/0243075 A1 | 12/2004 | Harvie |
| 2004/0254547 A1 | 12/2004 | Okabe et al. |
| 2005/0010182 A1 | 1/2005 | Parks et al. |
| 2005/0010197 A1 | 1/2005 | Lau et al. |
| 2005/0033248 A1 | 2/2005 | Machida et al. |
| 2005/0065471 A1 | 3/2005 | Kuntz |
| 2005/0070861 A1 | 3/2005 | Okabe et al. |
| 2005/0070862 A1 | 3/2005 | Tazoe et al. |
| 2005/0082300 A1 | 4/2005 | Modrell et al. |
| 2005/0097662 A1 | 5/2005 | Leimkuhler et al. |
| 2005/0101924 A1 | 5/2005 | Elson et al. |
| 2005/0119630 A1 | 6/2005 | Harvie |
| 2005/0131361 A1 | 6/2005 | Miskie |
| 2005/0137557 A1 | 6/2005 | Swiecicki et al. |
| 2005/0137560 A1 | 6/2005 | Mizutani et al. |
| 2005/0137561 A1 | 6/2005 | Mizutani et al. |
| 2005/0154360 A1 | 7/2005 | Harvie |
| 2005/0177070 A1 | 8/2005 | Levinson et al. |
| 2005/0197639 A1 | 9/2005 | Mombrinie |
| 2005/0197645 A1 | 9/2005 | Karpowicz et al. |
| 2005/0215969 A1 | 9/2005 | Mizutani et al. |
| 2005/0273069 A1 | 12/2005 | Mizutani et al. |
| 2005/0273920 A1 | 12/2005 | Marinas |
| 2005/0277903 A1 | 12/2005 | Mizutani et al. |
| 2005/0277904 A1 | 12/2005 | Chase et al. |
| 2005/0279359 A1 | 12/2005 | LeBlanc et al. |
| 2006/0004332 A1 | 1/2006 | Marx |
| 2006/0015080 A1 | 1/2006 | Mahnensmith |
| 2006/0015081 A1 | 1/2006 | Suzuki et al. |
| 2006/0016778 A1 | 1/2006 | Park |
| 2006/0069359 A1 | 3/2006 | Dipalma et al. |
| 2006/0079854 A1 | 4/2006 | Kay et al. |
| 2006/0111648 A1 | 5/2006 | Vermaak |
| 2006/0113334 A1 | 6/2006 | Mikhail et al. |
| 2006/0155214 A1 | 7/2006 | Wightman |
| 2006/0171997 A1 | 8/2006 | Gruenbacher et al. |
| 2006/0180566 A1 | 8/2006 | Mataya |
| 2006/0200102 A1 | 9/2006 | Cooper |
| 2006/0229575 A1 | 10/2006 | Boiarski |
| 2006/0229576 A1 | 10/2006 | Conway et al. |
| 2006/0231648 A1 | 10/2006 | Male et al. |
| 2006/0235266 A1 | 10/2006 | Nan |
| 2006/0235359 A1 | 10/2006 | Marland |
| 2006/0241553 A1 | 10/2006 | Harvie |
| 2006/0269439 A1 | 11/2006 | White |
| 2006/0277670 A1 | 12/2006 | Baker et al. |
| 2007/0006368 A1 | 1/2007 | Key et al. |
| 2007/0010797 A1 | 1/2007 | Nishtala et al. |
| 2007/0016152 A1 | 1/2007 | Karpowicz et al. |
| 2007/0038194 A1 | 2/2007 | Wada et al. |
| 2007/0055209 A1 | 3/2007 | Patel et al. |
| 2007/0073252 A1 | 3/2007 | Forgrave |
| 2007/0117880 A1 | 5/2007 | Elson et al. |
| 2007/0118993 A1 | 5/2007 | Bates |
| 2007/0135786 A1 | 6/2007 | Schmidt et al. |
| 2007/0137718 A1 | 6/2007 | Rushlander et al. |
| 2007/0149935 A1 | 6/2007 | Dirico |
| 2007/0191804 A1 | 8/2007 | Coley |
| 2007/0203464 A1 | 8/2007 | Green et al. |
| 2007/0214553 A1 | 9/2007 | Carromba et al. |
| 2007/0225663 A1 | 9/2007 | Watt et al. |
| 2007/0225666 A1 | 9/2007 | Otto |

(56) References Cited

U.S. PATENT DOCUMENTS

| | | |
|---|---|---|
| 2007/0225668 A1 | 9/2007 | Otto |
| 2007/0266486 A1 | 11/2007 | Ramirez |
| 2007/0282309 A1 | 12/2007 | Bengtson et al. |
| 2008/0004576 A1 | 1/2008 | Tanaka et al. |
| 2008/0015526 A1 | 1/2008 | Reiner et al. |
| 2008/0015527 A1 | 1/2008 | House |
| 2008/0033386 A1 | 2/2008 | Okabe et al. |
| 2008/0041869 A1 | 2/2008 | Backaert |
| 2008/0077099 A1 | 3/2008 | House |
| 2008/0091153 A1 | 4/2008 | Harvie |
| 2008/0091158 A1 | 4/2008 | Yang |
| 2008/0114327 A1 | 5/2008 | Barge |
| 2008/0167634 A1 | 7/2008 | Kouta et al. |
| 2008/0183157 A1 | 7/2008 | Walters |
| 2008/0215031 A1 | 9/2008 | Belfort et al. |
| 2008/0234642 A1 | 9/2008 | Patterson et al. |
| 2008/0269703 A1 | 10/2008 | Collins et al. |
| 2008/0281282 A1 | 11/2008 | Finger et al. |
| 2008/0287894 A1 | 11/2008 | Van Den Heuvel et al. |
| 2008/0312550 A1 | 12/2008 | Nishtala et al. |
| 2009/0025717 A1 | 1/2009 | Pinel |
| 2009/0048570 A1 | 2/2009 | Jensen |
| 2009/0056003 A1 | 3/2009 | Ivie et al. |
| 2009/0069761 A1 | 3/2009 | Vogel |
| 2009/0069765 A1 | 3/2009 | Wortham |
| 2009/0120179 A1 | 5/2009 | Nylander et al. |
| 2009/0192482 A1 | 7/2009 | Dodge et al. |
| 2009/0226541 A1 | 9/2009 | Scholz et al. |
| 2009/0234312 A1 | 9/2009 | Otoole et al. |
| 2009/0251510 A1 | 10/2009 | Noro et al. |
| 2009/0259206 A1 | 10/2009 | Kai et al. |
| 2009/0264840 A1 | 10/2009 | Virginio |
| 2009/0270822 A1 | 10/2009 | Medeiros |
| 2009/0281510 A1 | 11/2009 | Fisher |
| 2009/0283982 A1 | 11/2009 | Thomas |
| 2009/0306610 A1 | 12/2009 | Van Den Heuvel et al. |
| 2010/0004612 A1 | 1/2010 | Thevenin |
| 2010/0031429 A1 | 2/2010 | Kim et al. |
| 2010/0032789 A1 | 2/2010 | Schoen et al. |
| 2010/0058660 A1 | 3/2010 | Williams |
| 2010/0121289 A1 | 5/2010 | Parks et al. |
| 2010/0158168 A1 | 6/2010 | Murthy et al. |
| 2010/0160882 A1 | 6/2010 | Lowe |
| 2010/0174250 A1 | 7/2010 | Hu et al. |
| 2010/0179493 A1 | 7/2010 | Heagle et al. |
| 2010/0185168 A1 | 7/2010 | Graauw et al. |
| 2010/0198172 A1 | 8/2010 | Wada et al. |
| 2010/0211032 A1 | 8/2010 | Tsai et al. |
| 2010/0234820 A1 | 9/2010 | Tsai et al. |
| 2010/0241104 A1 | 9/2010 | Gilbert |
| 2010/0263113 A1 | 10/2010 | Shelton et al. |
| 2010/0310845 A1 | 12/2010 | Bond et al. |
| 2011/0028920 A1 | 2/2011 | Johannison |
| 2011/0028922 A1 | 2/2011 | Kay et al. |
| 2011/0034889 A1 | 2/2011 | Smith |
| 2011/0036837 A1 | 2/2011 | Shang |
| 2011/0040267 A1 | 2/2011 | Wada et al. |
| 2011/0040271 A1 | 2/2011 | Rogers et al. |
| 2011/0054426 A1 | 3/2011 | Stewart et al. |
| 2011/0060299 A1 | 3/2011 | Wada et al. |
| 2011/0060300 A1 | 3/2011 | Weig et al. |
| 2011/0077495 A1 | 3/2011 | Gilbert |
| 2011/0077606 A1 | 3/2011 | Wilcox et al. |
| 2011/0087337 A1 | 4/2011 | Forsell |
| 2011/0137273 A1 | 6/2011 | Muellejans et al. |
| 2011/0145993 A1 | 6/2011 | Rader et al. |
| 2011/0152802 A1 | 6/2011 | Dicamillo et al. |
| 2011/0164147 A1 | 7/2011 | Takahashi et al. |
| 2011/0172620 A1 | 7/2011 | Khambatta |
| 2011/0172625 A1 | 7/2011 | Wada et al. |
| 2011/0198904 A1 | 8/2011 | Thomas et al. |
| 2011/0202024 A1 | 8/2011 | Cozzens |
| 2011/0238023 A1 | 9/2011 | Slayton |
| 2011/0240648 A1 | 10/2011 | Tucker |
| 2011/0251572 A1 | 10/2011 | Nishtala et al. |
| 2011/0265889 A1 | 11/2011 | Tanaka et al. |
| 2011/0276020 A1 | 11/2011 | Mitsui |
| 2012/0029452 A1 | 2/2012 | Roedsten |
| 2012/0035577 A1 | 2/2012 | Tomes et al. |
| 2012/0041400 A1 | 2/2012 | Christensen |
| 2012/0059328 A1 | 3/2012 | Dikeman et al. |
| 2012/0066825 A1 | 3/2012 | Birbara et al. |
| 2012/0103347 A1 | 5/2012 | Wheaton et al. |
| 2012/0116336 A1 | 5/2012 | Sharma et al. |
| 2012/0137420 A1 | 6/2012 | Gordon et al. |
| 2012/0165768 A1 | 6/2012 | Sekiyama et al. |
| 2012/0165786 A1 | 6/2012 | Chappa et al. |
| 2012/0209216 A1 | 8/2012 | Jensen et al. |
| 2012/0210503 A1 | 8/2012 | Anzivino et al. |
| 2012/0233761 A1 | 9/2012 | Huang |
| 2012/0245541 A1 | 9/2012 | Suzuki et al. |
| 2012/0245542 A1 | 9/2012 | Suzuki et al. |
| 2012/0245547 A1 | 9/2012 | Wilcox et al. |
| 2012/0253303 A1 | 10/2012 | Suzuki et al. |
| 2012/0271259 A1 | 10/2012 | Ulert |
| 2012/0296305 A1 | 11/2012 | Barraza Khaled et al. |
| 2012/0316522 A1 | 12/2012 | Carter et al. |
| 2012/0330256 A1 | 12/2012 | Wilcox et al. |
| 2013/0006206 A1 | 1/2013 | Wada et al. |
| 2013/0019374 A1 | 1/2013 | Schwartz |
| 2013/0045651 A1 | 2/2013 | Esteves et al. |
| 2013/0053804 A1 | 2/2013 | Soerensen et al. |
| 2013/0096523 A1 | 4/2013 | Chang et al. |
| 2013/0110059 A1 | 5/2013 | Kossow et al. |
| 2013/0138064 A1 | 5/2013 | Stroebech et al. |
| 2013/0150813 A1 | 6/2013 | Gordon et al. |
| 2013/0165880 A1 | 6/2013 | Amos et al. |
| 2013/0218112 A1 | 8/2013 | Thompson |
| 2013/0245496 A1 | 9/2013 | Wells et al. |
| 2013/0245586 A1* | 9/2013 | Jha .................. A61F 5/443 604/352 |
| 2013/0292537 A1 | 11/2013 | Dirico |
| 2013/0330501 A1 | 12/2013 | Aizenberg et al. |
| 2014/0005647 A1 | 1/2014 | Shuffler et al. |
| 2014/0031774 A1 | 1/2014 | Bengtson |
| 2014/0039432 A1 | 2/2014 | Dunbar et al. |
| 2014/0039440 A1 | 2/2014 | Doescher |
| 2014/0058347 A1 | 2/2014 | Marquette |
| 2014/0107599 A1 | 4/2014 | Fink et al. |
| 2014/0157499 A1 | 6/2014 | Suzuki et al. |
| 2014/0171889 A1 | 6/2014 | Hopman et al. |
| 2014/0182051 A1 | 7/2014 | Tanimoto et al. |
| 2014/0196189 A1 | 7/2014 | Lee et al. |
| 2014/0276501 A1 | 9/2014 | Cisko |
| 2014/0303582 A1 | 10/2014 | Wright et al. |
| 2014/0316381 A1 | 10/2014 | Reglin |
| 2014/0325746 A1 | 11/2014 | Block |
| 2014/0348139 A1 | 11/2014 | Gomez Martinez |
| 2014/0352050 A1 | 12/2014 | Yao et al. |
| 2014/0371628 A1 | 12/2014 | Desai |
| 2015/0045757 A1* | 2/2015 | Lee .................. A61F 5/4401 604/385.03 |
| 2015/0047114 A1 | 2/2015 | Ramirez |
| 2015/0048089 A1 | 2/2015 | Robertson |
| 2015/0135423 A1 | 5/2015 | Sharpe et al. |
| 2015/0157300 A1 | 6/2015 | Ealovega et al. |
| 2015/0209188 A1 | 7/2015 | Scheremet et al. |
| 2015/0209194 A1* | 7/2015 | Heyman ............. A61F 5/453 604/385.03 |
| 2015/0267862 A1 | 9/2015 | Mishler |
| 2015/0290425 A1 | 10/2015 | Macy et al. |
| 2015/0320583 A1* | 11/2015 | Harvie ............... A61F 5/441 604/351 |
| 2015/0329255 A1 | 11/2015 | Rzepecki |
| 2015/0342799 A1 | 12/2015 | Michiels et al. |
| 2015/0359660 A1 | 12/2015 | Harvie |
| 2015/0359996 A1 | 12/2015 | Arora et al. |
| 2015/0366699 A1 | 12/2015 | Nelson |
| 2016/0029998 A1 | 2/2016 | Brister et al. |
| 2016/0030228 A1 | 2/2016 | Jones |
| 2016/0038356 A1 | 2/2016 | Yao et al. |
| 2016/0051395 A1 | 2/2016 | Ugarte M.D. |
| 2016/0058322 A1 | 3/2016 | Brister et al. |
| 2016/0060001 A1 | 3/2016 | Wada et al. |

(56) References Cited

U.S. PATENT DOCUMENTS

| | | |
|---|---|---|
| 2016/0100976 A1 | 4/2016 | Conway et al. |
| 2016/0106604 A1 | 4/2016 | Timm |
| 2016/0113809 A1 | 4/2016 | Kim |
| 2016/0136338 A1 | 5/2016 | Lee et al. |
| 2016/0183689 A1 | 6/2016 | Miner |
| 2016/0256022 A1 | 9/2016 | Le |
| 2016/0270982 A1 | 9/2016 | Raycheck et al. |
| 2016/0278662 A1 | 9/2016 | Brister et al. |
| 2016/0357400 A1 | 12/2016 | Penha et al. |
| 2016/0366699 A1 | 12/2016 | Zhang et al. |
| 2016/0367226 A1 | 12/2016 | Newton et al. |
| 2016/0367411 A1 | 12/2016 | Justiz et al. |
| 2016/0367726 A1 | 12/2016 | Gratzer |
| 2016/0374848 A1* | 12/2016 | Sanchez .................. A61F 5/453 604/319 |
| 2017/0007438 A1 | 1/2017 | Harvie |
| 2017/0014560 A1 | 1/2017 | Minskoff et al. |
| 2017/0042724 A1 | 2/2017 | Ugarte |
| 2017/0042748 A1 | 2/2017 | Griffin |
| 2017/0100276 A1 | 4/2017 | Joh |
| 2017/0107312 A1 | 4/2017 | Hinayama et al. |
| 2017/0128638 A1 | 5/2017 | Giezendanner et al. |
| 2017/0136209 A1 | 5/2017 | Burnett et al. |
| 2017/0143534 A1 | 5/2017 | Sanchez |
| 2017/0165100 A1 | 6/2017 | Jackson et al. |
| 2017/0165405 A1 | 6/2017 | Muser et al. |
| 2017/0189225 A1 | 7/2017 | Voorhees et al. |
| 2017/0202692 A1 | 7/2017 | Laniado |
| 2017/0216081 A1 | 8/2017 | Accosta |
| 2017/0238911 A1 | 8/2017 | Duval |
| 2017/0246026 A1 | 8/2017 | Laniado |
| 2017/0252014 A1 | 9/2017 | Siller Gonzalez et al. |
| 2017/0252202 A9 | 9/2017 | Sanchez et al. |
| 2017/0266031 A1 | 9/2017 | Sanchez et al. |
| 2017/0266658 A1 | 9/2017 | Bruno et al. |
| 2017/0281399 A1 | 10/2017 | Vanmiddendorp et al. |
| 2017/0281419 A1 | 10/2017 | Pintado |
| 2017/0312116 A1 | 11/2017 | Laniado |
| 2017/0325788 A1 | 11/2017 | Ealovega et al. |
| 2017/0333244 A1 | 11/2017 | Laniado |
| 2017/0348139 A1 | 12/2017 | Newton et al. |
| 2017/0354532 A1 | 12/2017 | Holt |
| 2017/0354551 A1 | 12/2017 | Gawley et al. |
| 2017/0367873 A1 | 12/2017 | Grannum |
| 2018/0002075 A1 | 1/2018 | Lee |
| 2018/0008451 A1 | 1/2018 | Stroebech |
| 2018/0008804 A1 | 1/2018 | Laniado |
| 2018/0021218 A1 | 1/2018 | Brosch et al. |
| 2018/0028349 A1 | 2/2018 | Newton et al. |
| 2018/0037384 A1 | 2/2018 | Archeny et al. |
| 2018/0049910 A1 | 2/2018 | Newton |
| 2018/0064572 A1 | 3/2018 | Wiltshire |
| 2018/0104131 A1 | 4/2018 | Killian |
| 2018/0127187 A1 | 5/2018 | Sewell |
| 2018/0193215 A1 | 7/2018 | Davies et al. |
| 2018/0200101 A1 | 7/2018 | Su |
| 2018/0228642 A1 | 8/2018 | Davis et al. |
| 2018/0256384 A1 | 9/2018 | Kasirye |
| 2018/0271694 A1 | 9/2018 | Fernandez et al. |
| 2018/0317892 A1 | 11/2018 | Catlin |
| 2018/0325748 A1 | 11/2018 | Sharma et al. |
| 2019/0001030 A1 | 1/2019 | Braga et al. |
| 2019/0021899 A1 | 1/2019 | Vlet |
| 2019/0038451 A1 | 2/2019 | Harvie |
| 2019/0046102 A1 | 2/2019 | Kushnir et al. |
| 2019/0059938 A1 | 2/2019 | Holsten |
| 2019/0091059 A1 | 3/2019 | Gabriel |
| 2019/0100362 A1 | 4/2019 | Meyers et al. |
| 2019/0133126 A1 | 5/2019 | Modak et al. |
| 2019/0133814 A1 | 5/2019 | Tammen et al. |
| 2019/0142624 A1 | 5/2019 | Sanchez et al. |
| 2019/0224036 A1 | 7/2019 | Sanchez et al. |
| 2019/0226189 A1 | 7/2019 | Braxton |
| 2019/0240079 A1 | 8/2019 | Tuli |
| 2019/0247222 A1 | 8/2019 | Ecklund et al. |
| 2019/0247223 A1 | 8/2019 | Brun et al. |
| 2019/0247623 A1 | 8/2019 | Helm et al. |
| 2019/0282391 A1 | 9/2019 | Johannes et al. |
| 2019/0314189 A1 | 10/2019 | Acosta |
| 2019/0314190 A1 | 10/2019 | Sanchez et al. |
| 2019/0321587 A1 | 10/2019 | Mcmenamin et al. |
| 2019/0344934 A1 | 11/2019 | Faerber et al. |
| 2019/0365303 A1 | 12/2019 | Bullington et al. |
| 2019/0365307 A1 | 12/2019 | Laing et al. |
| 2019/0365561 A1 | 12/2019 | Newton et al. |
| 2019/0374373 A1 | 12/2019 | Joh |
| 2020/0008985 A1 | 1/2020 | Nguyen et al. |
| 2020/0016012 A1 | 1/2020 | Dutkiewicz |
| 2020/0030595 A1 | 1/2020 | Boukidjian et al. |
| 2020/0046544 A1 | 2/2020 | Godinez et al. |
| 2020/0055638 A1 | 2/2020 | Lau et al. |
| 2020/0070392 A1 | 3/2020 | Huber et al. |
| 2020/0085609 A1 | 3/2020 | Schelch et al. |
| 2020/0085610 A1 | 3/2020 | Cohn et al. |
| 2020/0086090 A1 | 3/2020 | Von Weymarn-Schärli et al. |
| 2020/0107518 A1 | 4/2020 | Hiroshima et al. |
| 2020/0129322 A1 | 4/2020 | Leuckel |
| 2020/0171217 A9 | 6/2020 | Braga et al. |
| 2020/0179177 A1 | 6/2020 | Erdem et al. |
| 2020/0187918 A1 | 6/2020 | Wiygul |
| 2020/0206015 A1 | 7/2020 | Langer |
| 2020/0206039 A1 | 7/2020 | Mclain |
| 2020/0214910 A1 | 7/2020 | Varona et al. |
| 2020/0216898 A1 | 7/2020 | Hubbell |
| 2020/0216989 A1 | 7/2020 | Kinugasa et al. |
| 2020/0229964 A1 | 7/2020 | Staali et al. |
| 2020/0231343 A1 | 7/2020 | Freedman et al. |
| 2020/0232841 A1 | 7/2020 | Satish et al. |
| 2020/0246172 A1 | 8/2020 | Ho |
| 2020/0246203 A1 | 8/2020 | Tulk et al. |
| 2020/0255189 A1 | 8/2020 | Liu |
| 2020/0261280 A1 | 8/2020 | Heyman |
| 2020/0276046 A1 | 9/2020 | Staali et al. |
| 2020/0306075 A1 | 10/2020 | Newton et al. |
| 2020/0315837 A1 | 10/2020 | Radl et al. |
| 2020/0315838 A1 | 10/2020 | Eckert |
| 2020/0315872 A1 | 10/2020 | Viens et al. |
| 2020/0315874 A1 | 10/2020 | Viens et al. |
| 2020/0331672 A1 | 10/2020 | Bertram et al. |
| 2020/0345332 A1 | 11/2020 | Duval |
| 2020/0353135 A1 | 11/2020 | Gregory et al. |
| 2020/0367677 A1 | 11/2020 | Silsby et al. |
| 2020/0369444 A1 | 11/2020 | Silsby et al. |
| 2020/0375781 A1 | 12/2020 | Staali et al. |
| 2020/0375810 A1 | 12/2020 | Carlin et al. |
| 2020/0384242 A1 | 12/2020 | Havard et al. |
| 2020/0385179 A1 | 12/2020 | McCourt |
| 2020/0390591 A1 | 12/2020 | Glithero et al. |
| 2020/0390592 A1 | 12/2020 | Merrill |
| 2020/0405521 A1 | 12/2020 | Glasroe |
| 2021/0008771 A1 | 1/2021 | Huber et al. |
| 2021/0009323 A1 | 1/2021 | Markarian et al. |
| 2021/0020072 A1 | 1/2021 | Moehring et al. |
| 2021/0023279 A1 | 1/2021 | Radl et al. |
| 2021/0059853 A1 | 3/2021 | Davis et al. |
| 2021/0061523 A1 | 3/2021 | Bytheway |
| 2021/0069005 A1 | 3/2021 | Sanchez et al. |
| 2021/0069008 A1 | 3/2021 | Blabas et al. |
| 2021/0069009 A1 | 3/2021 | Im |
| 2021/0069030 A1 | 3/2021 | Nishikawa et al. |
| 2021/0077993 A1 | 3/2021 | Nazareth et al. |
| 2021/0113749 A1 | 4/2021 | Radl et al. |
| 2021/0121318 A1 | 4/2021 | Pinlac |
| 2021/0137724 A1 | 5/2021 | Ecklund et al. |
| 2021/0138190 A1 | 5/2021 | Erbey et al. |
| 2021/0154055 A1 | 5/2021 | Villarreal |
| 2021/0170079 A1 | 6/2021 | Radl et al. |
| 2021/0178390 A1 | 6/2021 | Oueslati et al. |
| 2021/0186742 A1 | 6/2021 | Newton et al. |
| 2021/0211568 A1 | 7/2021 | Zhou et al. |
| 2021/0212865 A1 | 7/2021 | Wallajapet et al. |
| 2021/0220162 A1 | 7/2021 | Jamison |
| 2021/0220163 A1 | 7/2021 | Mayrand |
| 2021/0228400 A1 | 7/2021 | Glithero |

(56) References Cited

U.S. PATENT DOCUMENTS

| | | |
|---|---|---|
| 2021/0228401 A1 | 7/2021 | Becker et al. |
| 2021/0228795 A1 | 7/2021 | Hughett et al. |
| 2021/0229877 A1 | 7/2021 | Ragias et al. |
| 2021/0236323 A1 | 8/2021 | Austermann et al. |
| 2021/0236324 A1 | 8/2021 | Sweeney |
| 2021/0251814 A1 | 8/2021 | Jönegren et al. |
| 2021/0267787 A1 | 9/2021 | Nazemi |
| 2021/0275343 A1 | 9/2021 | Sanchez et al. |
| 2021/0275344 A1 | 9/2021 | Wing |
| 2021/0290454 A1 | 9/2021 | Yamada |
| 2021/0315726 A1 | 10/2021 | Lin |
| 2021/0315727 A1 | 10/2021 | Jiang |
| 2021/0353449 A1 | 11/2021 | Sharma et al. |
| 2021/0353450 A1 | 11/2021 | Sharma et al. |
| 2021/0361469 A1 | 11/2021 | Liu et al. |
| 2021/0369495 A1 | 12/2021 | Cheng et al. |
| 2021/0386925 A1 | 12/2021 | Hartwell et al. |
| 2021/0393433 A1 | 12/2021 | Godinez et al. |
| 2022/0023091 A1 | 1/2022 | Ecklund et al. |
| 2022/0031290 A1 | 2/2022 | Weed |
| 2022/0031523 A1 | 2/2022 | Pierpoint |
| 2022/0039995 A1 | 2/2022 | Johannes et al. |
| 2022/0047410 A1 | 2/2022 | Walthall |
| 2022/0062027 A1 | 3/2022 | Mitchell et al. |
| 2022/0062028 A1 | 3/2022 | Mitchell et al. |
| 2022/0062029 A1 | 3/2022 | Johannes et al. |
| 2022/0066825 A1 | 3/2022 | Saraf et al. |
| 2022/0071811 A1 | 3/2022 | Cheng et al. |
| 2022/0071826 A1 | 3/2022 | Kulkarni et al. |
| 2022/0104965 A1 | 4/2022 | Vaninetti et al. |
| 2022/0104976 A1 | 4/2022 | Hoeger et al. |
| 2022/0104981 A1 | 4/2022 | Jones |
| 2022/0117773 A1 | 4/2022 | Davis et al. |
| 2022/0117774 A1 | 4/2022 | Meyer et al. |
| 2022/0117775 A1 | 4/2022 | Jones et al. |
| 2022/0118165 A1 | 4/2022 | Knapp et al. |
| 2022/0133524 A1 | 5/2022 | Davis |
| 2022/0151817 A1 | 5/2022 | Mann |
| 2022/0160949 A1 | 5/2022 | Simiele et al. |
| 2022/0168159 A1 | 6/2022 | Triado et al. |
| 2022/0193312 A1 | 6/2022 | Lee et al. |
| 2022/0211536 A1 | 7/2022 | Johannes et al. |
| 2022/0218510 A1 | 7/2022 | Metzger et al. |
| 2022/0229053 A1 | 7/2022 | Levin et al. |
| 2022/0241106 A1 | 8/2022 | Johannes et al. |
| 2022/0247407 A1 | 8/2022 | Yamamoto et al. |
| 2022/0248836 A1 | 8/2022 | Cagle et al. |
| 2022/0257407 A1 | 8/2022 | Johannes et al. |
| 2022/0265460 A1 | 8/2022 | Coker |
| 2022/0265462 A1 | 8/2022 | Alder et al. |
| 2022/0270711 A1 | 8/2022 | Feala et al. |
| 2022/0273482 A1 | 9/2022 | Johannes et al. |
| 2022/0280357 A1 | 9/2022 | Jagannathan et al. |
| 2022/0280710 A1 | 9/2022 | Agrawal et al. |
| 2022/0287689 A1 | 9/2022 | Johannes |
| 2022/0287867 A1 | 9/2022 | Jones et al. |
| 2022/0287868 A1 | 9/2022 | Garvey et al. |
| 2022/0296408 A1 | 9/2022 | Evans et al. |
| 2022/0305191 A1 | 9/2022 | Joseph et al. |
| 2022/0313222 A1 | 10/2022 | Austermann et al. |
| 2022/0313474 A1 | 10/2022 | Kriscovich et al. |
| 2022/0331170 A1 | 10/2022 | Erdem et al. |
| 2022/0339023 A1 | 10/2022 | Davis et al. |
| 2022/0339024 A1 | 10/2022 | Johannes et al. |
| 2022/0354685 A1 | 11/2022 | Davis et al. |
| 2022/0362049 A1 | 11/2022 | Austermann et al. |
| 2022/0370231 A1 | 11/2022 | Wang et al. |
| 2022/0370234 A1 | 11/2022 | Hughett et al. |
| 2022/0370235 A1 | 11/2022 | Johannes et al. |
| 2022/0370237 A1 | 11/2022 | Parmar et al. |
| 2022/0387001 A1 | 12/2022 | Askenazi et al. |
| 2022/0387693 A1 | 12/2022 | Bannwart et al. |
| 2022/0395390 A1 | 12/2022 | Brooks |
| 2022/0395391 A1 | 12/2022 | Saunders et al. |
| 2022/0401252 A1 | 12/2022 | Warren |
| 2022/0409419 A1 | 12/2022 | Garvey et al. |
| 2022/0409422 A1 | 12/2022 | Schneider et al. |
| 2023/0018845 A1 | 1/2023 | Lee |
| 2023/0020563 A1 | 1/2023 | Sharma et al. |
| 2023/0031640 A1 | 2/2023 | Hughett et al. |
| 2023/0037159 A1 | 2/2023 | Brennan et al. |
| 2023/0049924 A1 | 2/2023 | Johannes et al. |
| 2023/0052238 A1 | 2/2023 | Oluwasogo |
| 2023/0062944 A1 | 3/2023 | Vollenberg et al. |
| 2023/0062994 A1 | 3/2023 | Ecklund et al. |
| 2023/0070347 A1 | 3/2023 | Watson et al. |
| 2023/0073708 A1 | 3/2023 | Xu et al. |
| 2023/0089032 A1 | 3/2023 | Hughett et al. |
| 2023/0091118 A1 | 3/2023 | Watson |
| 2023/0099821 A1 | 3/2023 | Radl et al. |
| 2023/0099991 A1 | 3/2023 | Bianchi et al. |
| 2023/0105001 A1 | 4/2023 | Whittome et al. |
| 2023/0110577 A1 | 4/2023 | Choi |
| 2023/0138269 A1 | 5/2023 | Abdelal et al. |
| 2023/0145365 A1 | 5/2023 | Martin et al. |
| 2023/0155253 A1 | 5/2023 | Mn et al. |
| 2023/0210504 A1 | 7/2023 | Kuroda et al. |
| 2023/0210685 A1 | 7/2023 | Fallows et al. |
| 2023/0218426 A1 | 7/2023 | Hughett |
| 2023/0240884 A1 | 8/2023 | Davis et al. |
| 2023/0248562 A1 | 8/2023 | Sanchez et al. |
| 2023/0248564 A1 | 8/2023 | Mann et al. |
| 2023/0255812 A1 | 8/2023 | Sanchez et al. |
| 2023/0255813 A1 | 8/2023 | Sanchez et al. |
| 2023/0255815 A1 | 8/2023 | Newton |
| 2023/0263650 A1 | 8/2023 | Sanchez et al. |
| 2023/0263655 A1 | 8/2023 | Johannes et al. |
| 2023/0277360 A1 | 9/2023 | Lambert et al. |
| 2023/0277362 A1 | 9/2023 | Davis et al. |
| 2023/0285178 A1 | 9/2023 | Sanchez et al. |
| 2023/0293339 A1 | 9/2023 | James |
| 2023/0301846 A1 | 9/2023 | Greenwood |
| 2023/0355423 A1 | 11/2023 | Stevenson et al. |
| 2023/0404791 A1 | 12/2023 | Ecklund et al. |
| 2024/0008444 A1 | 1/2024 | Su et al. |
| 2024/0009023 A1 | 1/2024 | Johannes et al. |
| 2024/0024170 A1 | 1/2024 | Scott |
| 2024/0033148 A1 | 2/2024 | Gordon et al. |
| 2024/0041638 A1 | 2/2024 | Johannes et al. |
| 2024/0058160 A1 | 2/2024 | Young Joyner et al. |
| 2024/0058161 A1 | 2/2024 | Ulreich et al. |
| 2024/0058520 A1 | 2/2024 | Mn et al. |
| 2024/0065881 A1 | 2/2024 | Kuroda et al. |
| 2024/0082044 A1 | 3/2024 | Nguyen et al. |
| 2024/0099874 A1 | 3/2024 | Sanchez et al. |
| 2024/0108268 A1 | 4/2024 | Woodard et al. |
| 2024/0110318 A1 | 4/2024 | Bendt et al. |
| 2024/0122773 A1 | 4/2024 | Nguyen et al. |
| 2024/0123134 A1 | 4/2024 | Kharkar et al. |
| 2024/0148539 A1 | 5/2024 | Austermann et al. |
| 2024/0156633 A1 | 5/2024 | Fallows et al. |
| 2024/0252343 A1 | 8/2024 | Voda |
| 2024/0261131 A1 | 8/2024 | Garvey et al. |
| 2024/0268986 A1 | 8/2024 | Barnes et al. |
| 2024/0268989 A1 | 8/2024 | Martin et al. |
| 2024/0269027 A1 | 8/2024 | Tourchak et al. |
| 2024/0285425 A1 | 8/2024 | Donohoe et al. |
| 2024/0325190 A1 | 10/2024 | Minchew et al. |
| 2024/0358539 A1 | 10/2024 | Gallup |
| 2024/0358542 A1 | 10/2024 | Richardson et al. |
| 2024/0374414 A1 | 11/2024 | Richardson et al. |
| 2025/0009552 A1 | 1/2025 | Blabas et al. |
| 2025/0073055 A1 | 3/2025 | Ecklund et al. |
| 2025/0107920 A1 | 4/2025 | Fallows et al. |
| 2025/0107921 A1 | 4/2025 | Sanchez et al. |

FOREIGN PATENT DOCUMENTS

| | | |
|---|---|---|
| AU | 2022349367 A1 | 4/2024 |
| CA | 2165286 C | 9/1999 |
| CA | 2354132 A1 | 6/2000 |
| CA | 2359091 C | 9/2003 |
| CA | 2488867 C | 8/2007 |
| CA | 3050918 A1 | 8/2018 |

(56) References Cited

FOREIGN PATENT DOCUMENTS

| | | |
|---|---|---|
| CA | 3098571 A1 | 11/2019 |
| CA | 3188651 A1 | 7/2023 |
| CN | 2269203 Y | 12/1997 |
| CN | 1332620 A | 1/2002 |
| CN | 1434693 A | 8/2003 |
| CN | 1533755 A | 10/2004 |
| CN | 1602825 A | 4/2005 |
| CN | 1720888 A | 1/2006 |
| CN | 2936204 Y | 8/2007 |
| CN | 101262836 A | 9/2008 |
| CN | 101522148 A | 9/2009 |
| CN | 102159159 A | 8/2011 |
| CN | 202184840 U | 4/2012 |
| CN | 102481441 A | 5/2012 |
| CN | 202463712 U | 10/2012 |
| CN | 202950810 U | 5/2013 |
| CN | 103533968 A | 1/2014 |
| CN | 103717180 A | 4/2014 |
| CN | 204562697 U | 8/2015 |
| CN | 105411783 A | 3/2016 |
| CN | 105451693 A | 3/2016 |
| CN | 105534632 A | 5/2016 |
| CN | 106132360 A | 11/2016 |
| CN | 205849719 U | 1/2017 |
| CN | 205924282 U | 2/2017 |
| CN | 106726089 A | 5/2017 |
| CN | 107920912 A | 4/2018 |
| CN | 108420590 A | 8/2018 |
| CN | 209285902 U | 8/2019 |
| CN | 110381883 A | 10/2019 |
| CN | 211198839 U | 8/2020 |
| CN | 111991136 A | 11/2020 |
| CN | 112022488 A | 12/2020 |
| CN | 212234893 U | 12/2020 |
| CN | 212466312 U | 2/2021 |
| CN | 112566550 A | 3/2021 |
| CN | 112603184 A | 4/2021 |
| CN | 213490035 U | 6/2021 |
| CN | 114007493 A | 2/2022 |
| CN | 114375187 A | 4/2022 |
| CN | 116096332 A | 5/2023 |
| DE | 79818 C | 10/1893 |
| DE | 1516466 A1 | 6/1969 |
| DE | 2721330 A1 | 11/1977 |
| DE | 2742298 A1 | 3/1978 |
| DE | 9407554.9 U1 | 5/1995 |
| DE | 4443710 A1 | 6/1995 |
| DE | 4416094 A1 | 11/1995 |
| DE | 4236097 C2 | 10/1996 |
| DE | 19619597 A1 | 11/1997 |
| DE | 102005037762 B3 | 9/2006 |
| DE | 102011103783 A1 | 12/2012 |
| DE | 102012112818 A1 | 6/2014 |
| DE | 202015104597 U1 | 7/2016 |
| DE | 102020121462 B3 | 1/2022 |
| DK | 9600118 | 11/1996 |
| EP | 0032138 A2 * | 6/1981 ............. A61F 5/453 |
| EP | 0066070 B1 | 12/1982 |
| EP | 0068712 A1 | 1/1983 |
| EP | 0140470 A1 | 5/1985 |
| EP | 0220962 A1 | 5/1987 |
| EP | 0140471 B1 | 5/1988 |
| EP | 0274753 A2 | 7/1988 |
| EP | 0119143 B1 | 11/1988 |
| EP | 0483592 A1 | 5/1992 |
| EP | 0483730 A1 | 5/1992 |
| EP | 0610638 A1 | 8/1994 |
| EP | 0613355 A1 | 9/1994 |
| EP | 0613355 B1 | 1/1997 |
| EP | 0787472 A1 | 8/1997 |
| EP | 0966936 A1 | 12/1999 |
| EP | 0987293 A1 | 3/2000 |
| EP | 1063953 A1 | 1/2001 |
| EP | 0653928 B1 | 10/2002 |
| EP | 1332738 A1 | 8/2003 |
| EP | 1382318 A1 | 1/2004 |
| EP | 1089684 B1 | 10/2004 |
| EP | 1616542 A1 | 1/2006 |
| EP | 1382318 B1 | 5/2006 |
| EP | 1063953 B1 | 1/2007 |
| EP | 1658831 B1 | 1/2008 |
| EP | 1872752 A1 | 1/2008 |
| EP | 2180907 A1 | 5/2010 |
| EP | 2380532 A1 | 10/2011 |
| EP | 2389908 A1 | 11/2011 |
| EP | 2601916 A1 | 6/2013 |
| EP | 2676643 A1 | 12/2013 |
| EP | 2997950 A2 | 3/2016 |
| EP | 2879534 B1 | 3/2017 |
| EP | 3424471 A1 | 1/2019 |
| EP | 3169292 B1 | 11/2019 |
| EP | 3753492 A1 | 12/2020 |
| EP | 3788992 A1 | 3/2021 |
| EP | 3576689 B1 | 3/2022 |
| EP | 3752110 B1 | 3/2022 |
| EP | 3787570 B1 | 3/2022 |
| EP | 4025163 A1 | 7/2022 |
| EP | 3463180 B1 | 3/2023 |
| EP | 3569205 B1 | 6/2023 |
| EP | 4382082 A2 | 6/2024 |
| EP | 4445881 A2 | 10/2024 |
| EP | 4464288 A2 | 11/2024 |
| EP | 4527361 A2 | 3/2025 |
| FR | 2826704 A1 | 1/2003 |
| GB | 871820 A | 7/1961 |
| GB | 873045 A | 7/1961 |
| GB | 1011517 A | 12/1965 |
| GB | 1467144 A | 3/1977 |
| GB | 2106395 A | 4/1983 |
| GB | 2106784 A | 4/1983 |
| GB | 2148126 A | 5/1985 |
| GB | 2181953 A * | 10/1985 ............... A61F 5/43 |
| GB | 2171315 A | 8/1986 |
| GB | 2148126 B | 7/1987 |
| GB | 2191095 A | 12/1987 |
| GB | 2199750 A | 7/1988 |
| GB | 2260907 A | 5/1993 |
| GB | 2462267 A | 2/2010 |
| GB | 2469496 A | 10/2010 |
| GB | 2490327 A | 10/2012 |
| GB | 2507318 A | 4/2014 |
| GB | 2612752 A | 5/2023 |
| IT | 201800009129 A1 | 4/2020 |
| JP | S498638 U | 1/1974 |
| JP | S5410596 A | 1/1979 |
| JP | S5410596 Y2 | 5/1979 |
| JP | S54155729 U | 10/1979 |
| JP | S55155618 A | 12/1980 |
| JP | S56152629 U | 11/1981 |
| JP | S57142534 U | 9/1982 |
| JP | S5888596 U | 6/1983 |
| JP | S58188016 U | 12/1983 |
| JP | S63107780 U | 7/1988 |
| JP | H0267530 A | 3/1990 |
| JP | H02103871 A | 4/1990 |
| JP | H02131422 A | 5/1990 |
| JP | H02131422 U | 11/1990 |
| JP | H0460220 A | 2/1992 |
| JP | H05123349 A | 5/1993 |
| JP | H05123350 A | 5/1993 |
| JP | H0626264 U | 4/1994 |
| JP | 3087938 B2 | 10/1995 |
| JP | H085630 A | 1/1996 |
| JP | H08508764 A | 9/1996 |
| JP | H1040141 A | 2/1998 |
| JP | H10225430 A | 8/1998 |
| JP | H11113946 A | 4/1999 |
| JP | H-11290365 A * | 10/1999 ........... A61F 13/471 |
| JP | 2000116690 A | 4/2000 |
| JP | 2000185068 A | 7/2000 |
| JP | 2000225139 A | 8/2000 |
| JP | 2001054531 | 2/2001 |
| JP | 2001070331 A | 3/2001 |
| JP | 2001224616 A | 8/2001 |

(56) References Cited

FOREIGN PATENT DOCUMENTS

| | | | |
|---|---|---|---|
| JP | 2001276107 A | 10/2001 |
| JP | 2001276108 A | 10/2001 |
| JP | 2002028173 A | 1/2002 |
| JP | 2003038563 A | 2/2003 |
| JP | 2003505152 A | 2/2003 |
| JP | 2003126242 A | 5/2003 |
| JP | 2003180722 A | 7/2003 |
| JP | 2003528691 A | 9/2003 |
| JP | 2004057578 A | 2/2004 |
| JP | 2004130056 A | 4/2004 |
| JP | 2004267530 A | 9/2004 |
| JP | 2005052219 A | 3/2005 |
| JP | 2005066011 A | 3/2005 |
| JP | 2005066325 A | 3/2005 |
| JP | 2005102978 A | 4/2005 |
| JP | 2005518237 A | 6/2005 |
| JP | 2005518901 A | 6/2005 |
| JP | 3749097 B2 | 12/2005 |
| JP | 2006026108 A | 2/2006 |
| JP | 3123547 B2 | 6/2006 |
| JP | 2006136492 A | 6/2006 |
| JP | 2006204868 A | 8/2006 |
| JP | 2007044494 A | 2/2007 |
| JP | 3132659 B2 | 5/2007 |
| JP | 2007209687 A | 8/2007 |
| JP | 2007259898 A | 10/2007 |
| JP | 4039641 B2 | 11/2007 |
| JP | 2008005975 A | 1/2008 |
| JP | 2009509570 A | 3/2009 |
| JP | 2009165887 A | 7/2009 |
| JP | 2009525776 A | 7/2009 |
| JP | 2010504150 A | 2/2010 |
| JP | 2010058795 A | 3/2010 |
| JP | 2010081981 A | 4/2010 |
| JP | 2010166954 A | 8/2010 |
| JP | 4640772 B2 | 12/2010 |
| JP | 2010536439 A | 12/2010 |
| JP | 2011500225 A | 1/2011 |
| JP | 2011030962 A | 2/2011 |
| JP | 4747166 B2 | 5/2011 |
| JP | 2011087823 A | 5/2011 |
| JP | 4801218 B1 | 8/2011 |
| JP | 2011218130 A | 11/2011 |
| JP | 2011224070 A | 11/2011 |
| JP | 3175719 U | 4/2012 |
| JP | 2012523869 A | 10/2012 |
| JP | 2013238608 A | 11/2013 |
| JP | 2014521960 A | 8/2014 |
| JP | 2015092945 A | 5/2015 |
| JP | 2015513678 A | 5/2015 |
| JP | 3198994 B2 | 7/2015 |
| JP | 2015221390 A | 12/2015 |
| JP | 2016521191 A | 7/2016 |
| JP | 2017014698 A | 1/2017 |
| JP | 2017070400 A | 4/2017 |
| JP | 2017512603 A | 5/2017 |
| JP | 2017201272 A | 11/2017 |
| JP | 2019010375 A | 1/2019 |
| JP | 2019076342 A | 5/2019 |
| JP | 2019525811 A | 9/2019 |
| JP | 2019170942 A | 10/2019 |
| JP | 2019533492 A | 11/2019 |
| JP | 2020520775 A | 7/2020 |
| JP | 2021007472 A | 1/2021 |
| JP | 2021120686 A | 8/2021 |
| JP | 2021522009 A | 8/2021 |
| JP | 2021522013 A | 8/2021 |
| JP | 7129493 B2 | 8/2022 |
| JP | 2023532132 A | 7/2023 |
| KR | 200290061 Y1 | 9/2002 |
| KR | 20030047451 A | 6/2003 |
| KR | 20080005516 A | 1/2008 |
| KR | 20090072069 A | 7/2009 |
| KR | 20090104426 A | 10/2009 |
| KR | 20090110359 A | 10/2009 |
| KR | 20120005922 A | 1/2012 |
| KR | 20140039485 A | 4/2014 |
| KR | 101432639 B1 | 8/2014 |
| KR | 20180106659 A | 10/2018 |
| KR | 20180108774 A | 10/2018 |
| KR | 20230034343 A | 3/2023 |
| PT | 2068717 E | 6/2013 |
| SE | 505542 C2 | 9/1997 |
| WO | 8101957 A1 | 7/1981 |
| WO | 8804558 A1 | 6/1988 |
| WO | 9104714 A2 | 4/1991 |
| WO | 9104714 A3 | 6/1991 |
| WO | 9220299 A3 | 2/1993 |
| WO | 9303690 A1 | 3/1993 |
| WO | 9307839 A1 | 4/1993 |
| WO | 9309736 A2 | 5/1993 |
| WO | 9309736 A3 | 6/1993 |
| WO | 9514448 A2 | 6/1995 |
| WO | 9600096 A1 | 1/1996 |
| WO | 9634636 A1 | 11/1996 |
| WO | 9817211 A1 | 4/1998 |
| WO | 9830336 A1 | 7/1998 |
| WO | 0000112 A1 | 1/2000 |
| WO | 0000113 A1 | 1/2000 |
| WO | 0025651 A1 | 5/2000 |
| WO | 0033773 A1 | 6/2000 |
| WO | 0057784 A1 | 10/2000 |
| WO | 0069377 A1 | 11/2000 |
| WO | 0079497 A1 | 12/2000 |
| WO | 0145618 A1 | 6/2001 |
| WO | 0145621 A1 | 6/2001 |
| WO | 02094160 A1 | 11/2002 |
| WO | 03013967 A1 | 2/2003 |
| WO | 03024824 A1 | 3/2003 |
| WO | 03055423 A1 | 7/2003 |
| WO | 03071931 A2 | 9/2003 |
| WO | 03079942 A1 | 10/2003 |
| WO | 03071931 A3 | 2/2004 |
| WO | 2004019836 A1 | 3/2004 |
| WO | 2004024046 A1 | 3/2004 |
| WO | 2004026195 A1 | 4/2004 |
| WO | 2005051252 A1 | 6/2005 |
| WO | 2005060558 A2 | 7/2005 |
| WO | 2005074571 A3 | 9/2005 |
| WO | 2005089687 A2 | 9/2005 |
| WO | 2005107661 A2 | 11/2005 |
| WO | 2006021220 A1 | 3/2006 |
| WO | 2006037140 A1 | 4/2006 |
| WO | 2007005851 A2 | 1/2007 |
| WO | 2007007845 A1 | 1/2007 |
| WO | 2007042823 A2 | 4/2007 |
| WO | 2007055651 A1 | 5/2007 |
| WO | 2006098950 A3 | 11/2007 |
| WO | 2007134608 A2 | 11/2007 |
| WO | 2007128156 A3 | 2/2008 |
| WO | 2008026106 A2 | 3/2008 |
| WO | 2008078117 A1 | 7/2008 |
| WO | 2008104019 A1 | 9/2008 |
| WO | 2008141471 A1 | 11/2008 |
| WO | 2009004368 A1 | 1/2009 |
| WO | 2009004369 A1 | 1/2009 |
| WO | 2009052496 A1 | 4/2009 |
| WO | 2009052502 A1 | 4/2009 |
| WO | 2009007702 A4 | 7/2009 |
| WO | 2009101738 A1 | 8/2009 |
| WO | 2010058192 A1 | 5/2010 |
| WO | 2010030122 A3 | 7/2010 |
| WO | 2010101915 A3 | 1/2011 |
| WO | 2011018132 A1 | 2/2011 |
| WO | 2011018133 A1 | 2/2011 |
| WO | 2011024864 A1 | 3/2011 |
| WO | 2011054118 A1 | 5/2011 |
| WO | 2011079132 A1 | 6/2011 |
| WO | 2011107972 A1 | 9/2011 |
| WO | 2011108972 A1 | 9/2011 |
| WO | 2011117292 A1 | 9/2011 |
| WO | 2011123219 A1 | 10/2011 |
| WO | 2011132043 A1 | 10/2011 |
| WO | 2012012908 A1 | 2/2012 |

(56) References Cited

FOREIGN PATENT DOCUMENTS

| | | |
|---|---|---|
| WO | 2012020506 A1 | 2/2012 |
| WO | 2012065274 A1 | 5/2012 |
| WO | 2012097462 A1 | 7/2012 |
| WO | 2012098796 A1 | 7/2012 |
| WO | 2012101288 A1 | 8/2012 |
| WO | 2012175916 A1 | 12/2012 |
| WO | 2013018435 A1 | 2/2013 |
| WO | 2013033429 A1 | 3/2013 |
| WO | 2013055434 A1 | 4/2013 |
| WO | 2013082397 A1 | 6/2013 |
| WO | 2013103291 A2 | 7/2013 |
| WO | 2013131109 A1 | 9/2013 |
| WO | 2013167478 A1 | 11/2013 |
| WO | 2013177716 A1 | 12/2013 |
| WO | 2014041534 A1 | 3/2014 |
| WO | 2014046420 A1 | 3/2014 |
| WO | 2014118518 A1 | 8/2014 |
| WO | 2014160852 A1 | 10/2014 |
| WO | 2015023599 A1 | 2/2015 |
| WO | 2015052348 A1 | 4/2015 |
| WO | 2015068384 A1 | 5/2015 |
| WO | 2015169403 A1 | 11/2015 |
| WO | 2015170307 A1 | 11/2015 |
| WO | 2015197462 A1 | 12/2015 |
| WO | 2016051385 A1 | 4/2016 |
| WO | 2016055989 A1 | 4/2016 |
| WO | 2016071894 A1 | 5/2016 |
| WO | 2016103242 A1 | 6/2016 |
| WO | 2016116915 A1 | 7/2016 |
| WO | 2016124203 A1 | 8/2016 |
| WO | 2016139448 A1 | 9/2016 |
| WO | 2016166562 A1 | 10/2016 |
| WO | 2016167535 A1 | 10/2016 |
| WO | 2016191574 A1 | 12/2016 |
| WO | 2016200088 A1 | 12/2016 |
| WO | 2016200361 A1 | 12/2016 |
| WO | 2016204731 A1 | 12/2016 |
| WO | 2017001532 A2 | 1/2017 |
| WO | 2017001846 A1 | 1/2017 |
| WO | 2017075226 A1 | 5/2017 |
| WO | 2017152198 A1 | 9/2017 |
| WO | 2017153357 A1 | 9/2017 |
| WO | 2017162559 A1 | 9/2017 |
| WO | 2017205446 A1 | 11/2017 |
| WO | 2017209779 A1 | 12/2017 |
| WO | 2017210524 A1 | 12/2017 |
| WO | 2018022414 A1 | 2/2018 |
| WO | 2018044781 A1 | 3/2018 |
| WO | 2018056953 A1 | 3/2018 |
| WO | 2018090550 A1 | 5/2018 |
| WO | 2018138513 A1 | 8/2018 |
| WO | 2018144318 A1 | 8/2018 |
| WO | 2018144463 A1 | 8/2018 |
| WO | 2018150263 A1 | 8/2018 |
| WO | 2018150268 A1 | 8/2018 |
| WO | 2018152156 A1 | 8/2018 |
| WO | 2018183791 A1 | 10/2018 |
| WO | 2018150267 A3 | 11/2018 |
| WO | 2018235026 A1 | 12/2018 |
| WO | 2018235065 A1 | 12/2018 |
| WO | 2019004404 A1 | 1/2019 |
| WO | 2019041005 A1 | 3/2019 |
| WO | 2019044217 A1 | 3/2019 |
| WO | 2019044218 A1 | 3/2019 |
| WO | 2019044219 A1 | 3/2019 |
| WO | 2019050959 A1 | 3/2019 |
| WO | 2019065541 A1 | 4/2019 |
| WO | 2019096845 A1 | 5/2019 |
| WO | 2019150385 A1 | 8/2019 |
| WO | 2019161094 A1 | 8/2019 |
| WO | 2019188566 A1 | 10/2019 |
| WO | 2019190593 A1 | 10/2019 |
| WO | 2019212949 A1 | 11/2019 |
| WO | 2019212950 A1 | 11/2019 |
| WO | 2019212951 A1 | 11/2019 |
| WO | 2019212952 A1 | 11/2019 |
| WO | 2019212954 A1 | 11/2019 |
| WO | 2019212955 A1 | 11/2019 |
| WO | 2019212956 A1 | 11/2019 |
| WO | 2019214787 A1 | 11/2019 |
| WO | 2019214788 A1 | 11/2019 |
| WO | 2019226826 A1 | 11/2019 |
| WO | 2019239433 A1 | 12/2019 |
| WO | 2020000994 A1 | 1/2020 |
| WO | 2020020618 A1 | 1/2020 |
| WO | 2020033752 A1 | 2/2020 |
| WO | 2020038822 A1 | 2/2020 |
| WO | 2020088409 A1 | 5/2020 |
| WO | 2020049394 A3 | 6/2020 |
| WO | 2020120657 A1 | 6/2020 |
| WO | 2020152575 A1 | 7/2020 |
| WO | 2020182923 A1 | 9/2020 |
| WO | 2020204967 A1 | 10/2020 |
| WO | 2020205939 A1 | 10/2020 |
| WO | 2020209898 A1 | 10/2020 |
| WO | 2020242790 A1 | 12/2020 |
| WO | 2020251893 A1 | 12/2020 |
| WO | 2020256865 A1 | 12/2020 |
| WO | 2021007144 A1 | 1/2021 |
| WO | 2021007345 A1 | 1/2021 |
| WO | 2021010844 A1 | 1/2021 |
| WO | 2021016026 A1 | 1/2021 |
| WO | 2021016056 A1 | 1/2021 |
| WO | 2021016300 A1 | 1/2021 |
| WO | 2021025919 A1 | 2/2021 |
| WO | 2021034886 A1 | 2/2021 |
| WO | 2021041123 A1 | 3/2021 |
| WO | 2021046501 A1 | 3/2021 |
| WO | 2021086868 A1 | 5/2021 |
| WO | 2021094352 A1 | 5/2021 |
| WO | 2021094639 A1 | 5/2021 |
| WO | 2021097067 A1 | 5/2021 |
| WO | 2021102296 A1 | 5/2021 |
| WO | 2021107025 A1 | 6/2021 |
| WO | 2021138411 A1 | 7/2021 |
| WO | 2021138414 A1 | 7/2021 |
| WO | 2021154686 A1 | 8/2021 |
| WO | 2021155206 A1 | 8/2021 |
| WO | 2021170075 A1 | 9/2021 |
| WO | 2021173436 A1 | 9/2021 |
| WO | 2021188817 A1 | 9/2021 |
| WO | 2021195384 A1 | 9/2021 |
| WO | 2021205995 A1 | 10/2021 |
| WO | 2021207621 A1 | 10/2021 |
| WO | 2021211568 A1 | 10/2021 |
| WO | 2021211801 A1 | 10/2021 |
| WO | 2021211914 A1 | 10/2021 |
| WO | 2021216419 A1 | 10/2021 |
| WO | 2021216422 A1 | 10/2021 |
| WO | 2021231532 A1 | 11/2021 |
| WO | 2021247523 A1 | 12/2021 |
| WO | 2021257202 A1 | 12/2021 |
| WO | 2022006256 A1 | 1/2022 |
| WO | 2022029662 A1 | 2/2022 |
| WO | 2022031943 A1 | 2/2022 |
| WO | 2022035745 A1 | 2/2022 |
| WO | 2022051220 A1 | 3/2022 |
| WO | 2022051360 A1 | 3/2022 |
| WO | 2022054613 A1 | 3/2022 |
| WO | 2022066704 A1 | 3/2022 |
| WO | 2022067392 A1 | 4/2022 |
| WO | 2022069950 A1 | 4/2022 |
| WO | 2022071429 A1 | 4/2022 |
| WO | 2022076322 A1 | 4/2022 |
| WO | 2022076427 A2 | 4/2022 |
| WO | 2022086898 A1 | 4/2022 |
| WO | 2022090199 A1 | 5/2022 |
| WO | 2022098536 A1 | 5/2022 |
| WO | 2022099087 A1 | 5/2022 |
| WO | 2022101999 A1 | 5/2022 |
| WO | 2022115692 A1 | 6/2022 |
| WO | 2022125685 A1 | 6/2022 |
| WO | 2022140545 A1 | 6/2022 |
| WO | 2022145231 A1 | 7/2022 |

(56) References Cited

FOREIGN PATENT DOCUMENTS

| WO | 2022150290 A1 | 7/2022 |
|---|---|---|
| WO | 2022150360 A1 | 7/2022 |
| WO | 2022150463 A1 | 7/2022 |
| WO | 2022159392 A1 | 7/2022 |
| WO | 2022170182 A1 | 8/2022 |
| WO | 2022173803 A1 | 8/2022 |
| WO | 2022182385 A1 | 9/2022 |
| WO | 2022187152 A1 | 9/2022 |
| WO | 2022192188 A1 | 9/2022 |
| WO | 2022192347 A1 | 9/2022 |
| WO | 2022204000 A1 | 9/2022 |
| WO | 2022216507 A1 | 10/2022 |
| WO | 2022216776 A1 | 10/2022 |
| WO | 2022222030 A1 | 10/2022 |
| WO | 2022251184 A1 | 12/2022 |
| WO | 2022251425 A1 | 12/2022 |
| WO | 2022271783 A1 | 12/2022 |
| WO | 2023286058 A1 | 1/2023 |
| WO | 2023014639 A1 | 2/2023 |
| WO | 2023014641 A1 | 2/2023 |
| WO | 2023018475 A2 | 2/2023 |
| WO | 2023018656 A1 | 2/2023 |
| WO | 2023018657 A1 | 2/2023 |
| WO | 2023023777 A1 | 3/2023 |
| WO | 2023034139 A1 | 3/2023 |
| WO | 2023034453 A1 | 3/2023 |
| WO | 2023038945 A1 | 3/2023 |
| WO | 2023038950 A1 | 3/2023 |
| WO | 2023049109 A1 | 3/2023 |
| WO | 2023049156 A1 | 3/2023 |
| WO | 2023049175 A1 | 3/2023 |
| WO | 2023086394 A1 | 5/2023 |
| WO | 2023149884 A1 | 8/2023 |
| WO | 2023149902 A1 | 8/2023 |
| WO | 2023149903 A1 | 8/2023 |
| WO | 2023154390 A1 | 8/2023 |
| WO | 2023163725 A1 | 8/2023 |
| WO | 2023191764 A1 | 10/2023 |
| WO | 2023244238 A1 | 12/2023 |
| WO | 2024043871 A1 | 2/2024 |
| WO | 2024058788 A1 | 3/2024 |
| WO | 2024253655 A1 | 12/2024 |
| WO | 2025034959 A1 | 2/2025 |
| WO | 2025038087 A1 | 2/2025 |
| WO | 2025038088 A1 | 2/2025 |
| WO | 2025071622 A1 | 4/2025 |

OTHER PUBLICATIONS

Advisory Action for U.S. Appl. No. 14/722,613 mailed Mar. 4, 2019.
Corrected Notice of Allowability for U.S. Application No. 15/221,106 mailed Jul. 2, 2019.
Final Office Action for U.S. Appl. No. 14/722,613 mailed on Nov. 29, 2018.
Final Office Action for U.S. Appl. No. 14/952,591 mailed Nov. 1, 2019.
Final Office Action for U.S. Appl. No. 15/171,968 mailed Feb. 14, 2020.
Final Office Action for U.S. Appl. No. 29/624,661 mailed Feb. 18, 2020.
International Search Report and Written Opinion from International Application No. PCT/US2019/029608 mailed Sep. 3, 2019.
International Search Report and Written Opinion from International Application No. PCT/US2019/029609 mailed Sep. 3, 2019.
International Search Report and Written Opinion from International Application No. PCT/US2019/029610 mailed Sep. 3, 2019.
International Search Report and Written Opinion from International Application No. PCT/US2019/029611 mailed Jul. 3, 2019.
International Search Report and Written Opinion from International Application No. PCT/US2019/029613 mailed Jul. 3, 2019.
International Search Report and Written Opinion from International Application No. PCT/US2019/029614 mailed Sep. 26, 2019.
International Search Report and Written Opinion from International Application No. PCT/US2019/029616 mailed Aug. 30, 2019.
Issue Notification for U.S. Application No. 15/221, 106 mailed Jul. 24, 2019.
Issue Notification for U.S. Appl. No. 15/238,427 mailed Jul. 24, 2019.
Issue Notification for U.S. Application No. 15/260, 103 mailed Aug. 7, 2019.
Non-Final Office Action for U.S. Appl. No. 14/592,591 mailed Mar. 20, 2020.
Non-Final Office Action for U.S. Appl. No. 14/722,613 mailed Jun. 13, 2019.
Non-Final Office Action for U.S. Appl. No. 14/952,591 mailed Mar. 20, 2020.
Non-Final Office Action for U.S. Appl. No. 15/171,968 mailed on Aug. 20, 2019.
Non-Final Office Action for U.S. Appl. No. 15/612,325 mailed Mar. 19, 2020.
Non-Final Office Action for U.S. Appl. No. 29/624,661 mailed Jul. 18, 2019.
Notice of Allowance for U.S. Application No. 15/260, 103 mailed Jun. 7, 2019.
U.S. Appl. No. 16/433,773, filed Jun. 6, 2019.
U.S. Appl. No. 16/449,039, filed Jun. 21, 2019.
U.S. Appl. No. 16/452,145, filed Jun. 25, 2019.
U.S. Appl. No. 16/452,258, filed Jun. 25, 2019.
U.S. Appl. No. 16/478,180, filed Jul. 16, 2019.
U.S. Appl. No. 62/452,437, filed Jan. 31, 2017.
U.S. Appl. No. 62/994,912, filed Mar. 26, 2020.
Defendant and Counterclaim Plaintiff Sage Products, LLC's Answer, Defenses, and Counterclaims to Plaintiff's Amended Complaint, Nov. 1, 2019.
Advisory Action for U.S. Appl. No. 14/952,591 mailed Jun. 1, 2018.
Advisory Action for U.S. Appl. No. 15/238,427 mailed Apr. 10, 2019.
AMXDmax In-Flight Bladder Relief; Omni Medical 2015; Omni Medical Systems, Inc.
Corrected International Search Report and Written Opinion for International Application No. PCT/US2017/043025 mailed Jan. 11, 2018.
Final Office Action for U.S. Appl. No. 14/947,759 mailed Apr. 8, 2016.
Final Office Action for U.S. Appl. No. 14/952,591 mailed Feb. 23, 2018.
Final Office Action for U.S. Appl. No. 15/171,968 mailed Mar. 19, 2019.
Final Office Action for U.S. Appl. No. 15/221,106 mailed Jan. 23, 2019.
Final Office Action for U.S. Appl. No. 15/238,427 mailed Jan. 2, 2019.
Final Office Action for U.S. Appl. No. 15/260,103 mailed Feb. 14, 2019.
International Search Report and Written Opinion for International Application No. PCT/US2017/043025 mailed Oct. 18, 2017.
International Search Report and Written Opinion for International Application No. PCT/US2018/015968 mailed Apr. 6, 2018.
International Search Report and Written Opinion for International Patent Application No. PCT/US16/49274, mailed Dec. 1, 2016.
International Search Report and Written Opinion for International Patent Application No. PCT/US2017/035625, mailed Aug. 15, 2017.
Issue Notification for U.S. Appl. No. 15/611,587 mailed Feb. 20, 2019.
Non-Final Office Action for U.S. Appl. No. 14/947,759, mailed Mar. 17, 2016.
Non-Final Office Action for U.S. Appl. No. 14/952,591 mailed Aug. 1, 2017.
Non-Final Office Action for U.S. Appl. No. 14/952,591 mailed Mar. 21, 2019.
Non-Final Office Action for U.S. Appl. No. 14/952,591 mailed Sep. 28, 2018.
Non-Final Office Action for U.S. Appl. No. 15/171,968 mailed Jun. 12, 2018.

(56) References Cited

OTHER PUBLICATIONS

Non-Final Office Action for U.S. Appl. No. 15/221,106 mailed Jun. 5, 2018.
Non-Final Office Action for U.S. Appl. No. 15/238,427 mailed Aug. 8, 2018.
Non-Final Office Action for U.S. Appl. No. 15/260,103 mailed Sep. 26, 2018.
Non-Final Office Action for U.S. Appl. No. 15/611,587 mailed Jul. 13, 2018.
Non-Final Office Action for U.S. Appl. No. 15/611,587 mailed Dec. 29, 2017.
Notice of Allowance for U.S. Appl. No. 15/221,106 mailed May 1, 2019.
Notice of Allowance for U.S. Appl. No. 15/238,427 mailed May 23, 2019.
Notice of Allowance for U.S. Appl. No. 15/611,587 mailed Dec. 21, 2018.
U.S. Appl. No. 15/171,968, filed Jun. 2, 2016.
U.S. Appl. No. 15/221,106 filed Jul. 27, 2016.
U.S. Appl. No. 15/260,103, filed Sep. 8, 2016.
U.S. Appl. No. 15/611,587, filed Jun. 1, 2017.
U.S. Appl. No. 15/612,325, filed Jun. 2, 2017.
U.S. Appl. No. 16/369,676, filed Mar. 29, 2019.
U.S. Appl. No. 62/665,297, filed May 1, 2018.
U.S. Appl. No. 62/665,302, filed May 1, 2018.
U.S. Appl. No. 62/665,317, filed May 1, 2018.
U.S. Appl. No. 62/665,321, filed May 1, 2018.
U.S. Appl. No. 62/665,331, filed May 1, 2018.
U.S. Appl. No. 62/665,335, filed May 1, 2018.
"Male Urinary Pouch External Collection Device", http://www.hollister.com/en/products/Continence-Care-Products/Urine-Collectors/Urine-Collection-Accessories/Male-Urinary-Pouch-External-Collection-Device, last accessed Feb. 12, 2018.
"Step by Step How Ur24 WorksHome", http://medicalpatentur24.com, last accessed Dec. 6, 2017, Aug. 30, 2017, 4 pages.
Parmar, "10 Finalists Chosen for Dare-to-Dream Medtech Design Challenge (PureWick)," Design Services, Nov. 10, 2014 (3 pages),.
PureWick, "Incontinence Relief for Women" Presentation, (7 pages), Sep. 23, 2015.
Pytlik, "Super Absorbent Polymers," University of Buffalo http://www.courses.sens.buffalo.edu/ce435/Diapers/Diapers.html, accessed on Feb. 17, 2017.
Corrected Notice of Allowability for U.S. Appl. No. 15/612,325 mailed Mar. 17, 2021.
Final Office Action for U.S. Appl. No. 14/952,591 mailed Nov. 27, 2020.
Final Office Action for U.S. Appl. No. 15/612,325 mailed Sep. 17, 2020.
Final Office Action for U.S. Appl. No. 16/904,868 mailed Mar. 26, 2021.
Issue Notification for U.S. Appl. No. 15/171,968 mailed Mar. 3, 2021.
Issue Notification for U.S. Appl. No. 15/612,325 mailed Mar. 24, 2021.
Non-Final Office Action for U.S. Appl. No. 15/171,968 mailed May 11, 2020.
Non-Final Office Action for U.S. Appl. No. 16/899,956 mailed Oct. 16, 2020.
Non-Final Office Action for U.S. Appl. No. 16/904,868 mailed Nov. 25, 2020.
Non-Final Office Action for U.S. Appl. No. 16/905,400 mailed Dec. 2, 2020.
Non-Final Office Action for U.S. Appl. No. 17/088,272 mailed Jan. 25, 2021.
Non-Final Office Action for U.S. Appl. No. 29/694,002 mailed Jun. 24, 2020.
Notice of Allowance for U.S. Appl. No. 15/171,968 mailed Feb. 16, 2021.
Notice of Allowance for U.S. Appl. No. 15/171,968 mailed Nov. 6, 2020.
Notice of Allowance for U.S. Appl. No. 15/612,325 mailed Feb. 19, 2021.
Notice of Allowance for U.S. Appl. No. 15/612,325 mailed Jan. 21, 2021.
Notice of Allowance for U.S. Appl. No. 29/624,661 mailed Jul. 10, 2020.
Notice of Allowance for U.S. Appl. No. 29/624,661 mailed May 14, 2020.
Notice of Allowance for U.S. Appl. No. 29/624,661 mailed Sep. 29, 2020.
Notice of Allowance for U.S. Appl. No. 29/694,002 mailed Jan. 29, 2021.
Notice of Allowance for U.S. Appl. No. 29/694,002 mailed Oct. 16, 2020.
Notice to File Missing Parts for U.S. Appl. No. 17/179,116 mailed Mar. 3, 2021.
U.S. Appl. No. 16/904,868, filed Jun. 18, 2020.
U.S. Appl. No. 16/905,400, filed Jun. 18, 2020.
U.S. Appl. No. 17/051,550, filed Oct. 29, 2020.
U.S. Appl. No. 17/051,554, filed Oct. 29, 2020.
U.S. Appl. No. 17/051,585, filed Oct. 29, 2020.
U.S. Appl. No. 17/051,600, filed Oct. 29, 2020.
U.S. Appl. No. 17/088,272, filed Nov. 3, 2020.
U.S. Appl. No. 17/179,116, filed Feb. 18, 2021.
Memorandum Order, Feb. 2021, 14 pgs.
Sage's Initial Invalidity Contentions Regarding U.S. Pat. Nos. 8,287,508; 10,226,375; and 10,390,989, May 29, 2020, 193 pages.
Sage's Supplemental and Initial Invalidity Contentions Regarding U.S. Pat. Nos. 8,287,508; 10,226,375; 10,390,989 and Initial Invalidity Contentions Regarding U.S. Pat. No. 10,376,407, Aug. 21, 2020, 277 pages.
Sage's Second Supplemental Invalidity Contentions Regarding U.S. Pat. Nos. 8,287,508, 10,226,375, 10,390,989, and 10,376,407, 292 pages.
Excerpts from the 508 (U.S. Pat. No. 8,278,508) Patent's Prosecution History, 2020, 99 pages.
Plaintiff's Opening Claim Construction Brief, Case No. 19-1508-MN, Oct. 16, 2020, 26 pages.
Plaintiff's Identification of Claim Terms and Proposed Constructions, Case No. 19-1508-MN, 3 pages.
PureWick's Response to Interrogatory No. 9 in *PureWick, LLC* v. *Sage Products, LLC*, Case No. 19-1508-MN, Mar. 23, 2020, 6 pages.
Sage's Preliminary Identification of Claim Elements and Proposed Constructions for U.S. Pat. Nos. 8,287,508, 10,226,376, 10,390,989 and 10,376,407, Case No. 19-1508-MN, 7 pages.
Decision Granting Institution of Inter Partes Review for U.S. Pat. No. 8,287,508, Case No. 2020-01426, Feb. 17, 2021, 39 pages.
Corrected Certificate of Service, Case No. IPR2020-01426, U.S. Pat. No. 8,287,508, 2020, 2 pages.
Declaration of Diane K. Newman Curriculum Vitae, Petition for Interparties Review, 2020, pp. 1-199.
"3 Devices Take Top Honors in Dare-To-Dream Medtech Design Contest", R+D Digest, Nov. 2013, 1 page.
"Advanced Mission Extender Device (AMDX) Products", Omni Medical Systems, Inc., 15 pages.
"AMXD Control Starter Kit Brochure", https://www.omnimedicalsys.com/index.php?page=products, Omni Medical, 8 pages.
"AMXDX—Advanced Mission Extender Device Brochure", Omni Medical, Omni Brochure—http://www.omnimedicalsys.com/uploads/AMXDFixedWing.pdf, 2 pages.
"How Period Panties Work", www.shethinx.com/pages/thinx-itworks, 2020, 10 pages.
"In Flight Bladder Relief", Omni Medical, Omni Presentation https://www.omnimedicalsys.com/uploads/AMXDmax_HSD.pdf, 14 pages.
"Research and Development Work Relating to Assistive Technology Jun. 2005", British Department of Health, Nov. 2006, 40 pages.
"Underwear that absorbs your period", Thinx!, https://www.shethinx.com/pages/thinx-it-works last accessed Jun. 24, 2020, 7 pages.
"User & Maintenance Guide", Omni Medical, 2007, 16 pages.

(56) References Cited

OTHER PUBLICATIONS

"Winners Announced for Dare-to-Dream Medtech Design Challenge", https://www.mddionline.com/design-engineering/winners-announced-dare-dream-medtech-design-challenge, MD&DI, 2014, 4 pages.
Hollister, Female Urinary and Pouch and Male Urinary Pouch Brochure, 2011, 1 page.
Hollister, "Retracted Penis Pouch by Hollister", Vitality Medical.com, https://www.vitalitymedical.com/hollister-retracted-penis-pouch.html last accessed Jun. 24, 2020, 6 pages.
Macaulay, et al., "A Noninvasive Continence Management System: Development and Evaluation of a Novel Toileting Device for Women", The Wound, Ostomy and Continence Nurses Society, vol. 34 No. 6, 2007, pp. 641-648.
Newman, et al., "The Urinary Incontinence Sourcebook", Petition for Interparties Review, 1997, 23 pages.
Newton, et al., "Measuring Safety, Effectiveness and Ease of Use of PureWick in the Management of Urinary Incontinence in Bedbound Women: Case Studies", Jan. 8, 2016, 11 pages.
Sachtman, "New Relief for Pilots? It Depends", Wired, https://www.wired.com/2008/05/pilot-relief/, 2008, 2 pages.
Advisory Action for U.S. Appl. No. 16/899,956 mailed Jul. 9, 2021.
Advisory Action for U.S. Appl. No. 16/904,868 mailed Jul. 2, 2021.
Advisory Action for U.S. Appl. No. 16/905,400 mailed Jun. 9, 2021.
Corrected Notice of Allowability for U.S. Appl. No. 17/330,657 mailed Dec. 9, 2021.
Final Office Action for U.S. Appl. No. 16/899,956 mailed Apr. 19, 2021.
Final Office Action for U.S. Appl. No. 16/905,400 mailed Apr. 6, 2021.
Final Office Action for U.S. Appl. No. 16/905,400 mailed Dec. 9, 2021.
Final Office Action for U.S. Appl. No. 17/088,272 mailed May 25, 2021.
International Search Report and Written Opinion from International Application No. PCT/US2020/023572 mailed Jul. 6, 2020.
International Search Report and Written Opinion from International Application No. PCT/US2020/033064 mailed Aug. 31, 2020.
International Search Report and Written Opinion from International Application No. PCT/US2020/033122 mailed Aug. 31, 2020.
International Search Report and Written Opinion from International Application No. PCT/US2020/040860 mailed Oct. 2, 2020.
International Search Report and Written Opinion from International Application No. PCT/US2020/041242 mailed Nov. 17, 2020.
International Search Report and Written Opinion from International Application No. PCT/US2020/041249 mailed Oct. 2, 2020.
International Search Report and Written Opinion from International Application No. PCT/US2020/042262 mailed Oct. 14, 2020.
International Search Report and Written Opinion from International Application No. PCT/US2020/043059 mailed Oct. 6, 2020.
International Search Report and Written Opinion from International Application No. PCT/US2020/044024 mailed Nov. 12, 2020.
International Search Report and Written Opinion from International Application No. PCT/US2020/046914 mailed Dec. 1, 2020.
International Search Report and Written Opinion from International Application No. PCT/US2020/055680 mailed Dec. 15, 2020.
International Search Report and Written Opinion from International Application No. PCT/US2020/061563 mailed Feb. 19, 2021.
International Search Report and Written Opinion from International Application No. PCT/US2020/065234 mailed Apr. 12, 2021.
International Search Report and Written Opinion from International Application No. PCT/US2020/067451 mailed Mar. 25, 2021.
International Search Report and Written Opinion from International Application No. PCT/US2020/067454 mailed Mar. 29, 2021.
International Search Report and Written Opinion from International Application No. PCT/US2020/067455 mailed Mar. 26, 2021.
International Search Report and Written Opinion from International Application No. PCT/US2021/015024 mailed May 18, 2021.
International Search Report and Written Opinion from International Application No. PCT/US2021/015787 mailed May 27, 2021.
International Search Report and Written Opinion from International Application No. PCT/US2021/023001 mailed Jun. 21, 2021.
International Search Report and Written Opinion from International Application No. PCT/US2021/024162 mailed Jul. 8, 2021.
International Search Report and Written Opinion from International Application No. PCT/US2021/027061 mailed Jul. 19, 2021.
International Search Report and Written Opinion from International Application No. PCT/US2021/027104 mailed Jul. 6, 2021.
International Search Report and Written Opinion from International Application No. PCT/US2021/027314 mailed Jul. 6, 2021.
International Search Report and Written Opinion from International Application No. PCT/US2021/027422 mailed Aug. 12, 2021.
International Search Report and Written Opinion from International Application No. PCT/US2021/027425 mailed Aug. 11, 2021.
International Search Report and Written Opinion from International Application No. PCT/US2021/027913 mailed Jul. 12, 2021.
International Search Report and Written Opinion from International Application No. PCT/US2021/027917 mailed Aug. 19, 2021.
International Search Report and Written Opinion from International Application No. PCT/US2021/035181 mailed Sep. 16, 2021.
International Search Report and Written Opinion from International Application No. PCT/US2021/043893 mailed Nov. 22, 2021.
International Search Report and Written Opinion from International Application No. PCT/US2021/044699 mailed Nov. 22, 2021.
International Search Report and Written Opinion from International Application No. PCT/US2021/047536 mailed Dec. 23, 2021.
International Search Report and Written Opinion from International Application No. PCT/US2021/048211 mailed Dec. 22, 2021.
Issue Notification for U.S. Appl. No. 14/952,591 mailed Jul. 28, 2021.
Issue Notification for U.S. Appl. No. 29/624,661 mailed Aug. 4, 2021.
Non-Final Office Action for U.S. Appl. No. 16/245,726 mailed Jan. 21, 2022.
Non-Final Office Action for U.S. Appl. No. 16/449,039 mailed Dec. 8, 2021.
Non-Final Office Action for U.S. Appl. No. 16/452,145 mailed Sep. 28, 2021.
Non-Final Office Action for U.S. Appl. No. 16/452,258 mailed Sep. 28, 2021.
Non-Final Office Action for U.S. Appl. No. 16/478,180 mailed Oct. 22, 2021.
Non-Final Office Action for U.S. Appl. No. 16/899,956 mailed Sep. 2, 2021.
Non-Final Office Action for U.S. Appl. No. 16/904,868 mailed Oct. 5, 2021.
Non-Final Office Action for U.S. Appl. No. 16/905,400 mailed Jul. 22, 2021.
Non-Final Office Action for U.S. Appl. No. 17/330,657 mailed Aug. 11, 2021.
Non-Final Office Action for U.S. Appl. No. 29/741,751 mailed Jan. 18, 2022.
Notice of Allowance for U.S. Appl. No. 14/952,591 mailed Apr. 5, 2021.
Notice of Allowance for U.S. Appl. No. 14/952,591 mailed Jul. 8, 2021.
Notice of Allowance for U.S. Appl. No. 16/899,956 mailed Dec. 29, 2021.
Notice of Allowance for U.S. Appl. No. 17/088,272 mailed Aug. 5, 2021.
Notice of Allowance for U.S. Appl. No. 17/088,272 mailed Nov. 24, 2021.
Notice of Allowance for U.S. Appl. No. 17/330,657 mailed Nov. 26, 2021.
Notice of Allowance for U.S. Appl. No. 29/624,661 mailed Apr. 28, 2021.
Notice of Allowance for U.S. Appl. No. 29/694,002 mailed Apr. 29, 2021.
Restriction Requirement for U.S. Appl. No. 16/478,180 mailed May 25, 2021.
U.S. Appl. No. 14/433,773, filed Apr. 3, 2020.
U.S. Appl. No. 14/625,469, filed Feb. 28, 2015.
U.S. Appl. No. 14/947,759, filed Nov. 20, 2015.

(56) References Cited

OTHER PUBLICATIONS

U.S. Appl. No. 14/952,591, filed Nov. 25, 2015.
U.S. Appl. No. 16/245,726, filed Jan. 11, 2019.
U.S. Appl. No. 17/330,657, filed May 26, 2021.
U.S. Appl. No. 17/378,015, filed Jul. 16, 2021.
U.S. Appl. No. 17/394,055, filed Aug. 4, 2021.
U.S. Appl. No. 17/412,864, filed Aug. 26, 2021.
U.S. Appl. No. 17/444,825, filed Aug. 10, 2021.
U.S. Appl. No. 17/446,256, filed Aug. 27, 2021.
U.S. Appl. No. 17/446,654, filed Sep. 1, 2021.
U.S. Appl. No. 17/447,123, filed Sep. 8, 2021.
U.S. Appl. No. 17/450,864, filed Oct. 14, 2021.
U.S. Appl. No. 17/451,345, filed Oct. 19, 2021.
U.S. Appl. No. 17/451,354, filed Oct. 19, 2021.
U.S. Appl. No. 17/453,260, filed Nov. 2, 2021.
U.S. Appl. No. 17/453,560, filed Nov. 4, 2021.
U.S. Appl. No. 17/461,036 mailed Aug. 30, 2021.
U.S. Appl. No. 17/494,578, filed Oct. 5, 2021.
U.S. Appl. No. 17/501,591, filed Oct. 14, 2021.
U.S. Appl. No. 17/595,747, filed Nov. 23, 2021.
U.S. Appl. No. 17/597,408, filed Jan. 5, 2022.
U.S. Appl. No. 17/597,673, filed Jan. 18, 2022.
U.S. Appl. No. 17/614,173, filed Nov. 24, 2021.
U.S. Appl. No. 17/631,619, filed Jan. 31, 2022.
U.S. Appl. No. 17/645,821, filed Dec. 23, 2021.
U.S. Appl. No. 17/646,771, filed Jan. 3, 2022.
U.S. Appl. No. 29/741,751, filed Jul. 15, 2020.
U.S. Appl. No. 61/955,537, filed Mar. 19, 2014.
U.S. Appl. No. 62/082,279, filed Nov. 20, 2014.
U.S. Appl. No. 62/084,078, filed Nov. 25, 2014.
U.S. Appl. No. 62/414,963, filed Oct. 31, 2016.
U.S. Appl. No. 62/485,578, filed Apr. 14, 2017.
U.S. Appl. No. 62/853,279, filed May 28, 2019.
U.S. Appl. No. 62/853,889 filed May 29, 2019.
U.S. Appl. No. 62/864,656, filed Jun. 21, 2019.
U.S. Appl. No. 62/873,045, filed Jul. 11, 2019.
U.S. Appl. No. 62/873,048, filed Jul. 11, 2019.
U.S. Appl. No. 62/876,500, filed Jul. 19, 2019.
U.S. Appl. No. 62/877,558, filed Jul. 23, 2019.
U.S. Appl. No. 62/883,172, filed Aug. 6, 2019.
U.S. Appl. No. 62/889,149, filed Aug. 20, 2019.
U.S. Appl. No. 62/935,337, filed Nov. 14, 2019.
U.S. Appl. No. 62/938,447, filed Nov. 21, 2019.
U.S. Appl. No. 62/949,187, filed Dec. 17, 2019.
U.S. Appl. No. 62/956,756, filed Jan. 3, 2020.
U.S. Appl. No. 62/956,767, filed Jan. 3, 2020.
U.S. Appl. No. 62/956,770, filed Jan. 3, 2020.
U.S. Appl. No. 62/967,977, filed Jan. 30, 2020.
U.S. Appl. No. 63/011,445, filed Apr. 17, 2020.
U.S. Appl. No. 63/011,487, filed Apr. 17, 2020.
U.S. Appl. No. 63/011,571, filed Apr. 17, 2020.
U.S. Appl. No. 63/011,657, filed Apr. 17, 2020.
U.S. Appl. No. 63/011,760, filed Apr. 17, 2020.
U.S. Appl. No. 63/012,347, filed Apr. 20, 2020.
U.S. Appl. No. 63/012,384, filed Apr. 20, 2020.
U.S. Appl. No. 63/030,685, filed May 27, 2020.
U.S. Appl. No. 63/033,310, filed Jun. 2, 2020.
U.S. Appl. No. 63/047,374, filed Jul. 2, 2020.
U.S. Appl. No. 63/061,241, filed Aug. 5, 2020.
U.S. Appl. No. 63/061,244, filed Aug. 5, 2020.
U.S. Appl. No. 63/061,834, filed Aug. 6, 2020.
U.S. Appl. No. 63/064,017, filed Aug. 11, 2020.
U.S. Appl. No. 63/064,126 filed Aug. 11, 2020.
U.S. Appl. No. 63/067,542, filed Aug. 19, 2020.
U.S. Appl. No. 63/071,438, filed Aug. 28, 2020.
U.S. Appl. No. 63/071,821, filed Aug. 28, 2020.
U.S. Appl. No. 63/073,545, filed Sep. 2, 2020.
U.S. Appl. No. 63/073,553, filed Sep. 2, 2020.
U.S. Appl. No. 63/074,051, filed Sep. 3, 2020.
U.S. Appl. No. 63/074,066, filed Sep. 3, 2020.
U.S. Appl. No. 63/076,032, filed Sep. 9, 2020.
U.S. Appl. No. 63/076,474, filed Sep. 10, 2020.
U.S. Appl. No. 63/076,477, filed Sep. 10, 2020.
U.S. Appl. No. 63/082,261, filed Sep. 23, 2020.
U.S. Appl. No. 63/088,506, filed Oct. 7, 2020.
U.S. Appl. No. 63/088,511, filed Oct. 7, 2020.
U.S. Appl. No. 63/088,539, filed Oct. 7, 2020.
U.S. Appl. No. 63/094,464, filed Oct. 21, 2020.
U.S. Appl. No. 63/094,498, filed Oct. 21, 2020.
U.S. Appl. No. 63/094,594, filed Oct. 21, 2020.
U.S. Appl. No. 63/094,608, filed Oct. 21, 2020.
U.S. Appl. No. 63/094,626, filed Oct. 21, 2020.
U.S. Appl. No. 63/109,066, filed Nov. 3, 2020.
U.S. Appl. No. 63/109,084, filed Nov. 3, 2020.
U.S. Appl. No. 63/112,417, filed Nov. 11, 2020.
U.S. Appl. No. 63/119,161, filed Nov. 30, 2020.
U.S. Appl. No. 63/124,271, filed Dec. 11, 2020.
U.S. Appl. No. 63/133,892, filed Jan. 5, 2021.
U.S. Appl. No. 63/134,287, filed Jan. 6, 2021.
U.S. Appl. No. 63/134,450, filed Jan. 6, 2021.
U.S. Appl. No. 63/134,631, filed Jan. 7, 2021.
U.S. Appl. No. 63/134,632, filed Jan. 7, 2021.
U.S. Appl. No. 63/134,754, filed Jan. 7, 2021.
U.S. Appl. No. 63/138,878, filed Jan. 19, 2021.
U.S. Appl. No. 63/146,946, filed Feb. 8, 2021.
U.S. Appl. No. 63/147,013, filed Feb. 8, 2021.
U.S. Appl. No. 63/147,299, filed Feb. 9, 2021.
U.S. Appl. No. 63/148,723, filed Feb. 12, 2021.
U.S. Appl. No. 63/154,248, filed Feb. 26, 2021.
U.S. Appl. No. 63/155,395, filed Mar. 2, 2021.
U.S. Appl. No. 63/157,007, filed Mar. 5, 2021.
U.S. Appl. No. 63/157,014, filed Mar. 5, 2021.
U.S. Appl. No. 63/159,142, filed Mar. 10, 2021.
U.S. Appl. No. 63/159,186, filed Mar. 10, 2021.
U.S. Appl. No. 63/159,210, filed Mar. 10, 2021.
U.S. Appl. No. 63/159,280, filed Mar. 10, 2021.
U.S. Appl. No. 63/165,273, filed Mar. 24, 2021.
U.S. Appl. No. 63/165,384, filed Mar. 24, 2021.
U.S. Appl. No. 63/171,165, filed Apr. 6, 2021.
U.S. Appl. No. 63/172,975, filed Apr. 9, 2021.
U.S. Appl. No. 63/181,695, filed Apr. 29, 2021.
U.S. Appl. No. 63/192,274, filed May 24, 2021.
U.S. Appl. No. 63/193,235, filed May 26, 2021.
U.S. Appl. No. 63/193,406, filed May 26, 2021.
U.S. Appl. No. 63/193,891, filed May 27, 2021.
U.S. Appl. No. 63/214,551, filed Jun. 24, 2021.
U.S. Appl. No. 63/214,570, filed Jun. 24, 2021.
U.S. Appl. No. 63/215,017, filed Jun. 25, 2021.
U.S. Appl. No. 63/228,244, filed Aug. 2, 2021.
U.S. Appl. No. 63/228,252, filed Aug. 2, 2021.
U.S. Appl. No. 63/228,258, filed Aug. 2, 2021.
U.S. Appl. No. 63/230,894, filed Aug. 9, 2021.
U.S. Appl. No. 63/238,457, filed Aug. 30, 2021.
U.S. Appl. No. 63/238,477, filed Aug. 30, 2021.
U.S. Appl. No. 63/241,562, filed Sep. 8, 2021.
U.S. Appl. No. 63/241,564, filed Sep. 8, 2021.
U.S. Appl. No. 63/241,575, filed Sep. 8, 2021.
U.S. Appl. No. 63/246,972, filed Sep. 22, 2021.
U.S. Appl. No. 63/247,375, filed Sep. 23, 2021.
U.S. Appl. No. 63/247,478, filed Sep. 23, 2021.
U.S. Appl. No. 63/247,491, filed Sep. 23, 2021.
U.S. Appl. No. 63/299,208, filed Jan. 13, 2022.
Boehringer CareDry System—Second Generation for Non-Invasive Urinary Management for Females, Mar. 2021, 3 pgs.
"External Urine Management for Female Anatomy", https://www.stryker.com/us/en/sage/products/sage-primafit.html, Jul. 2020, 4 pages.
"High Absorbancy Cellulose Acetate Electrospun Nanofibers for Feminine Hygiene Application", https://www.sciencedirect.com/science/article/abs/pii/S2352940716300701?via%3Dihub, Jul. 2016, 3 pages.
"Hydrogel properties of electrospun polyvinylpyrrolidone and polyvinylpyrrolidone/poly(acrylic acid) blend nanofibers", https://

(56) References Cited

OTHER PUBLICATIONS pubs.rsc.org/en/content/articlelanding/2015/ra/c5ra07514a#!divAbstract, 2015, 5 pages.
"Making Women's Sanitary Products Safer and Cheaper", https://www.elsevier.com/connect/making-womens-sanitary-products-safer-and-cheaper, Sep. 2016, 10 pages.
"Novel Nanofibers Make Safe and Effective Absorbent for Sanitary Products", https://www.materialstoday.com/nanomaterials/news/nanofibers-make-safe-and-effective-absorbent/, Oct. 2016, 3 pages.
"Rising Warrior Insulated Gallon Jug Cover", https://www.amazon.com/Rising-Warrior-Insulated-Sleeve, 2021, 2 pages.
"Urine Bag Cover-Catheter Bag Cover 2000 ml Volume-Medline Style-Multiple Sclerosis-Spine Injury-Suprapublic Catheter-Bladder Incontinence", https://www.etsy.com/listing/1142934658/urine-bag-cover-caatheter-bag-cover-2000, 2022, 1 page.
"Vinyl Dust Cover, Janome #741811000, Janome, Sewing Parts Online", https://www.sewingpartsonline.com/vinyl-dust-cover-janome-74181000, 2020, 2 pages.
Ali , "Sustainability Assessment: Seventh Generation Diapers versus gDiapers", The University of Vermont, Dec. 6, 2011, pp. 1-31.
Autumn , et al., "Frictional adhesion: a new angle on gecko attachment", The Journal of Experimental Biology, 2006, pp. 3569-3579.
Cañas , et al., "Effect of nano- and micro-roughness on adhesion of bioinspired micropatterned surfaces", Acta Biomaterialia 8, 2012, pp. 282-288.
Chaudhary , et al., "Bioinspired dry adhesive: Poly(dimethylsiloxane) grafted with poly(2-ethylhexyl acrylate) brushes", European Polymer Journal, 2015, pp. 432-440.
Dai , et al., "Non-sticky and Non-slippery Biomimetic Patterned Surfaces", Journal of Bionic Engineering, Mar. 2020, pp. 326-334.
Espinoza-Ramirez , "Nanobiodiversity and Biomimetic Adhesives Development: From Nature to Production and Application", Journal of Biomaterials and Nanobiotechnology, pp. 78-101, 2019.
Hwang , et al., "Multifunctional Smart Skin Adhesive Patches for Advanced Health Care", Adv. Healthcare Mater, 2018, pp. 1-20.
Jagota, et al., "Adhesion, friction, and compliance of bio-mimetic and bio-inspired structured interfaces", Materials Science and Engineering, 2011, pp. 253-292.
Jeong , et al., "A nontransferring dry adhesive with hierarchical polymer nanohairs", PNAS, Apr. 7, 2009, pp. 5639-5644.
Jeong , et al., "Nanohairs and nanotubes: Efficient structural elements for gecko-inspired artificial dry adhesives", Science Direct, 2009, pp. 335-346.
Karp , et al., "Dry solution to a sticky problem", Nature., 2011, pp. 42-43.
Lee , et al., "Continuous Fabrication of Wide-Tip Microstructures for Bio-Inspired Dry Adhesives via Tip Inking Process", Journal of Chemistry, Jan. 2, 2019, pp. 1-5.
Parness , et al., "A microfabricated wedge-shaped adhesive array displaying gecko-like dynamic adhesion, directionality", J.R. Soc. Interface, 2009, pp. 1223-1232.
Tsipenyuk , et al., "Use of biomimetic hexagonal surface texture in friction against lubricated skin", Journal of The Royal Society—Interface, 2014, pp. 1-6.
Advisory Action for U.S. Appl. No. 16/904,868 mailed Jun. 15, 2022.
Advisory Action for U.S. Appl. No. 16/905,400 mailed Feb. 16, 2022.
Final Office Action for U.S. Appl. No. 16/449,039 mailed Aug. 1, 2022.
Final Office Action for U.S. Appl. No. 16/452,145 mailed Mar. 25, 2022.
Final Office Action for U.S. Appl. No. 16/452,258 mailed Jun. 14, 2022.
Final Office Action for U.S. Appl. No. 16/478,180 mailed Jun. 22, 2022.
Final Office Action for U.S. Appl. No. 16/904,868 mailed Mar. 10, 2022.
International Search Report and Written Opinion from International Application No. PCT/US2020/057562 mailed Jan. 27, 2021.
International Search Report and Written Opinion from International Application No. PCT/US2021/026607 mailed Jul. 29, 2021.
International Search Report and Written Opinion from International Application No. PCT/US2021/045188 mailed Jan. 26, 2022.
International Search Report and Written Opinion from International Application No. PCT/US2021/048661 mailed Feb. 14, 2022.
International Search Report and Written Opinion from International Application No. PCT/US2021/049404 mailed Jan. 18, 2022.
International Search Report and Written Opinion from International Application No. PCT/US2021/051456 mailed Jan. 19, 2022.
International Search Report and Written Opinion from International Application No. PCT/US2021/053593 mailed Apr. 11, 2022.
International Search Report and Written Opinion from International Application No. PCT/US2021/055515 mailed Jan. 28, 2022.
International Search Report and Written Opinion from International Application No. PCT/US2021/056566 mailed Feb. 11, 2022.
International Search Report and Written Opinion from International Application No. PCT/US2021/060993 mailed Mar. 18, 2022.
International Search Report and Written Opinion from International Application No. PCT/US2021/062440 mailed Mar. 28, 2022.
International Search Report and Written Opinion from International Application No. PCT/US2022/011108 mailed Apr. 22, 2022.
International Search Report and Written Opinion from International Application No. PCT/US2022/011281 mailed Apr. 25, 2022.
International Search Report and Written Opinion from International Application No. PCT/US2022/011419 mailed Jun. 7, 2022.
International Search Report and Written Opinion from International Application No. PCT/US2022/011421 mailed Jun. 13, 2022.
International Search Report and Written Opinion from International Application No. PCT/US2022/012794 mailed May 3, 2022.
International Search Report and Written Opinion from International Application No. PCT/US2022/015471 mailed May 16, 2022.
International Search Report and Written Opinion from International Application No. PCT/US2022/016942 mailed Jun. 8, 2022.
International Search Report and Written Opinion from International Application No. PCT/US2022/018170 mailed May 31, 2022.
International Search Report and Written Opinion from International Application No. PCT/US2022/019254 mailed Jun. 7, 2022.
International Search Report and Written Opinion from International Application No. PCT/US2022/019480 mailed Jun. 13, 2022.
International Search Report and Written Opinion from International Application No. PCT/US2022/021103 mailed Jun. 23, 2022.
Issue Notification for U.S. Appl. No. 17/088,272 mailed Jun. 15, 2022.
Issue Notification for U.S. Appl. No. 17/330,657 mailed Jun. 22, 2022.
Non-Final Office Action for U.S. Appl. No. 16/369,676 mailed Mar. 31, 2022.
Non-Final Office Action for U.S. Appl. No. 16/905,400 mailed Apr. 27, 2022.
Non-Final Office Action for U.S. Appl. No. 17/662,700 mailed Jul. 22, 2022.
Notice of Allowance for U.S. Appl. No. 16/899,956 mailed Apr. 19, 2022.
Notice of Allowance for U.S. Appl. No. 16/899,956 mailed Aug. 10, 2022.
Notice of Allowance for U.S. Appl. No. 17/088,272 mailed Mar. 4, 2022.
Notice of Allowance for U.S. Appl. No. 17/330,657 mailed Mar. 16, 2022.
Notice of Allowance for U.S. Appl. No. 29/741,751 mailed Jun. 9, 2022.
U.S. Appl. No. 15/384,196, filed Dec. 19, 2016.
U.S. Appl. No. 17/653,314, filed Mar. 3, 2022.
U.S. Appl. No. 17/653,920, filed Mar. 8, 2022.
U.S. Appl. No. 17/654,156, filed Mar. 9, 2022.
U.S. Appl. No. 17/655,464, filed Mar. 18, 2022.
U.S. Appl. No. 17/657,474, filed Mar. 31, 2022.
U.S. Appl. No. 17/661,090, filed Apr. 28, 2022.
U.S. Appl. No. 17/662,700, filed May 10, 2022.
U.S. Appl. No. 17/663,046, filed May 12, 2022.

(56) References Cited

OTHER PUBLICATIONS

U.S. Appl. No. 17/664,914, filed May 25, 2022.
U.S. Appl. No. 17/749,340, filed May 20, 2022.
U.S. Appl. No. 17/754,736, filed Apr. 11, 2022.
U.S. Appl. No. 17/756,201, filed May 19, 2022.
U.S. Appl. No. 17/758,152, filed Jun. 29, 2022.
U.S. Appl. No. 17/758,316, filed Jul. 1, 2022.
U.S. Appl. No. 17/759,697, filed Jul. 28, 2022.
U.S. Appl. No. 17/878,268, filed Aug. 1, 2022.
U.S. Appl. No. 62/923,279, filed Oct. 18, 2019.
U.S. Appl. No. 62/926,767, filed Oct. 28, 2019.
U.S. Appl. No. 62/967,158, filed Jan. 26, 2020.
U.S. Appl. No. 63/008,112, filed Apr. 10, 2020.
U.S. Appl. No. 63/094,646, filed Oct. 21, 2020.
U.S. Appl. No. 63/191,558, filed May 21, 2021.
U.S. Appl. No. 63/192,289, filed May 24, 2021.
U.S. Appl. No. 63/208,262, filed Jun. 8, 2021.
U.S. Appl. No. 63/230,897, filed Aug. 9, 2021.
Advisory Action for U.S. Appl. No. 16/452,258 mailed Oct. 26, 2022.
Advisory Action for U.S. Appl. No. 16/478,180 mailed Sep. 21, 2022.
Advisory Action for U.S. Appl. No. 17/662,700 mailed Jan. 30, 2023.
Final Office Action for U.S. Appl. No. 16/245,726 mailed Nov. 25, 2022.
Final Office Action for U.S. Appl. No. 16/369,676 mailed Dec. 5, 2022.
Final Office Action for U.S. Appl. No. 17/662,700 mailed Sep. 30, 2022.
International Search Report and Written Opinion from International Application No. PCT/IB2021/057173 mailed Nov. 5, 2021.
International Search Report and Written Opinion from International Application No. PCT/US2021/039866 mailed Oct. 7, 2021.
International Search Report and Written Opinion from International Application No. PCT/US2022/014285 mailed Sep. 28, 2022.
International Search Report and Written Opinion from International Application No. PCT/US2022/014749 mailed Sep. 28, 2022.
International Search Report and Written Opinion from International Application No. PCT/US2022/015026 mailed Oct. 31, 2022.
International Search Report and Written Opinion from International Application No. PCT/US2022/015045 mailed Sep. 9, 2022.
International Search Report and Written Opinion from International Application No. PCT/US2022/015073 mailed Sep. 8, 2022.
International Search Report and Written Opinion from International Application No. PCT/US2022/015418 mailed Nov. 11, 2022.
International Search Report and Written Opinion from International Application No. PCT/US2022/015420 mailed Nov. 18, 2022.
International Search Report and Written Opinion from International Application No. PCT/US2022/015492 mailed Apr. 26, 2022.
International Search Report and Written Opinion from International Application No. PCT/US2022/015781 mailed May 6, 2022.
International Search Report and Written Opinion from International Application No. PCT/US2022/018159 mailed Dec. 12, 2022.
International Search Report and Written Opinion from International Application No. PCT/US2022/022111 mailed Oct. 26, 2022.
International Search Report and Written Opinion from International Application No. PCT/US2022/023594 mailed Jul. 12, 2022.
International Search Report and Written Opinion from International Application No. PCT/US2022/026667 mailed Aug. 22, 2022.
International Search Report and Written Opinion from International Application No. PCT/US2022/030685 mailed Oct. 31, 2022.
International Search Report and Written Opinion from International Application No. PCT/US2022/031032 mailed Sep. 9, 2022.
International Search Report and Written Opinion from International Application No. PCT/US2022/032424 mailed Oct. 11, 2022.
International Search Report and Written Opinion from International Application No. PCT/US2022/034457 mailed Oct. 12, 2022.
International Search Report and Written Opinion from International Application No. PCT/US2022/034744 mailed Dec. 9, 2022.
International Search Report and Written Opinion from International Application No. PCT/US2022/039022 mailed Jan. 10, 2023.
International Search Report and Written Opinion from International Application No. PCT/US2022/039711 mailed Jan. 12, 2023.
International Search Report and Written Opinion from International Application No. PCT/US2022/039714 mailed Nov. 22, 2022.
International Search Report and Written Opinion from International Application No. PCT/US2022/042719 mailed Dec. 5, 2022.
International Search Report and Written Opinion from International Application No. PCT/US2022/042725 mailed Dec. 19, 2022.
International Search Report and Written Opinion from International Application No. PCT/US2022/044107 mailed Dec. 23, 2022.
Issue Notification for U.S. Appl. No. 16/905,400 mailed Nov. 30, 2022.
Non-Final Office Action for U.S. Appl. No. 16/478,180 mailed Dec. 20, 2022.
Non-Final Office Action for U.S. Appl. No. 17/051,550 mailed Dec. 15, 2022.
Non-Final Office Action for U.S. Appl. No. 17/451,345 mailed Dec. 7, 2022.
Notice of Allowance and Fees Due received for U.S. Appl. No. 17/461,036, mailed Feb. 22, 2023.
Notice of Allowance for U.S. Appl. No. 16/449,039 mailed Dec. 15, 2022.
Notice of Allowance for U.S. Appl. No. 16/899,956 mailed Dec. 1, 2022.
Notice of Allowance for U.S. Appl. No. 16/905,400 mailed Aug. 17, 2022.
Notice of Allowance for U.S. Appl. No. 17/461,036 mailed Oct. 6, 2022.
Notice of Allowance for U.S. Appl. No. 17/663,046 mailed Jan. 30, 2023.
U.S. Appl. No. 17/907,125, filed Sep. 23, 2022.
U.S. Appl. No. 17/912,147, filed Sep. 16, 2022.
U.S. Appl. No. 17/929,887, filed Sep. 6, 2022.
U.S. Appl. No. 17/930,238, filed Sep. 7, 2022.
U.S. Appl. No. 17/933,590, filed Sep. 20, 2022.
U.S. Appl. No. 17/996,064, filed Oct. 12, 2022.
U.S. Appl. No. 17/996,468, filed Oct. 18, 2022.
U.S. Appl. No. 17/996,556, filed Oct. 19, 2022.
U.S. Appl. No. 18/003,029, filed Dec. 22, 2022.
U.S. Appl. No. 18/006,807, filed Jan. 25, 2023.
U.S. Appl. No. 18/007,105, filed Jan. 27, 2023.
U.S. Appl. No. 18/041,109, filed Feb. 9, 2023.
U.S. Appl. No. 18/164,800, filed Feb. 6, 2023.
U.S. Appl. No. 62/991,754, filed Mar. 19, 2020.
U.S. Appl. No. 63/241,328, filed Sep. 7, 2021.
U.S. Appl. No. 63/308,190, filed Feb. 9, 2022.
U.S. Appl. No. 17/996,155, filed Oct. 13, 2022.
U.S. Appl. No. 17/996,253, filed Oct. 14, 2022.
Advisory Action for U.S. Appl. No. 16/245,726 mailed Apr. 19, 2023.
Advisory Action for U.S. Appl. No. 16/369,676 mailed Mar. 24, 2023.
Final Office Action for U.S. Appl. No. 16/478,180 mailed May 31, 2023.
Final Office Action for U.S. Appl. No. 17/051,399 mailed Mar. 9, 2023.
Final Office Action for U.S. Appl. No. 17/051,550 mailed May 23, 2023.
Final Office Action for U.S. Appl. No. 17/051,585 mailed Jul. 27, 2023.
Final Office Action for U.S. Appl. No. 17/444,792 mailed Jun. 15, 2023.
Final Office Action for U.S. Appl. No. 17/448,811 mailed Aug. 3, 2023.
Final Office Action for U.S. Appl. No. 17/451,345 mailed May 3, 2023.
International Search Report and Written Opinion from International Application No. PCT/US2022/039018 mailed Jan. 10, 2023.
International Search Report and Written Opinion from International Application No. PCT/US2022/041085 mailed Mar. 16, 2023.

(56) References Cited

OTHER PUBLICATIONS

International Search Report and Written Opinion from International Application No. PCT/US2022/041688 mailed Nov. 21, 2022.
International Search Report and Written Opinion from International Application No. PCT/US2022/043818 mailed Mar. 24, 2023.
International Search Report and Written Opinion from International Application No. PCT/US2022/044208 mailed May 8, 2023.
International Search Report and Written Opinion from International Application No. PCT/US2022/044212 mailed Jan. 20, 2023.
International Search Report and Written Opinion from International Application No. PCT/US2022/044243 mailed Feb. 24, 2023.
International Search Report and Written Opinion from International Application No. PCT/US2022/049300 mailed Jun. 6, 2023.
Issue Notification for U.S. Appl. No. 16/899,956 mailed Mar. 29, 2023.
Non-Final Office Action for U.S. Appl. No. 16/449,039 mailed Apr. 27, 2023.
Non-Final Office Action for U.S. Appl. No. 16/452,145 mailed Mar. 28, 2023.
Non-Final Office Action for U.S. Appl. No. 16/452,258 mailed Apr. 26, 2023.
Non-Final Office Action for U.S. Appl. No. 16/904,868 mailed Mar. 15, 2023.
Non-Final Office Action for U.S. Appl. No. 17/051,585 mailed Mar. 29, 2023.
Non-Final Office Action for U.S. Appl. No. 17/179,116 mailed Mar. 24, 2023.
Non-Final Office Action for U.S. Appl. No. 17/326,980 mailed Jul. 11, 2023.
Non-Final Office Action for U.S. Appl. No. 17/444,792 mailed Feb. 10, 2023.
Non-Final Office Action for U.S. Appl. No. 17/446,256 mailed Apr. 13, 2023.
Non-Final Office Action for U.S. Appl. No. 17/448,811 mailed Mar. 1, 2023.
Non-Final Office Action for U.S. Appl. No. 17/450,864 mailed May 10, 2023.
Non-Final Office Action for U.S. Appl. No. 17/451,354 mailed May 3, 2023.
Non-Final Office Action for U.S. Appl. No. 17/453,260 mailed Mar. 14, 2023.
Non-Final Office Action for U.S. Appl. No. 17/501,591 mailed Apr. 25, 2023.
Non-Final Office Action for U.S. Appl. No. 17/646,771 mailed Jul. 5, 2023.
Non-Final Office Action for U.S. Appl. No. 17/653,137 mailed Apr. 7, 2023.
Non-Final Office Action for U.S. Appl. No. 17/655,464 mailed Mar. 14, 2023.
Non-Final Office Action for U.S. Appl. No. 17/661,090 mailed Jul. 6, 2023.
Non-Final Office Action for U.S. Appl. No. 17/663,330 mailed Jun. 29, 2023.
Non-Final Office Action for U.S. Appl. No. 17/664,487 mailed Jun. 8, 2023.
Notice of Allowance for U.S. Appl. No. 16/245,726 mailed Jul. 6, 2023.
Notice of Allowance for U.S. Appl. No. 17/051,554 mailed Jul. 6, 2023.
Notice of Allowance for U.S. Appl. No. 17/461,036 mailed Jun. 30, 2023.
Notice of Allowance for U.S. Appl. No. 17/662,700 mailed Jul. 28, 2023.
Notice of Allowance for U.S. Appl. No. 17/662,700 mailed Mar. 28, 2023.
Notice of Allowance for U.S. Appl. No. 18/299,788 mailed Jul. 24, 2023.
Restriction Requirement for U.S. Appl. No. 17/326,980 mailed Mar. 20, 2023.
Restriction Requirement for U.S. Appl. No. 17/446,256 mailed Jan. 23, 2023.
Restriction Requirement for U.S. Appl. No. 17/645,821 mailed Jul. 12, 2023.
Restriction Requirement for U.S. Appl. No. 17/646,771 mailed Apr. 6, 2023.
Restriction Requirement for U.S. Appl. No. 17/657,474 mailed Jun. 30, 2023.
Text Messages to Lorena Eckert Re Prototype PureWick Holder dated Apr. 16, 2022.
U.S. Appl. No. 17/664,487, filed May 23, 2022.
U.S. Appl. No. 18/042,842, filed Feb. 24, 2023.
U.S. Appl. No. 18/043,618, filed Mar. 1, 2023.
U.S. Appl. No. 18/115,444, filed Feb. 28, 2023.
U.S. Appl. No. 18/134,857, filed Apr. 14, 2023.
U.S. Appl. No. 18/140,163, filed Apr. 27, 2023.
U.S. Appl. No. 18/140,751, filed Apr. 28, 2023.
U.S. Appl. No. 18/198,464, filed May 17, 2023.
U.S. Appl. No. 18/246,121, filed Mar. 21, 2023.
U.S. Appl. No. 18/247,986, filed Apr. 5, 2023.
U.S. Appl. No. 18/259,626, filed Jun. 28, 2023.
U.S. Appl. No. 18/260,122, filed Jun. 30, 2023.
U.S. Appl. No. 18/260,391, filed Jul. 5, 2023.
U.S. Appl. No. 18/260,394, filed Jul. 5, 2023.
U.S. Appl. No. 18/263,800, filed Aug. 1, 2023.
U.S. Appl. No. 18/264,004, filed Aug. 2, 2023.
U.S. Appl. No. 18/265,736, filed Jun. 7, 2023.
U.S. Appl. No. 18/299,788, filed Apr. 13, 2023.
U.S. Appl. No. 18/335,579, filed Jun. 15, 2023.
*PureWick Corporation* v. *Sage Products, LLC* Transcripts vol. 5, Apr. 1, 2022, 72 pages.
*PureWick Corporation* v. *Sage Products, LLC* Transcripts vol. 1, Mar. 28, 2022, 99 pages.
*PureWick Corporation* v. *Sage Products, LLC* Transcripts vol. 2, Mar. 29, 2022, 106 pages.
*PureWick Corporation* v. *Sage Products, LLC* Transcripts vol. 3, Mar. 30, 2022, 115 pages.
*PureWick Corporation* v. *Sage Products, LLC* Transcripts vol. 4, Mar. 31, 2022, 117 pages.
"AMXD Control Starter Kit", Omni Medical Systems, Inc., 1 page.
"AMXDmax Advanced Mission Extender Device User & Maintenance Guide", Omni Medical, Jan. 11, 2010, 10 pages.
"AMXDmax Development History 2002-2014", Omni Medical Systems, Inc., 2 pages.
"Combat Force Multiplier in Flight Bladder Relief Cockpit Essential Equipment Brochure", Omni Medical, 20 pages.
"GSA Price List", Omni Medical, Apr. 2011, 2 pages.
"How is Polypropylene Fiber Made", https:www.yarnsandfibers.com/textile-resources/synthetic-fibers/polypropylene-fiber/polypropylene-fiber-production-raw-materials/how-is-polypropylene-fiber-made/ last accessed 2020, Oct. 7, 2020, 3 pages.
"Letter to Mark Harvie of Omni Measurement Systems", Department of Veterans Affairs, Nov. 1, 2007, 11 pages.
"Revised AMXDmax Advanced Mission Extender Device User & Maintenance Guide", Omni Medical Systems, Oct. 8, 2019, 52 pages.
Pieper, et al., "An external urine-collection device for women: A clinical trial", Journal of ER Nursing, vol. 20, No. 2, Mar./Apr. 1993, pp. 51-55.
VINAS, "A Solution For An Awkward—But Serious—Subject", http://www.aero-news.net/index.cfm?do=main.textpost&id=69ae2bb1-838b-4098-a7b5-7flbb2505688 last accessed Feb. 8, 2021, 3 pages.
Advisory Action for U.S. Appl. No. 16/478,180 mailed Sep. 7, 2023.
Advisory Action for U.S. Appl. No. 16/904,868 mailed Jan. 2, 2024.
Advisory Action for U.S. Appl. No. 17/051,550 mailed Sep. 8, 2023.
Advisory Action for U.S. Appl. No. 17/051,585 mailed Oct. 17, 2023.
Advisory Action for U.S. Appl. No. 17/444,792 mailed Aug. 25, 2023.
Advisory Action for U.S. Appl. No. 17/446,256 mailed Dec. 8, 2023.
Advisory Action for U.S. Appl. No. 17/448,811 mailed Nov. 15, 2023.

(56) References Cited

OTHER PUBLICATIONS

Advisory Action for U.S. Appl. No. 17/451,345 mailed Oct. 20, 2023.
Advisory Action for U.S. Appl. No. 17/453,260 mailed Dec. 22, 2023.
Advisory Action for U.S. Appl. No. 17/653,137 mailed Dec. 1, 2023.
Advisory Action for U.S. Appl. No. 17/655,464 mailed Dec. 13, 2023.
Corrected Notice of Allowability for U.S. Appl. No. 16/369,676 mailed Dec. 7, 2023.
Final Office Action for U.S. Appl. No. 16/369,676 mailed Aug. 31, 2023.
Final Office Action for U.S. Appl. No. 16/449,039 mailed Nov. 21, 2023.
Final Office Action for U.S. Appl. No. 16/452,258 mailed Dec. 21, 2023.
Final Office Action for U.S. Appl. No. 16/904,868 mailed Nov. 2, 2023.
Final Office Action for U.S. Appl. No. 17/179,116 mailed Oct. 31, 2023.
Final Office Action for U.S. Appl. No. 17/446,256 mailed Sep. 19, 2023.
Final Office Action for U.S. Appl. No. 17/450,864 mailed Dec. 28, 2023.
Final Office Action for U.S. Appl. No. 17/451,354 mailed Oct. 30, 2023.
Final Office Action for U.S. Appl. No. 17/453,260 mailed Oct. 5, 2023.
Final Office Action for U.S. Appl. No. 17/501,591 mailed Nov. 14, 2023.
Final Office Action for U.S. Appl. No. 17/646,771 mailed Dec. 21, 2023.
Final Office Action for U.S. Appl. No. 17/653,137 mailed Sep. 21, 2023.
Final Office Action for U.S. Appl. No. 17/655,464 mailed Sep. 1, 2023.
Final Office Action for U.S. Appl. No. 17/661,090 mailed Dec. 11, 2023.
Final Office Action for U.S. Appl. No. 17/663,330 mailed Dec. 12, 2023.
Final Office Action for U.S. Appl. No. 17/664,487 mailed Jan. 4, 2024.
Final Office Action for U.S. Appl. No. 18/139,523 mailed Dec. 22, 2023.
Final Office Action for U.S. Appl. No. 18/164,800 mailed Dec. 6, 2023.
International Search Report and Written Opinion from International Application No. PCT/US2022/050909 mailed Jul. 24, 2023.
International Search Report and Written Opinion from International Application No. PCT/US2023/012696 mailed Jul. 6, 2023.
International Search Report and Written Opinion from International Application No. PCT/US2023/018474 mailed Sep. 11, 2023.
Issue Notification for U.S. Appl. No. 16/245,726 mailed Oct. 18, 2023.
Issue Notification for U.S. Appl. No. 17/461,036 mailed Oct. 11, 2023.
Issue Notification for U.S. Appl. No. 17/663,046 mailed Dec. 20, 2023.
Non-Final Office Action for U.S. Appl. No. 16/452,145 mailed Nov. 2, 2023.
Non-Final Office Action for U.S. Appl. No. 16/478,180 mailed Nov. 7, 2023.
Non-Final Office Action for U.S. Appl. No. 17/051,399 mailed Aug. 18, 2023.
Non-Final Office Action for U.S. Appl. No. 17/051,550 mailed Oct. 24, 2023.
Non-Final Office Action for U.S. Appl. No. 17/444,792 mailed Nov. 17, 2023.
Non-Final Office Action for U.S. Appl. No. 17/446,654 mailed Sep. 8, 2023.
Non-Final Office Action for U.S. Appl. No. 17/453,560 mailed Oct. 16, 2023.
Non-Final Office Action for U.S. Appl. No. 17/645,821 mailed Oct. 25, 2023.
Non-Final Office Action for U.S. Appl. No. 17/657,474 mailed Sep. 12, 2023.
Non-Final Office Action for U.S. Appl. No. 17/808,354 mailed Nov. 28, 2023.
Non-Final Office Action for U.S. Appl. No. 18/139,523 mailed Aug. 17, 2023.
Non-Final Office Action for U.S. Appl. No. 18/140,163 mailed Nov. 9, 2023.
Non-Final Office Action for U.S. Appl. No. 18/140,751 mailed Sep. 14, 2023.
Non-Final Office Action for U.S. Appl. No. 18/198,464 mailed Dec. 7, 2023.
Notice of Allowance for U.S. Appl. No. 16/369,676 mailed Nov. 14, 2023.
Notice of Allowance for U.S. Appl. No. 17/051,554 mailed Oct. 18, 2023.
Notice of Allowance for U.S. Appl. No. 17/662,700 mailed Nov. 15, 2023.
Notice of Allowance for U.S. Appl. No. 18/299,788 mailed Nov. 6, 2023.
Restriction Requirement for U.S. Appl. No. 17/051,600 mailed Sep. 21, 2023.
Restriction Requirement for U.S. Appl. No. 18/134,857 mailed Oct. 23, 2023.
U.S. Appl. No. 17/451,719, filed Oct. 19, 2021.
U.S. Appl. No. 18/373,424, filed Sep. 27, 2023.
U.S. Appl. No. 18/376,274, filed Oct. 3, 2023.
U.S. Appl. No. 18/389,009, filed Nov. 13, 2023.
U.S. Appl. No. 18/548,152, filed Aug. 28, 2023.
U.S. Appl. No. 18/549,387, filed Sep. 7, 2023.
U.S. Appl. No. 18/549,658, filed Sep. 8, 2023.
U.S. Appl. No. 18/553,625, filed Oct. 2, 2023.
U.S. Appl. No. 18/556,945, filed Oct. 24, 2023.
U.S. Appl. No. 18/558,502, filed Nov. 1, 2023.
U.S. Appl. No. 18/562,626, filed Nov. 20, 2023.
U.S. Appl. No. 18/563,672, filed Nov. 22, 2023.
U.S. Appl. No. 18/569,711, filed Dec. 13, 2023.
U.S. Appl. No. 18/569,778, filed Dec. 13, 2023.
U.S. Appl. No. 63/150,640, filed Feb. 18, 2021.
U.S. Appl. No. 63/596,012, filed Nov. 3, 2023.
U.S. Appl. No. 63/608,553, filed Dec. 11, 2023.
Merriam-Webster Dictionary, "Embed Definition & Meaning", https://www.merriam-webster.com/dictionary/embed last accessed Aug. 3, 2023, 2003.
Advisory Action for U.S. Appl. No. 16/449,039 mailed Jan. 25, 2024.
Advisory Action for U.S. Appl. No. 16/452,258 mailed Apr. 8, 2024.
Advisory Action for U.S. Appl. No. 17/179,116 mailed Jan. 8, 2024.
Advisory Action for U.S. Appl. No. 17/446,654 mailed Apr. 15, 2024.
Advisory Action for U.S. Appl. No. 17/450,864 mailed Mar. 21, 2024.
Advisory Action for U.S. Appl. No. 17/451,354 mailed Jan. 30, 2024.
Advisory Action for U.S. Appl. No. 17/501,591 mailed Feb. 22, 2024.
Advisory Action for U.S. Appl. No. 17/646,771 mailed Feb. 29, 2024.
Advisory Action for U.S. Appl. No. 17/661,090 mailed Feb. 26, 2024.
Advisory Action for U.S. Appl. No. 17/663,330 mailed Feb. 27, 2024.
Advisory Action for U.S. Appl. No. 17/664,487 mailed Mar. 13, 2024.
Advisory Action for U.S. Appl. No. 18/139,523 mailed Apr. 24, 2024.

(56) References Cited

OTHER PUBLICATIONS

Advisory Action for U.S. Appl. No. 18/140,751 mailed Apr. 24, 2024.
Advisory Action for U.S. Appl. No. 18/164,800 mailed Feb. 12, 2024.
Communication of Notice of Opposition of European Application No. 17807547.9 mailed Jan. 5, 2024.
Corrected Notice of Allowability for U.S. Appl. No. 17/326,980 mailed Feb. 8, 2024.
Corrected Notice of Allowability for U.S. Appl. No. 17/657,474 mailed Mar. 13, 2024.
Corrected Notice of Allowability for U.S. Appl. No. 17/657,474 mailed May 14, 2024.
Final Office Action for U.S. Appl. No. 16/478,180 mailed Feb. 28, 2024.
Final Office Action for U.S. Appl. No. 17/051,399 mailed Jan. 8, 2024.
Final Office Action for U.S. Appl. No. 17/444,792 mailed Apr. 3, 2024.
Final Office Action for U.S. Appl. No. 17/446,654 mailed Jan. 31, 2024.
Final Office Action for U.S. Appl. No. 17/447,123 mailed May 14, 2024.
Final Office Action for U.S. Appl. No. 17/451,345 mailed Apr. 18, 2024.
Final Office Action for U.S. Appl. No. 17/645,821 mailed Apr. 3, 2024.
Final Office Action for U.S. Appl. No. 17/808,354 mailed Apr. 10, 2024.
Final Office Action for U.S. Appl. No. 18/140,163 mailed Mar. 27, 2024.
Final Office Action for U.S. Appl. No. 18/140,751 mailed Jan. 17, 2024.
International Search Report and Written Opinion from International Application No. PCT/US2023/024805 mailed Dec. 14, 2023.
International Search Report and Written Opinion from International Application No. PCT/US2023/025192 mailed Feb. 7, 2024.
International Search Report and Written Opinion from International Application No. PCT/US2023/025939 mailed Feb. 7, 2024.
International Search Report and Written Opinion from International Application No. PCT/US2023/030365 mailed Mar. 13, 2024.
International Search Report and Written Opinion from International Application No. PCT/US2023/030373 mailed Mar. 13, 2024.
International Search Report and Written Opinion from International Application No. PCT/US2023/031433 mailed Mar. 4, 2024.
International Search Report and Written Opinion from International Application No. PCT/US2023/031740 mailed Mar. 4, 2024.
Issue Notification for U.S. Appl. No. 17/051,550 mailed Mar. 13, 2024.
Issue Notification for U.S. Appl. No. 17/051,554 mailed Mar. 6, 2024.
Issue Notification for U.S. Appl. No. 18/299,788 mailed Feb. 21, 2024.
Non-Final Office Action for U.S. Appl. No. 16/369,676 mailed Feb. 29, 2024.
Non-Final Office Action for U.S. Appl. No. 16/904,868 mailed Mar. 12, 2024.
Non-Final Office Action for U.S. Appl. No. 17/051,585 mailed Jan. 8, 2024.
Non-Final Office Action for U.S. Appl. No. 17/051,600 mailed Jan. 17, 2024.
Non-Final Office Action for U.S. Appl. No. 17/179,116 mailed Feb. 26, 2024.
Non-Final Office Action for U.S. Appl. No. 17/446,256 mailed Feb. 13, 2024.
Non-Final Office Action for U.S. Appl. No. 17/447,123 mailed Jan. 24, 2024.
Non-Final Office Action for U.S. Appl. No. 17/448,811 mailed Jan. 17, 2024.
Non-Final Office Action for U.S. Appl. No. 17/451,345 mailed Jan. 17, 2024.
Non-Final Office Action for U.S. Appl. No. 17/451,354 mailed Apr. 4, 2024.
Non-Final Office Action for U.S. Appl. No. 17/597,673 mailed Mar. 20, 2024.
Non-Final Office Action for U.S. Appl. No. 17/646,771 mailed Apr. 24, 2024.
Non-Final Office Action for U.S. Appl. No. 17/653,137 mailed Jan. 18, 2024.
Non-Final Office Action for U.S. Appl. No. 17/653,920 mailed Mar. 15, 2024.
Non-Final Office Action for U.S. Appl. No. 17/655,464 mailed Mar. 26, 2024.
Non-Final Office Action for U.S. Appl. No. 17/664,914 mailed Jan. 31, 2024.
Non-Final Office Action for U.S. Appl. No. 18/003,029 mailed Mar. 26, 2024.
Non-Final Office Action for U.S. Appl. No. 18/134,857 mailed Jan. 25, 2024.
Non-Final Office Action for U.S. Appl. No. 18/164,800 mailed Mar. 22, 2024.
Notice of Allowance for U.S. Appl. No. 16/449,039 mailed Mar. 28, 2024.
Notice of Allowance for U.S. Appl. No. 17/051,550 mailed Feb. 7, 2024.
Notice of Allowance for U.S. Appl. No. 17/326,980 mailed Apr. 5, 2024.
Notice of Allowance for U.S. Appl. No. 17/326,980 mailed Jan. 29, 2024.
Notice of Allowance for U.S. Appl. No. 17/453,260 mailed Apr. 8, 2024.
Notice of Allowance for U.S. Appl. No. 17/453,560 mailed Jan. 31, 2024.
Notice of Allowance for U.S. Appl. No. 17/657,474 mailed Mar. 5, 2024.
Notice of Allowance for U.S. Appl. No. 17/657,474 mailed May 2, 2024.
Notice of Allowance for U.S. Appl. No. 17/662,700 mailed Mar. 6, 2024.
Notice of Allowance for U.S. Appl. No. 18/198,464 mailed Apr. 17, 2024.
Restriction Requirement for U.S. Appl. No. 17/667,097 mailed Mar. 20, 2024.
Submission in Opposition Proceedings for European Application No. 17807547.9 filed Jan. 10, 2024.
Supplemental Notice of Allowance for U.S. Appl. No. 17/051,550 mailed Feb. 21, 2024.
Supplemental Notice of Allowance for U.S. Appl. No. 17/051,554 mailed Feb. 14, 2024.
U.S. Appl. No. 17/444,792, filed Aug. 10, 2021.
U.S. Appl. No. 18/249,577, filed Oct. 19, 2021.
U.S. Appl. No. 18/294,370, filed Feb. 1, 2024.
U.S. Appl. No. 18/294,403, filed Feb. 1, 2024.
U.S. Appl. No. 18/415,080, filed Jan. 17, 2024.
U.S. Appl. No. 18/426,795, filed Jan. 30, 2024.
U.S. Appl. No. 18/584,002, filed Feb. 22, 2024.
U.S. Appl. No. 18/610,523, filed Mar. 20, 2024.
U.S. Appl. No. 18/662,216, filed May 13, 2024.
U.S. Appl. No. 18/681,987, filed Feb. 7, 2024.
U.S. Appl. No. 18/682,006, filed Feb. 7, 2024.
U.S. Appl. No. 18/687,117, filed Feb. 27, 2024.
U.S. Appl. No. 18/688,023, filed Feb. 29, 2024.
U.S. Appl. No. 18/693,638, filed Mar. 20, 2024.
U.S. Appl. No. 18/694,090, filed Mar. 21, 2024.
U.S. Appl. No. 63/561,893, filed Dec. 11, 2023.
Wikipedia Article, "Decibel", https://web.archive.org/web/20200415219 17/https://en.wikipedia.org/wiki/Decibel last accessed Mar. 11, 2024, 21 pages.
Wikipedia Article, "Fiberglass", https://web.archive.org/web/20200309194847/https://en.wikipedia.org/wiki/Fiberglass last accessed Mar. 11, 2024.

(56) References Cited

OTHER PUBLICATIONS

Wikipedia Article, "Zylinder (Geometrie)", https://de.wikipedia.org/w/index.php?title=Zylinder (Geometrie)&oldid=154862081, version of Jun. 1, 2016, 7 pages.
Advisory Action for U.S. Appl. No. 16/478,180 mailed Jun. 7, 2024.
Advisory Action for U.S. Appl. No. 17/051,585 mailed Oct. 8, 2024.
Advisory Action for U.S. Appl. No. 17/444,792 mailed Jul. 8, 2024.
Advisory Action for U.S. Appl. No. 17/446,256 mailed Nov. 19, 2024.
Advisory Action for U.S. Appl. No. 17/451,345 mailed Jul. 3, 2024.
Advisory Action for U.S. Appl. No. 17/597,673 mailed Jan. 7, 2025.
Advisory Action for U.S. Appl. No. 17/645,821 mailed Jul. 2, 2024.
Advisory Action for U.S. Appl. No. 17/653,137 mailed Nov. 20, 2024.
Advisory Action for U.S. Appl. No. 17/653,920 mailed Oct. 28, 2024.
Advisory Action for U.S. Appl. No. 17/808,354 mailed Jun. 12, 2024.
Advisory Action for U.S. Appl. No. 18/003,029 mailed Jan. 8, 2025.
Advisory Action for U.S. Appl. No. 18/134,857 mailed Oct. 23, 2024.
Advisory Action for U.S. Appl. No. 18/140,163 mailed Jun. 3, 2024.
Advisory Action for U.S. Appl. No. 18/164,800 mailed Jan. 8, 2025.
Corrected Notice of Allowability for U.S. Appl. No. 17/450,864 mailed Oct. 24, 2024.
Corrected Notice of Allowability for U.S. Appl. No. 17/501,591 mailed Aug. 9, 2024.
Corrected Notice of Allowability for U.S. Appl. No. 17/646,771 mailed Jan. 17, 2025.
Corrected Notice of Allowability for U.S. Appl. No. 17/664,914 mailed Aug. 9, 2024.
Corrected Notice of Allowability for U.S. Appl. No. 18/426,795 mailed Dec. 4, 2024.
Final Office Action for U.S. Appl. No. 16/452,258 mailed Jan. 6, 2025.
Final Office Action for U.S. Appl. No. 17/051,585 mailed Jul. 5, 2024.
Final Office Action for U.S. Appl. No. 17/051,600 mailed Jun. 27, 2024.
Final Office Action for U.S. Appl. No. 17/446,256 mailed Aug. 7, 2024.
Final Office Action for U.S. Appl. No. 17/446,654 mailed Dec. 18, 2024.
Final Office Action for U.S. Appl. No. 17/451,354 mailed Oct. 28, 2024.
Final Office Action for U.S. Appl. No. 17/595,747 mailed Dec. 12, 2024.
Final Office Action for U.S. Appl. No. 17/597,673 mailed Oct. 22, 2024.
Final Office Action for U.S. Appl. No. 17/653,137 mailed Aug. 7, 2024.
Final Office Action for U.S. Appl. No. 17/653,314 mailed Jan. 30, 2025.
Final Office Action for U.S. Appl. No. 17/653,920 mailed Aug. 14, 2024.
Final Office Action for U.S. Appl. No. 17/655,464 mailed Nov. 29, 2024.
Final Office Action for U.S. Appl. No. 17/664,487 mailed Jan. 13, 2025.
Final Office Action for U.S. Appl. No. 18/003,029 mailed Oct. 22, 2024.
Final Office Action for U.S. Appl. No. 18/134,857 mailed Jul. 25, 2024.
Final Office Action for U.S. Appl. No. 18/164,800 mailed Oct. 22, 2024.
International Search Report and Written Opinion from International Application No. PCT/US2023/036238 mailed Jul. 22, 2024.
International Search Report and Written Opinion from International Application No. PCT/US2023/036868 mailed Jun. 5, 2024.
International Search Report and Written Opinion from International Application No. PCT/US2023/075507 mailed Jun. 13, 2024.
International Search Report and Written Opinion from International Application No. PCT/US2023/077168 mailed Jun. 24, 2024.
International Search Report and Written Opinion from International Application No. PCT/US2023/077208 mailed May 10, 2024.
International Search Report and Written Opinion from International Application No. PCT/US2023/080680 mailed Jul. 22, 2024.
International Search Report and Written Opinion from International Application No. PCT/US2023/085516 mailed Aug. 26, 2024.
Issue Notification for U.S. Appl. No. 16/369,676 mailed Oct. 2, 2024.
Issue Notification for U.S. Appl. No. 16/449,039 mailed Jun. 19, 2024.
Issue Notification for U.S. Appl. No. 16/452,145 mailed Oct. 23, 2024.
Issue Notification for U.S. Appl. No. 17/179,116 mailed Dec. 25, 2024.
Issue Notification for U.S. Appl. No. 17/326,980 mailed Jul. 10, 2024.
Issue Notification for U.S. Appl. No. 17/447,123 mailed Nov. 13, 2024.
Issue Notification for U.S. Appl. No. 17/448,811 mailed Jul. 3, 2024.
Issue Notification for U.S. Appl. No. 17/450,864 mailed Jan. 8, 2025.
Issue Notification for U.S. Appl. No. 17/453,260 mailed Jul. 10, 2024.
Issue Notification for U.S. Appl. No. 17/453,560 mailed Aug. 7, 2024.
Issue Notification for U.S. Appl. No. 17/657,474 mailed Jun. 19, 2024.
Issue Notification for U.S. Appl. No. 17/662,700 mailed Oct. 23, 2024.
Issue Notification for U.S. Appl. No. 17/664,914 mailed Nov. 6, 2024.
Issue Notification for U.S. Appl. No. 17/667,097 mailed Dec. 11, 2024.
Issue Notification for U.S. Appl. No. 18/140,163 mailed Dec. 4, 2024.
Issue Notification for U.S. Appl. No. 18/198,464 mailed Nov. 20, 2024.
Issue Notification for U.S. Appl. No. 18/389,009 mailed Dec. 18, 2024.
Non-Final Office Action for U.S. Appl. No. 16/452,258 mailed Jun. 20, 2024.
Non-Final Office Action for U.S. Appl. No. 16/478,180 mailed Aug. 7, 2024.
Non-Final Office Action for U.S. Appl. No. 17/378,015 mailed Jul. 5, 2024.
Non-Final Office Action for U.S. Appl. No. 17/444,792 mailed Oct. 30, 2024.
Non-Final Office Action for U.S. Appl. No. 17/446,256 mailed Dec. 13, 2024.
Non-Final Office Action for U.S. Appl. No. 17/446,654 mailed Jun. 25, 2024.
Non-Final Office Action for U.S. Appl. No. 17/450,864 mailed May 29, 2024.
Non-Final Office Action for U.S. Appl. No. 17/451,345 mailed Jul. 25, 2024.
Non-Final Office Action for U.S. Appl. No. 17/595,747 mailed Jun. 7, 2024.
Non-Final Office Action for U.S. Appl. No. 17/597,408 mailed Aug. 15, 2024.
Non-Final Office Action for U.S. Appl. No. 17/614,173 mailed Sep. 24, 2024.
Non-Final Office Action for U.S. Appl. No. 17/625,941 mailed Nov. 4, 2024.
Non-Final Office Action for U.S. Appl. No. 17/628,411 mailed Sep. 23, 2024.
Non-Final Office Action for U.S. Appl. No. 17/645,821 mailed Sep. 6, 2024.

(56) References Cited

OTHER PUBLICATIONS

Non-Final Office Action for U.S. Appl. No. 17/653,137 mailed Jan. 28, 2025.
Non-Final Office Action for U.S. Appl. No. 17/653,314 mailed Aug. 29, 2024.
Non-Final Office Action for U.S. Appl. No. 17/653,920 mailed Nov. 27, 2024.
Non-Final Office Action for U.S. Appl. No. 17/661,090 mailed May 22, 2024.
Non-Final Office Action for U.S. Appl. No. 17/663,330 mailed Jul. 1, 2024.
Non-Final Office Action for U.S. Appl. No. 17/664,487 mailed Jun. 17, 2024.
Non-Final Office Action for U.S. Appl. No. 17/749,340 mailed Aug. 14, 2024.
Non-Final Office Action for U.S. Appl. No. 17/757,311 mailed Oct. 22, 2024.
Non-Final Office Action for U.S. Appl. No. 17/758,316 mailed Aug. 28, 2024.
Non-Final Office Action for U.S. Appl. No. 17/759,697 mailed Dec. 4, 2024.
Non-Final Office Action for U.S. Appl. No. 17/808,354 mailed Dec. 13, 2024.
Non-Final Office Action for U.S. Appl. No. 17/907,125 mailed Dec. 13, 2024.
Non-Final Office Action for U.S. Appl. No. 18/139,523 mailed Aug. 26, 2024.
Non-Final Office Action for U.S. Appl. No. 18/140,751 mailed Jun. 21, 2024.
Non-Final Office Action for U.S. Appl. No. 18/389,009 mailed May 24, 2024.
Non-Final Office Action for U.S. Appl. No. 18/426,795 mailed Aug. 9, 2024.
Non-Final Office Action for U.S. Appl. No. 18/451,080 mailed Jul. 30, 2024.
Non-Final Office Action for U.S. Appl. No. 18/584,002 mailed Sep. 19, 2024.
Notice of Allowance for U.S. Appl. No. 16/369,676 mailed Jun. 17, 2024.
Notice of Allowance for U.S. Appl. No. 16/452,145 mailed Jul. 11, 2024.
Notice of Allowance for U.S. Appl. No. 16/478,180 mailed Dec. 16, 2024.
Notice of Allowance for U.S. Appl. No. 16/904,868 mailed Jan. 21, 2025.
Notice of Allowance for U.S. Appl. No. 16/904,868 mailed Sep. 29, 2024.
Notice of Allowance for U.S. Appl. No. 17/051,585 mailed Dec. 26, 2024.
Notice of Allowance for U.S. Appl. No. 17/179,116 mailed Sep. 13, 2024.
Notice of Allowance for U.S. Appl. No. 17/447,123 mailed Jul. 26, 2024.
Notice of Allowance for U.S. Appl. No. 17/448,811 mailed Jun. 14, 2024.
Notice of Allowance for U.S. Appl. No. 17/450,864 mailed Sep. 18, 2024.
Notice of Allowance for U.S. Appl. No. 17/501,591 mailed Jul. 31, 2024.
Notice of Allowance for U.S. Appl. No. 17/501,591 mailed Nov. 20, 2024.
Notice of Allowance for U.S. Appl. No. 17/527,769 mailed Nov. 20, 2024.
Notice of Allowance for U.S. Appl. No. 17/596,629 mailed Jan. 29, 2025.
Notice of Allowance for U.S. Appl. No. 17/646,771 mailed Dec. 17, 2024.
Notice of Allowance for U.S. Appl. No. 17/661,090 mailed Oct. 30, 2024.
Notice of Allowance for U.S. Appl. No. 17/662,700 mailed Jun. 12, 2024.
Notice of Allowance for U.S. Appl. No. 17/663,330 mailed Nov. 20, 2024.
Notice of Allowance for U.S. Appl. No. 17/664,914 mailed Jul. 26, 2024.
Notice of Allowance for U.S. Appl. No. 17/667,097 mailed Aug. 28, 2024.
Notice of Allowance for U.S. Appl. No. 18/140,163 mailed Aug. 21, 2024.
Notice of Allowance for U.S. Appl. No. 18/140,751 mailed Nov. 1, 2024.
Notice of Allowance for U.S. Appl. No. 18/198,464 mailed Jul. 30, 2024.
Notice of Allowance for U.S. Appl. No. 18/389,009 mailed Aug. 28, 2024.
Notice of Allowance for U.S. Appl. No. 18/415,080 mailed Dec. 30, 2024.
Notice of Allowance for U.S. Appl. No. 18/426,795 mailed Nov. 20, 2024.
Notice of Allowance for U.S. Appl. No. 18/584,002 mailed Jan. 8, 2025.
Restriction Requirement for U.S. Appl. No. 17/527,769 mailed Jun. 17, 2024.
Restriction Requirement for U.S. Appl. No. 17/596,629 mailed Sep. 19, 2024.
Restriction Requirement for U.S. Appl. No. 17/625,941 mailed Aug. 7, 2024.
Restriction Requirement for U.S. Appl. No. 17/754,736 mailed Nov. 20, 2024.
Restriction Requirement for U.S. Appl. No. 17/756,201 mailed Oct. 4, 2024.
Restriction Requirement for U.S. Appl. No. 17/758,152 mailed Nov. 5, 2024.
Restriction Requirement for U.S. Appl. No. 17/809,083 mailed Dec. 31, 2024.
Restriction Requirement for U.S. Appl. No. 17/878,268 mailed Sep. 20, 2024.
U.S. Appl. No. 17/013,822, filed Sep. 7, 2020.
U.S. Appl. No. 18/728,604, filed Jul. 12, 2024.
U.S. Appl. No. 18/757,964, filed Jun. 28, 2024.
U.S. Appl. No. 18/758,025, filed Jun. 28, 2024.
U.S. Appl. No. 18/828,559, filed Sep. 9, 2024.
U.S. Appl. No. 18/834,115, filed Jul. 29, 2024.
U.S. Appl. No. 18/834,176, filed Jul. 29, 2024.
U.S. Appl. No. 18/834,340, filed Jul. 30, 2024.
U.S. Appl. No. 18/835,068, filed Aug. 1, 2024.
U.S. Appl. No. 18/835,444, filed Aug. 2, 2024.
U.S. Appl. No. 18/836,204, filed Aug. 6, 2024.
U.S. Appl. No. 18/841,630, filed Aug. 26, 2024.
U.S. Appl. No. 18/851,197, filed Sep. 26, 2024.
U.S. Appl. No. 18/886,306, filed Sep. 16, 2024.
U.S. Appl. No. 18/903,592, filed Oct. 1, 2024.
U.S. Appl. No. 18/925,921, filed Oct. 24, 2024.
U.S. Appl. No. 18/930,014, filed Oct. 29, 2024.
U.S. Appl. No. 18/931,853, filed Oct. 30, 2024.
U.S. Appl. No. 18/951,944, filed Nov. 19, 2024.
U.S. Appl. No. 18/957,011, filed Nov. 22, 2024.
U.S. Appl. No. 18/974,367, filed Dec. 9, 2024.
U.S. Appl. No. 18/982,930, filed Dec. 16, 2024.
U.S. Appl. No. 19/038,774, filed Jan. 28, 2025.
U.S. Appl. No. 19/039,165, filed Jan. 28, 2025.
U.S. Appl. No. 63/181,709, filed Apr. 29, 2021.
U.S. Appl. No. 63/568,615, filed Mar. 22, 2024.
U.S. Appl. No. 63/683,428, filed Aug. 15, 2024.
U.S. Appl. No. 63/711,438, filed Oct. 24, 2024.
U.S. Appl. No. 63/711,445, filed Oct. 24, 2024.
U.S. Appl. No. 63/720,004, filed Nov. 13, 2024.
"Dictionary.com, ABUT Definition and Meaning", Dictionary.com, https://www.dictionary.com/browse/abut, 2024, 1 page.
"Oblong", Cambridge Dictionary, https://dictionary.cambridge.org/dictionary/english/oblong, 2024, 1 page.

(56) References Cited

OTHER PUBLICATIONS

Britannica, "Polyolefin", Britannica Online Encyclopedia, T. Editors of Encyclopaedia, https://www.britannica.com/science/polyolefin, Jul. 26, 2012.
Martin, "Chapter 5 Applications of Polyethylene Oxide (POLYOX) in Hydrophilic Matrices", Hydrophilic Matrix Tablets for Oral Controlled Release, AAPS Advances in the Pharmaceutical Sciences vol. 16, 2014, pp. 123-141.
Advisory Action for U.S. Appl. No. 16/452,258 mailed May 5, 2025.
Advisory Action for U.S. Appl. No. 17/446,654 mailed Feb. 28, 2025.
Advisory Action for U.S. Appl. No. 17/451,345 mailed May 13, 2025.
Advisory Action for U.S. Appl. No. 17/595,747 mailed Mar. 17, 2025.
Advisory Action for U.S. Appl. No. 17/653,314 mailed Apr. 8, 2025.
Advisory Action for U.S. Appl. No. 17/655,464 mailed Feb. 25, 2025.
Advisory Action for U.S. Appl. No. 17/664,487 mailed Apr. 24, 2025.
Corrected Notice of Allowability for U.S. Appl. No. 17/996,253 mailed Apr. 28, 2025.
Corrected Notice of Allowability for U.S. Appl. No. 18/134,857 mailed Mar. 14, 2025.
Corrected Notice of Allowance for U.S. Appl. No. 17/444,792 mailed Jun. 24, 2025.
Final Office Action for U.S. Appl. No. 17/378,015 mailed Jun. 18, 2025.
Final Office Action for U.S. Appl. No. 17/446,256 mailed Jun. 11, 2025.
Final Office Action for U.S. Appl. No. 17/451,345 mailed Feb. 6, 2025.
Final Office Action for U.S. Appl. No. 17/597,408 mailed Mar. 24, 2025.
Final Office Action for U.S. Appl. No. 17/614,173 mailed May 20, 2025.
Final Office Action for U.S. Appl. No. 17/625,941 mailed Feb. 18, 2025.
Final Office Action for U.S. Appl. No. 17/628,411 mailed Apr. 30, 2025.
Final Office Action for U.S. Appl. No. 17/653,920 mailed Apr. 24, 2025.
Final Office Action for U.S. Appl. No. 17/757,311 mailed Mar. 31, 2025.
Final Office Action for U.S. Appl. No. 17/759,697 mailed Jun. 4, 2025.
Final Office Action for U.S. Appl. No. 17/808,354 mailed Jun. 13, 2025.
Final Office Action for U.S. Appl. No. 17/907,125 mailed Apr. 30, 2025.
Final Office Action for U.S. Appl. No. 18/139,523 mailed May 8, 2025.
International Search Report and Written Opinion from International Application No. PCT/US2023/031432 mailed Feb. 29, 2024.
International Search Report and Written Opinion from International Application No. PCT/US2023/036875 mailed May 31, 2024.
International Search Report and Written Opinion from International Application No. PCT/US2023/077205 mailed Jul. 19, 2024.
International Search Report and Written Opinion from International Application No. PCT/US2024/053681 mailed Jan. 27, 2025.
International Search Report and Written Opinion from International Application No. PCT/US2024/058598 mailed Mar. 28, 2025.
International Search Report and Written Opinion from International Application No. PCT/US2025/018907 mailed May 16, 2025.
International Search Report and Written Opinion from International Application No. PCT/US2025/018909 mailed May 20, 2025.
Issue Notification for U.S. Appl. No. 16/478,180 mailed Mar. 5, 2025.
Issue Notification for U.S. Appl. No. 16/904,868 mailed Apr. 30, 2025.
Issue Notification for U.S. Appl. No. 17/051,585 mailed Mar. 26, 2025.
Issue Notification for U.S. Appl. No. 17/501,591 mailed Mar. 5, 2025.
Issue Notification for U.S. Appl. No. 17/529,769 mailed Feb. 19, 2025.
Issue Notification for U.S. Appl. No. 17/597,673 mailed Jun. 4, 2025.
Issue Notification for U.S. Appl. No. 17/646,771 mailed Mar. 19, 2025.
Issue Notification for U.S. Appl. No. 17/661,090 mailed Feb. 5, 2025.
Issue Notification for U.S. Appl. No. 17/663,330 mailed Feb. 26, 2025.
Issue Notification for U.S. Appl. No. 17/749,340 mailed May 28, 2025.
Issue Notification for U.S. Appl. No. 18/134,857 mailed May 28, 2025.
Issue Notification for U.S. Appl. No. 18/140,751 mailed Feb. 12, 2025.
Issue Notification for U.S. Appl. No. 18/415,080 mailed Apr. 9, 2025.
Issue Notification for U.S. Appl. No. 18/426,795 mailed Feb. 19, 2025.
Issue Notification for U.S. Appl. No. 18/584,002 mailed Apr. 16, 2025.
Non-Final Office Action for U.S. Appl. No. 17/051,600 mailed Feb. 28, 2025.
Non-Final Office Action for U.S. Appl. No. 17/394,055 mailed Mar. 13, 2025.
Non-Final Office Action for U.S. Appl. No. 17/394,055 mailed Mar. 19, 2025.
Non-Final Office Action for U.S. Appl. No. 17/446,654 mailed May 1, 2025.
Non-Final Office Action for U.S. Appl. No. 17/451,354 mailed Mar. 19, 2025.
Non-Final Office Action for U.S. Appl. No. 17/595,747 mailed Jun. 12, 2025.
Non-Final Office Action for U.S. Appl. No. 17/631,619 mailed Mar. 19, 2025.
Non-Final Office Action for U.S. Appl. No. 17/645,821 mailed Mar. 31, 2025.
Non-Final Office Action for U.S. Appl. No. 17/653,314 mailed May 8, 2025.
Non-Final Office Action for U.S. Appl. No. 17/655,464 mailed Mar. 20, 2025.
Non-Final Office Action for U.S. Appl. No. 17/664,487 mailed May 19, 2025.
Non-Final Office Action for U.S. Appl. No. 17/754,736 mailed Mar. 31, 2025.
Non-Final Office Action for U.S. Appl. No. 17/756,201 mailed Apr. 24, 2025.
Non-Final Office Action for U.S. Application No. 17/758, 152 mailed Apr. 8, 2025.
Non-Final Office Action for U.S. Appl. No. 17/809,083 mailed Apr. 2, 2025.
Non-Final Office Action for U.S. Appl. No. 17/809,083 mailed Mar. 7, 2025.
Non-Final Office Action for U.S. Appl. No. 17/878,268 mailed Mar. 17, 2025.
Non-Final Office Action for U.S. Appl. No. 17/912,147 mailed May 29, 2025.
Non-Final Office Action for U.S. Appl. No. 17/996,064 mailed Mar. 6, 2025.
Non-Final Office Action for U.S. Appl. No. 18/003,029 mailed Apr. 18, 2025.
Non-Final Office Action for U.S. Appl. No. 18/006,807 mailed May 29, 2025.
Non-Final Office Action for U.S. Appl. No. 18/042,842 mailed May 22, 2025.

(56) References Cited

OTHER PUBLICATIONS

Non-Final Office Action for U.S. Appl. No. 18/043,618 mailed May 19, 2025.
Non-Final Office Action for U.S. Appl. No. 18/164,800 mailed Apr. 25, 2025.
Non-Final Office Action for U.S. Appl. No. 18/247,986 mailed Jun. 4, 2025.
Non-Final Office Action for U.S. Appl. No. 18/264,004 mailed May 15, 2025.
Notice of Allowance for U.S. Appl. No. 17/444,792 mailed Mar. 28, 2025.
Notice of Allowance for U.S. Appl. No. 17/451,345 mailed Jun. 24, 2025.
Notice of Allowance for U.S. Appl. No. 17/596,629 mailed May 27, 2025.
Notice of Allowance for U.S. Appl. No. 17/597,673 mailed Feb. 26, 2025.
Notice of Allowance for U.S. Appl. No. 17/749,340 mailed Feb. 14, 2025.
Notice of Allowance for U.S. Appl. No. 17/758,316 mailed Mar. 24, 2025.
Notice of Allowance for U.S. Appl. No. 17/996,155 mailed Jun. 24, 2025.
Notice of Allowance for U.S. Appl. No. 17/996,155 mailed Mar. 11, 2025.
Notice of Allowance for U.S. Appl. No. 17/996,253 mailed Apr. 11, 2025.
Notice of Allowance for U.S. Appl. No. 17/996,468 mailed Apr. 14, 2025.
Notice of Allowance for U.S. Appl. No. 18/007,105 mailed Jun. 17, 2025.
Notice of Allowance for U.S. Appl. No. 18/134,857 mailed Feb. 20, 2025.
Restriction Requirement for U.S. Appl. No. 17/755,236 mailed Apr. 24, 2025.
Restriction Requirement for U.S. Appl. No. 17/929,887 mailed Mar. 10, 2025.
Restriction Requirement for U.S. Appl. No. 17/930,238 mailed Apr. 17, 2025.
Restriction Requirement for U.S. Appl. No. 18/041,109 mailed Jun. 4, 2025.
Restriction Requirement for U.S. Appl. No. 18/150,360 mailed May 19, 2025.
Supplemental Notice of Allowance for U.S. Appl. No. 17/597,673 mailed Apr. 10, 2025.
U.S. Appl. No. 17/596,629, filed Dec. 15, 2021.
U.S. Appl. No. 19/046,047, filed Feb. 5, 2025.
U.S. Appl. No. 19/047,728, filed Feb. 7, 2025.
U.S. Appl. No. 19/048,004, filed Feb. 7, 2025.
U.S. Appl. No. 19/049,501, filed Feb. 10, 2025.
U.S. Appl. No. 19/049,783, filed Feb. 10, 2025.
U.S. Appl. No. 19/058,726, filed Feb. 20, 2025.
U.S. Appl. No. 19/069,480, filed Mar. 4, 2025.
U.S. Appl. No. 19/078,602, filed Mar. 13, 2025.
U.S. Appl. No. 19/092,262, filed Mar. 27, 2025.
U.S. Appl. No. 19/103,165, filed Feb. 11, 2025.
U.S. Appl. No. 19/110,938, filed Mar. 12, 2025.
U.S. Appl. No. 19/111,921, filed Mar. 14, 2025.
U.S. Appl. No. 19/127,234, filed May 5, 2025.
U.S. Appl. No. 19/171,983, filed Apr. 7, 2025.
U.S. Appl. No. 19/179,540, filed Apr. 15, 2025.
U.S. Appl. No. 19/202,862, filed May 8, 2025.
U.S. Appl. No. 19/207,699, filed May 14, 2025.
U.S. Appl. No. 19/215,723, filed May 22, 2025.
U.S. Appl. No. 19/237,368, filed Jun. 13, 2025.
U.S. Appl. No. 19/240,380, filed Jun. 17, 2025.
U.S. Appl. No. 63/564,696, filed Mar. 13, 2024.
Foamtech, "Foam Packaging Isnert: Best Selection Guide", https://web/archive.org/web/20170922162235/http://www.foamtechchina/com:80/foam-packaging-insert/, Sep. 22, 2017, 25 pages.

\* cited by examiner

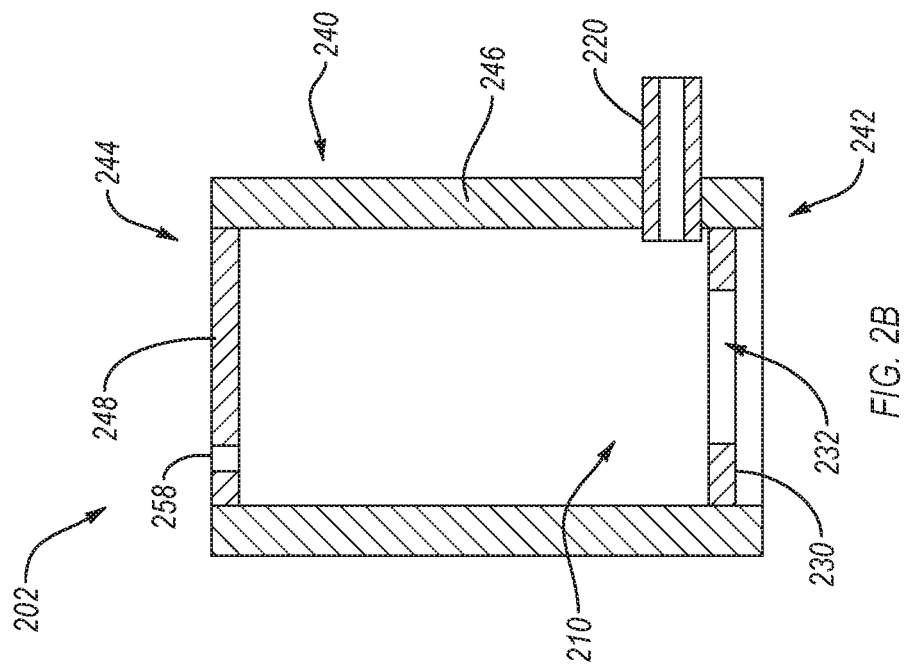
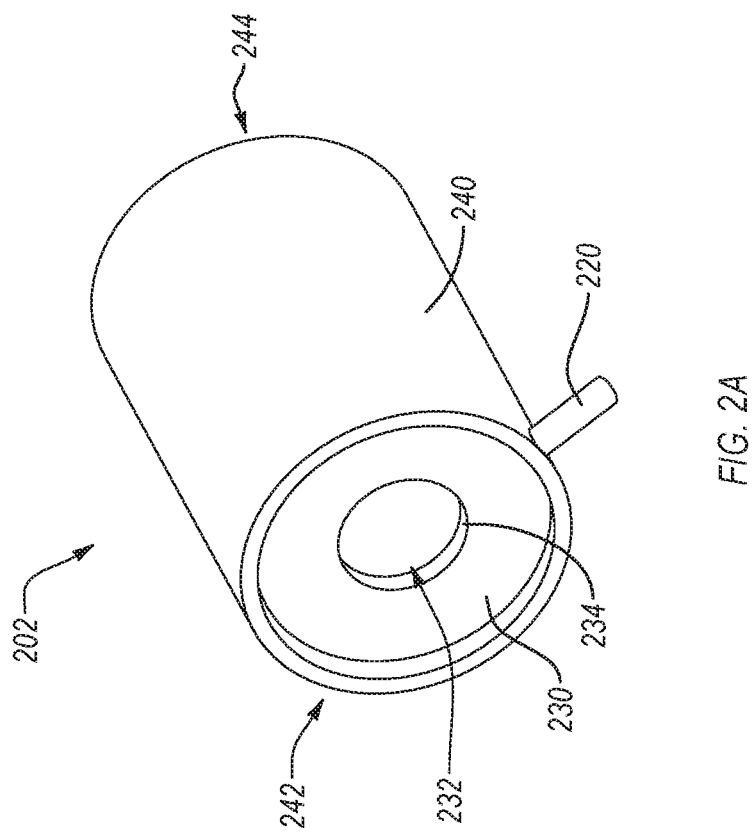
FIG. 2A
FIG. 2B

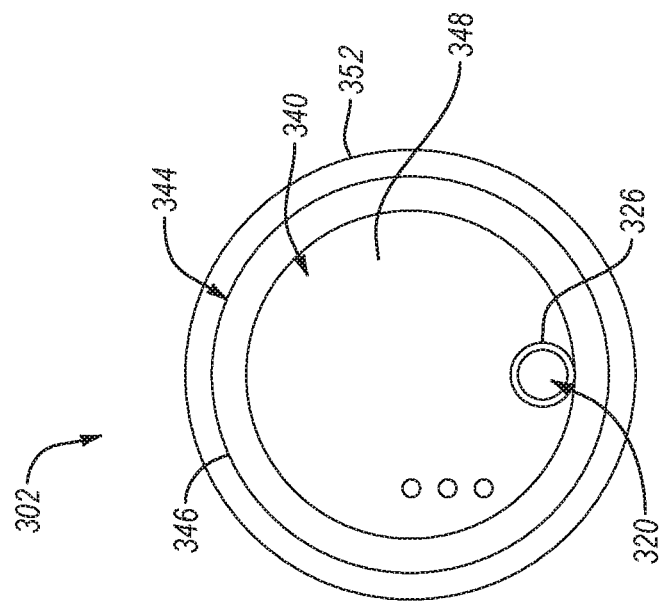
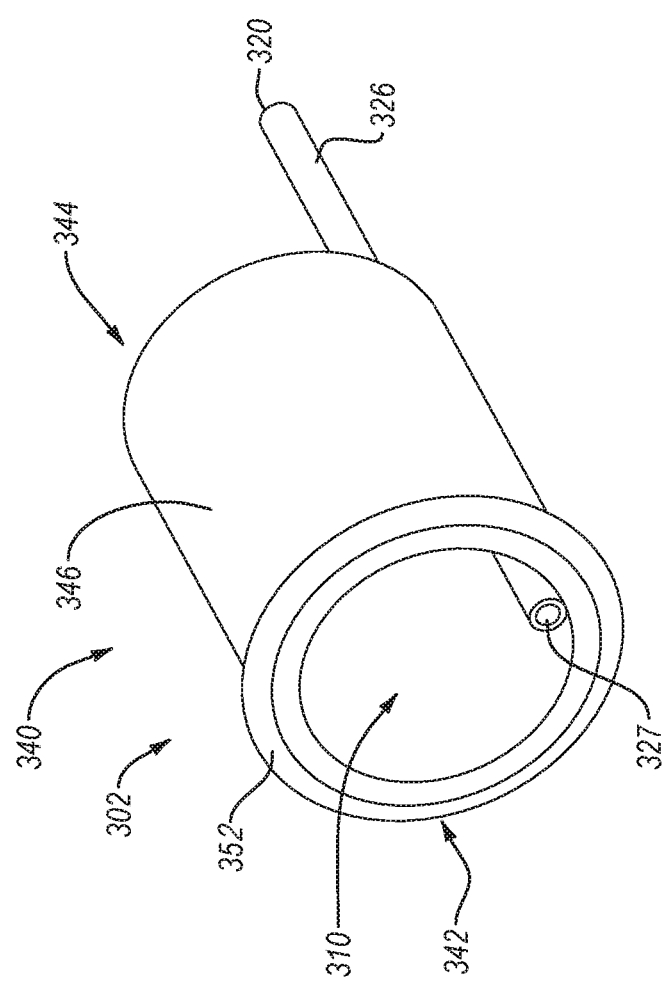
FIG. 3B
FIG. 3A

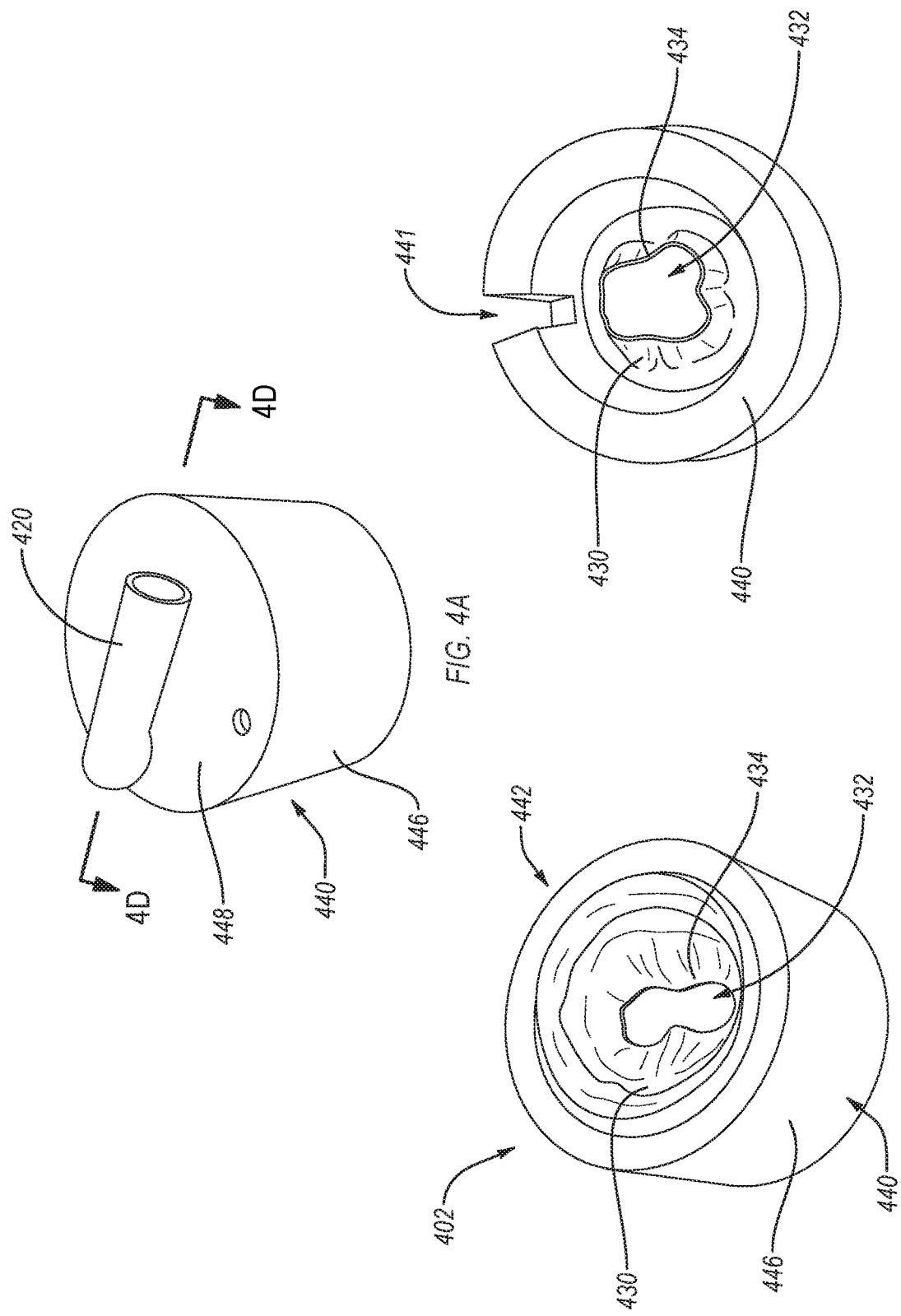

APPARATUS AND METHODS FOR RECEIVING DISCHARGED URINE

CROSS-REFERENCE TO RELATED APPLICATIONS

This application is a continuation-in-part application of International Application No. PCT/US2018/015968 filed on Jan. 30, 2018, which claims priority to U.S. Provisional Application No. 62/452,437 filed on Jan. 31, 2017, the disclosures of each of which is incorporated herein, in their entirety, by this reference.

TECHNICAL FIELD

The present disclosure relates generally to systems, apparatus, and methods for collecting and transporting urine away from the body of a person or animal.

BACKGROUND

The embodiments described herein relate generally to collecting and transporting urine away from the body of a person or animal. In various circumstances, a person or animal may have limited or impaired mobility such that typical urination processes are challenging or impossible. For example, a person may experience or have a disability that impairs mobility. A person may have restricted travel conditions such as those experienced by pilots, drivers, and workers in hazardous areas. Additionally, sometimes urine collection is needed for monitoring purposes or clinical testing.

Urinary catheters, such as a Foley catheter, can be used to address some of these circumstances, such as incontinence. Unfortunately, however, urinary catheters can be uncomfortable, painful, and can lead to complications, such as infections. Additionally, bed pans, which are receptacles used for the toileting of bedridden patients, such as those in a health care facility, are sometimes used. Bed pans, however, can be prone to discomfort, spills, and other hygiene issues.

Males who suffer the most severe consequences of urinary incontinence, such as discomfort, rashes, and sores are typically elderly and often bedbound. They also require continuous assistance to maintain hygiene. Characteristics often found in these patients: they typically lay on their back, the size of the penis often decreases with age, skin rolls containing fat tissue cause the penis to recede, often pointing upward while in a laying position, patients have difficulty reaching the penis and manipulating devices. A urine capture device should be designed with reference to these characteristics.

Available solutions are typically for use while standing up (such as cups and funnels), with a urine discharge port opposite to the distal end of the penis. Other designs such as condom-style catheters are difficult for patients to manipulate, too often they are dimensionally incompatible; and they do not stay on reliably.

Thus, there is a need for a device capable of collecting urine from a person or animal, particularly a male, comfortably and with minimal contamination of the user and/or the surrounding area.

SUMMARY

In an embodiment, a urine collecting assembly is disclosed. The urine collecting assembly includes a body including an open proximal end and an at least partially closed distal end. The body includes a ring at or near the open proximal end. The ring includes an outer surface and an opposing inner surface defining an opening. The ring includes an attachment mechanism. The attachment mechanism includes a protrusion extending from the outer surface of the ring. The body also includes a sheath extending from or near the open proximal end to or near the at least partially closed distal end. The sheath includes at least one fluid impermeable layer. The sheath at least partially defines a reservoir. Further, the body includes a sump at the at least partially closed distal end of the body. The sump defines an outlet.

In an embodiment, a stabilization accessory configured to attach a urine collecting assembly to a user is disclosed. The stabilization accessory includes a base portion including a bottom surface that is configured to abut one or more regions about a penis of the user. The stabilization accessory also includes a raised portion extending upwardly from the base portion. The raised portion includes a top surface and an inner surface defining an opening therethrough. The opening is configured to receive the penis of the user. The raised portion includes an attachment mechanism extending inwardly from the inner surface.

In an embodiment, a urine collecting system is disclosed. The urine collecting system includes a urine collecting assembly including a body. The body includes an open proximal end and an at least partially closed distal end. The body also includes a ring at or near the open proximal end. The ring includes an outer surface and an opposing inner surface defining a first opening. The ring further includes a first attachment mechanism. The first attachment mechanism includes a protrusion extending from the outer surface of the ring. The body also includes a sheath extending from or near the open proximal end to or near the at least partially closed distal end. The sheath includes at least one fluid impermeable layer. The sheath at least partially defines a reservoir. The body further includes a sump at the at least partially closed distal end of the body. The sump defines an outlet. The urine collecting system also includes a stabilization accessory configured to attach the urine collecting assembly to a user. The stabilization accessory includes a base portion including a bottom surface that is configured to abut one or more regions about a penis of the user. The stabilization accessory also includes a raised portion extending upwardly from the base portion. The raised portion includes a top surface. The raised portion includes an inner surface defining a second opening therethrough. The second opening is configured to receive the penis of the user and the urine collecting assembly. The raised portion includes a second attachment mechanism extending inwardly from the inner surface.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

FIG. 2A is a perspective view of an urine collecting assembly, and FIG. 2B is a cross-sectional side view of the urine collecting assembly, according to an embodiment.

FIG. 3A is a perspective view of an urine collecting assembly showing an outlet tubing associated with an outlet extending through a portion of a body of the urine collecting assembly and from the top of the body, according to an embodiment.

FIG. 3B is a top view of the urine collecting assembly showing the arrangement of the outlet tubing and the outlet relative to the body, according to an embodiment.

FIGS. 4A and 4B are top and bottom perspective views of the urine collecting assembly, respectively, according to an embodiment.

FIG. 4C is a top view of the inner layer of the body and the sealing flange, according to an embodiment.

DETAILED DESCRIPTION

Figure 1:
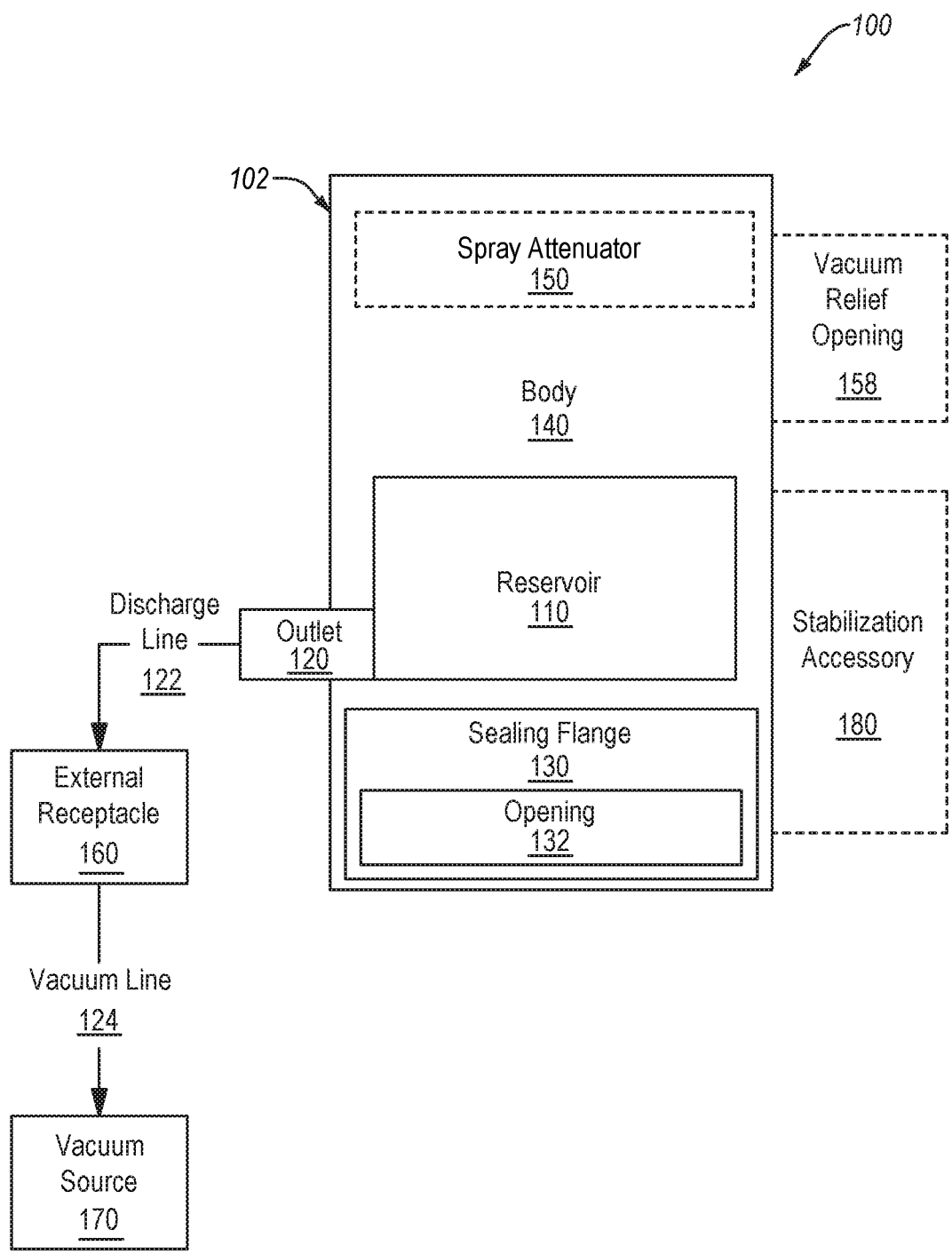
FIG. 1 is a schematic block diagram of a urine collecting system, according to an embodiment.

A urine collecting system is disclosed that is suitable for collecting and transporting urine away from the body of a person or animal, particularly a male. The disclosed urine collecting system includes a urine collecting assembly that may include a body and/or a sealing flange. The body can have an interior region bounded by a fluid impermeable side wall having an open proximal end and an at least partially closed distal end. The sealing flange can be coupled (e.g., permanently or reversibly coupled) to the side wall near the proximal end thereof. The sealing flange can have an opening therethrough with a peripheral edge of the opening configured to seal around the shaft of a penis of a user disposed therethrough. The urine collecting assembly can further include a fluid reservoir that is the interior region of the body and, therefore, the fluid reservoir is at least partially defined by at least a portion of the side wall. The reservoir can also be partially defined by the sealing flange. The urine collecting assembly also includes a fluid outlet in fluid communication with the reservoir that may be, for example, adjacent to the sealing flange. The urine collecting assembly can be configured to be disposed with a user's penis disposed through the opening such that the urethral opening of the penis is disposed within the reservoir (e.g., disposed within the interior region of the body) and the shaft of the penis is in sealing relationship with the peripheral edge of the opening such that the urine collecting assembly is configured to receive urine discharged from the urethral opening into the reservoir, and to have the received urine withdrawn from the reservoir via the outlet.

In some embodiments, a method may include disposing in operative relationship with the urethral opening of a male user, a urine collecting system. The urine collecting system can include at least one of a body, a sealing flange, a fluid reservoir, a fluid outlet, or a stabilization accessory. The body can have an interior region bounded by a fluid impermeable side wall having a proximal end and an at least partially closed distal end. The sealing flange can be coupled to the side wall near the proximal end thereof and can have an opening therethrough with a peripheral edge. The fluid reservoir can be within the interior region of the body and defined by at least a portion of the side wall and by the sealing flange. The fluid outlet can be in fluid communication with the reservoir and adjacent to the sealing flange. The operative relationship can include the user's penis being disposed through the opening in the sealing flange in sealing relationship with the peripheral edge of the opening and with the urethral opening of the penis disposed within the reservoir. The method can include allowing urine discharged from the urethral opening to be received in the reservoir and allowing the received urine to be withdrawn from the reservoir via the fluid outlet.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

The embodiments described herein can be formed or constructed of one or more biocompatible materials. Examples of suitable biocompatible materials include metals, ceramics, or polymers. Examples of suitable metals include pharmaceutical grade stainless steel, gold, titanium, nickel, iron, platinum, tin, chromium, copper, and/or alloys thereof. Examples of polymers include nylons, polyesters, polycarbonates, polyacrylates, polymers of ethylene-vinyl acetates and other acyl substituted cellulose acetates, non-degradable polyurethanes, polystyrenes, polyvinyl chloride, polyvinyl fluoride, poly(vinyl imidazole), chlorosulphonate polyolefins, polyethylene oxide, polyethylene terephthalate (PET), polytetrafluoroethylene (PTFE), and/or blends and copolymers thereof.

FIG. 1 is a schematic block diagram of a urine collecting system 100, according to an embodiment. The urine collecting system 100 includes a urine collecting assembly 102. The urine collecting assembly 102 can include at least one of a body 140, a sealing flange 130, a reservoir 110 within the body 140 that can be partially defined by the sealing flange 130, or a stabilization accessory 180. The sealing flange 130 can define an opening 132 such that the interior of the body 140 is accessible via the opening 132. A peripheral edge of the opening can be configured to seal around a shaft of a penis of a user disposed through the opening 132. The urine collecting assembly 102 also includes an outlet 120 in fluidic communication with the reservoir 110. The urine collecting assembly 102 can be arranged such that a fluid can flow into the body 140 from a urethral opening of the user's penis, collect in the reservoir 110, and flow out of the outlet 120. In an embodiment, the urine collecting assembly 102 can also include a spray attenuator 150 disposed within the body 140 and spaced from sealing flange 130, to attenuate spray from a stream of urine received into the body 140. The spray attenuator 150 can be, for example, a spun plastic material lining the interior portion of the top of body 140. In an embodiment, the urine collecting system 100 can include a discharge line 122. The discharge line 122 can be fluidly coupled to an external receptacle 160. The external receptacle 160 can be in fluidic communication with a vacuum source 170 via a vacuum line 124. The discharge line 122 and the vacuum line 124 can both include flexible tubing, such as, for example, flexible plastic tubing.

The reservoir 110 can be any suitable shape and/or size capable of collecting fluid received within reservoir 110. As described above, the reservoir 110 is defined by one or more fluid impermeable side walls of the body 140. In some embodiments the reservoir 110 can also be partially defined by the sealing flange 130 in combination with the one or more fluid impermeable side walls of the body 140. In an embodiment, the body 140 can be shaped as a cylindrical container. In some embodiments, the reservoir 110 is defined by one or more side walls of the body 140, the sealing flange 130, and an outer surface of a shaft of a penis of a user (not shown) disposed through the opening 132 defined by the sealing flange 130.

In an embodiment, the urine collecting assembly 102 can be sized such that the reservoir 110 is capable of collecting and temporarily holding a large or small amount of urine until the urine can be removed from the reservoir 110 via the outlet 120. For example, the urine collecting assembly 102 can be sized such that the reservoir 110 is configured to hold a small amount of urine as may be released due to incontinence. In an embodiment, the urine collecting assembly 102 can be sized such that the reservoir 110 is configured to hold a large amount of urine as may be released during voiding of a full bladder. In an embodiment, the urine collecting assembly 102 can be sized such that the reservoir 110 is configured to collect and hold a small or large amount of urine while the urine is simultaneously removed via, for example, gravity and/or a pump, such as the vacuum source 170. In a condition where the flow rate of urine into the urine collecting assembly 102 via the urethral opening of a user's penis is greater than the flow rate of urine through the discharge line 122, a temporary backup of urine may occur in the reservoir 110. Thus, the urine collecting assembly 102 can be sized such that the reservoir 110 can contain a volume of fluid that may temporarily accumulate due to the difference in flow rates into and out of the urine collecting assembly 102. Additionally, the urine collecting assembly 102 can be sized to accommodate anatomy of various shapes and sizes within the body 140 and via the opening 132.

Although the outlet 120 is shown as extending from the side of the reservoir 110, in an embodiment, the outlet 120 can extend from the bottom or top of the reservoir 110. For example, the outlet 120 can extend adjacent to or through a portion of the sealing flange 130. Positioning the outlet 120 lower in the reservoir 110 such that less or no urine can pool at the bottom of the reservoir 110 can allow for urine to be removed from the reservoir 110 more quickly and/or completely. In other embodiment, the outlet 120 can be positioned within the reservoir such that at least a portion of tubing associated with the outlet 120 extends from the top of the body 140. For example, a portion of tubing associated with the outlet 120 can extend from the reservoir 110 through at least a portion of the body 140. In such an embodiment, the outlet 120 can be positioned a distance from the reservoir 110 such that fluid can flow from the reservoir 110, through the tubing associated with the outlet 120, and from the outlet 120. In such an embodiment, positioning the reservoir end of the tubing associated with the outlet 120 towards the bottom of the reservoir 110 such that less or no urine can pool at the bottom of the reservoir 110 can allow for urine to be removed from the reservoir 110 more quickly and/or completely. In an embodiment, the outlet 120 can be disposed on the top of the body 140. Although the portion of tubing associated with the outlet 120 is described as extending through at least a portion of the body 140, in an embodiment the portion of tubing can be formed such that it is integral with a wall of the body 140.

Said another way, a wall of the body 140 can define a lumen extending from the reservoir 110 to an outlet located above the reservoir 110, such as on the top of the body 140. The wall of the body 140 can define an inlet at the end of the lumen near the reservoir 110.

The external receptacle 160, via the discharge line 122, can collect fluid exiting the reservoir 110 through the outlet 120. The external receptacle 160 can be a sealed container. In an embodiment, the external receptacle 160 can be disposable. In an embodiment, the external receptacle 160 can be configured to be sterilized and reused.

In an embodiment, gravity can cause fluid within the reservoir 110 to follow a flow path (i.e., the fluid flow path including the outlet 120 and the discharge line 122) from the reservoir 110 to the external receptacle 160. In an embodiment, the vacuum source 170 can assist and/or provide the pressure differential needed to draw fluid voided from the urethral opening of a user into the body 140 into the reservoir 110, and from the reservoir 110 into the external receptacle 160. The vacuum source 170 can be fluidly coupled to the external receptacle 160 via a vacuum line 124 such that gaseous fluid is drawn from the external receptacle 160 via the vacuum line 124. As a result of the decrease in pressure within the external receptacle 160 caused by the drawing of gaseous fluid out of the external receptacle 160, liquid and/or gaseous fluid can be drawn from the reservoir 110, through the outlet 120, through the discharge line 122, and into the external receptacle 160. In an embodiment, the vacuum source 170 can apply sufficient suction to capture all or substantially all of the urine voided by a user in a variety of positions (e.g., when a user is lying on his side).

In an embodiment, the vacuum source 170 can be a pump that is readily available, inexpensive, relatively quiet, and/or configured to run continuously. For example, the vacuum source 170 can be a pump. The vacuum line 124 can be attached to the intake port of the pump (rather than the exhaust port) such that gaseous fluid is drawn into the pump from the external receptacle 160 via the vacuum line 124. In such an embodiment, the pump can have a configuration much like an aquarium aerator pump. In an embodiment, the necessary static vacuum of the urine collecting system 100 is about 3-10 feet of water (10%-30% of one atmosphere; 80-250 mm Hg) with a free-flow rate of about 10-100 cubic centimeters per second. In an embodiment, the necessary static vacuum of the urine collecting system 100 is higher or lower depending on the size of the user and the expected rate of urine flow from the user and/or through the urine collecting system 100. In an embodiment, the discharge line 122 can be about 0.25" in diameter and the vacuum source 170 can be configured to cause about 500 cubic centimeters of urine to flow through the discharge line 122 to the external receptacle 160 over the duration of a typical urination event for a user, which may typically range from 10 to 20 seconds but may be shorter or longer, e.g., 5 to 90 seconds. In an embodiment, the vacuum source 170 can include a wall-mounted vacuum system, such as is found in hospitals. In an embodiment, a wall-mounted vacuum system can be configured to apply a vacuum of, for example, about 20 mm Hg to about 40 mm Hg. In an embodiment, the vacuum source 170 can be powered by electrical AC or DC power. For example, in mobile applications when the user is away from an AC power source, such as when the user is using the urine collecting system 100 during transportation via a wheel chair or motor vehicle, the vacuum source 170 can be powered by DC power. One suitable non-limiting example of a pump that can be used is the DryDoc Vacuum Station, available from PureWick, Inc.

In an embodiment, the urine collecting system 100 can include a stabilization accessory 180 releasably couplable to urine collecting assembly 102. The stabilization accessory 180 can be configured to receive the urine collecting assembly 102 within an opening (e.g., opening 582, 682, 782, 882, 982, 1082A, 1182, 1282, 1382A, 1382B, or 1482 of FIGS. 5A-14) defined by the stabilization accessory 180. The stabilization accessory 180 can be shaped and sized such that it can be disposed on a user's body. The stabilization accessory 180 can also be configured to maintain the urine collecting assembly 102 in a particular position and/or at a particular angle relative to the user's body via, for example, releasable frictional engagement between the urine collecting assembly 102 and the stabilization accessory 180. The stabilization accessory 180 can also stabilize the urine collecting assembly 102. In an embodiment, the stabilization accessory 180 and the urine collecting assembly 102 can be integrally formed with each other.

In an embodiment, the opening of the stabilization accessory 180 allows the urine collecting assembly 102 to rotate within the stabilization accessory 180 as a user of the urine collecting system 100 moves (e.g., rotates from side to side). In such an embodiment, the shape of the urine collecting assembly 102 and the opening of the stabilization accessory exhibit a circular cross-section (e.g., a generally cylindrical or conical shape) since other cross-sectional shapes, such as oblong shapes, can inhibit rotation of the urine collecting assembly 102 in the opening. Rotating the urine collecting assembly 102 within the opening of the stabilization accessory 180 can enable the outlet 120 to be oriented in the direction of the discharge line 122, thereby preventing kinks in the discharge line 122, prevent leaks forming between the user and the urine collecting assembly 102, etc., as the user moves. Additionally, if the urine collecting system 100 did not include the stabilization accessory 180, the body 140 of the assembly 102 may need to be adhesively attached to a region about the user's penis to prevent leaks between the body 140 and the region about the user's penis. However, adhesively attaching the body 140 to the region about the user's penis can cause the body 140 to pull and twist the region about the user's penis as the user moves.

The stabilization accessory 180 and/or the assembly 102 can be configured to enable the assembly 102 to rotate in the opening of the stabilization accessory 180 using any suitable method. In an embodiment, the opening of the stabilization accessory 180 can exhibit a size and shape that corresponds to, but is slightly larger than the urine collecting assembly 102 which can enable the urine collecting assembly 102 to rotate in the opening of the stabilization accessory. It is noted that any gap formed between the stabilization accessory 180 and the urine collecting assembly 102 is sufficiently small to substantially inhibit fluid flow therethrough. However, the gap between the stabilization accessory 180 and the urine collecting assembly 102 may be configured allow air to flow therein. In an embodiment, the stabilization accessory 180 and/or the urine collecting assembly 102 are configured to minimize friction therebetween which can facilitate rotation of the urine collecting assembly 102 in the opening of the stabilization accessory. For example, the stabilization accessory 180 and/or the urine collecting assembly 102 can at least one of be polished, include a low friction material, or include a lubricant that at least partially coats a surface thereof.

The stabilization accessory 180 can be any suitable shape and size, such as, for example, round, oblong, pie-shaped, or any other suitable shape, as shown in FIGS. 5A-14. In an embodiment, the stabilization accessory 180 can be shaped to conform to the shape of a user's body. In an embodiment, the stabilization accessory 180 can be configured to maintain the urine collecting assembly 102 at an angle that is about 90° relative to an axis running along the length of a user lying supine. In an embodiment, the stabilization accessory 180 can be configured to maintain the urine collecting assembly 102 at an angle that is greater than 90° or less than 90° (e.g., about 120°) relative to an axis running along the length of a user lying supine. In an embodiment, the stabilization accessory 180 can include an opening for the passage of a discharge line 122 from the urine collecting assembly 102. In an embodiment, the stabilization accessory 180 can be secured to the user's body via, for example, adhesive tape (e.g., via a hydrocolloid adhesive).

In an embodiment, the body 140 can define one or more vacuum relief openings 158 in fluid communication with the interior of body 140. The one or more vacuum relief openings 158 can allow gaseous fluid to flow into the body 140 from the external environment to prevent the development of a pressure differential within the urine collecting assembly 102 by the vacuum source 170 that is damaging or disruptive to the urine collecting assembly 102. Thus, the one or more vacuum relief openings 158 can prevent the body 140 from collapsing and can prevent the seal between the sealing flange 130 and a shaft of a penis disposed through the opening 132 from being broken due to a vacuum within the body 140. Said another way, the one or more vacuum relief openings 158 can be located such that at least one additional airflow path exists in the urine collecting assembly 102. The one or more vacuum relief openings 158 can be disposed at any suitable location on the body 140. In an embodiment, the one or more vacuum relief openings 158 can be disposed near the outlet 120 of the urine collecting assembly 102. In an embodiment, the one or more vacuum relief openings 158 can be disposed in a location that reduces the likelihood that the skin of the user inadvertently covers the hole, such as a location near the top of the body 140. In an embodiment, the one or more vacuum relief openings 158 can be disposed in a location that reduces the likelihood that liquid fluid (e.g., urine) will exit the urine collecting assembly 102 via the one or more vacuum relief openings 158. In an embodiment, the stabilization accessory 180 may define one or more vacuum relief openings.

FIG. 2A is a perspective view of a urine collecting assembly 202, and FIG. 2B is a cross-sectional side view of the urine collecting assembly 202, according to an embodiment. The urine collecting assembly 202 can be the same or similar in structure and/or function as any of the urine collecting assemblies described herein, such as urine collecting assembly 102. For example, the urine collecting assembly 202 can include at least one of a body 240, a sealing flange 230, or a reservoir 210 (best shown in FIG. 2B) within the body 240 and partially defined by the sealing flange 230. The sealing flange 230 defines an opening 232 such that the interior of the body 240 is accessible via the opening 232. A peripheral edge 234 of the opening 232 is configured to seal around a shaft of a penis of a user disposed through the opening 232. The urine collecting assembly 202 also includes an outlet 220 in fluidic communication with the reservoir 210. The urine collecting assembly 202 can be arranged such that a fluid can flow into the body 240 (e.g., via a urethral opening of a user's penis disposed within the body 240), collect in the reservoir 210, and flow out of the outlet 220.

The body 240 has a fluid impermeable side wall 246 and a fluid impermeable end wall 248. The sealing flange 230 is coupled to the body 240 such that the body 240 in combination with the sealing flange 230 form a cylindrical container with an open proximal end 242 formed by the sealing flange 230 defining the opening 232 and an at least partially closed distal end 244 formed and closed by the end wall 248. The sealing flange 230 can be flexible and elastic such that the peripheral edge 234 of the sealing flange 230 can seal around an outer surface of a shaft of a penis of a user (not shown) disposed through the opening 232 defined by the sealing flange 230. For example, the sealing flange 230 can be formed from a polymer. Thus, the reservoir 210 can be defined by the sealing flange 230 in combination with the side wall 246 of the body 240, and an outer surface of a shaft of a penis of a user disposed through the opening 232.

The urine collecting assembly 202 can be sized such that the reservoir 210 is capable of collecting and temporarily holding a large or small amount of urine until the urine can be removed from the reservoir 210 via the outlet 220. For example, the urine collecting assembly 202 can be sized such that the reservoir 210 is configured to hold a small amount of urine as may be released due to incontinence. In an embodiment, the urine collecting assembly 202 can be sized such that the reservoir 210 is configured to hold a large amount of urine as may be released during voiding of a full bladder. In an embodiment, the urine collecting assembly 202 can be sized such that the reservoir 210 is configured to collect and hold a small or large amount of urine while the urine is simultaneously removed via, for example, gravity and/or a pump, such as a vacuum source the same or similar to the vacuum source 170. In a condition where the flow rate of urine into the urine collecting assembly 202 via the urethral opening of a user's penis is greater than the flow rate of urine through the outlet 220, a temporary backup of urine may occur in the reservoir 210. Thus, the urine collecting assembly 202 can be sized such that the reservoir 210 can contain a volume of fluid that may temporarily accumulate due to the difference in flow rates into and out of the urine collecting assembly 202. Additionally, the urine collecting assembly 202 can be sized to accommodate anatomy of various shapes and sizes within the body 240 and via the opening 232.

The outlet 220 extends from the side wall 246 of the body 240 (and thus from the side of the reservoir 210). An external receptacle (not shown) can be coupled to the outlet 220 via a discharge line (not shown) such that fluid (e.g., urine) exiting the reservoir 210 via the outlet 220 can be collected. The external receptacle and the discharge line can be the same or similar as the external receptacle 160 and the discharge line 122 described above. In an embodiment, gravity can cause fluid within the reservoir 210 to follow a flow path (i.e., the fluid flow path including the outlet 220 and the discharge line) from the reservoir 210 to the external receptacle. In an embodiment, a vacuum source (not shown), which can be the same or similar to vacuum source 170 described above, can assist and/or provide the pressure differential needed to draw fluid voided from the urethral opening of a user into the body 240 into the reservoir 210, and from the reservoir 210 into the external receptacle. In an embodiment, the vacuum source can apply sufficient suction to capture all or substantially all of the urine voided by a user that is collected at the bottom of the urine collecting assembly 202 (i.e., the open proximal end 242) near the outlet 220.

In an embodiment (not shown), the urine collecting assembly 202 can also include a spray attenuator disposed within the body 240 and spaced from sealing flange 230, to attenuate spray from a stream of urine received into the body 240. In an embodiment, the body 240 can define at least one vacuum relief opening 258.

Although the outlet 220 of the urine collecting assembly 202 is shown as extending from the side wall 246 of the urine collecting assembly 202, in some embodiments the outlet can extend from the top of the urine collecting assembly. For example, FIG. 3A is a perspective view of an urine collecting assembly 302 showing an outlet tubing 326 associated with an outlet 320 extending through a portion of a body 340 of the urine collecting assembly 302 and from the top of the body 340, according to an embodiment. FIG. 3B is a top view of the urine collecting assembly 302 showing the arrangement of the outlet tubing 326 and the outlet 320 relative to the body 340, according to an embodiment. Extending the outlet 320 through the top of the body 340 can facilitate usage of the urine collecting assembly 302 with a stabilization accessory since the stabilization accessory would not need to define an opening for the discharge line to pass through.

The urine collecting assembly 302 can be the same or similar in structure and/or function as any of the urine collecting assemblies described herein, such as urine collecting assemblies 102, 202. For example, the urine collecting assembly 302 includes a reservoir 310 within the body 340. However, the urine collecting assembly 302, as illustrated, does not include a flange though, in some embodiments, the urine collecting assembly 302 can include a flange that is similar to the sealing flange 230 shown in FIGS. 2A and 2B. Omitting the sealing flange from the urine collecting assembly 302 allows the urine collecting assembly 302 to be used, in conjunction with a stabilization accessory (not shown), with a penis that exhibits a diameter or a length that is too small to be sealed with a sealing flange. As described above, the urine collecting assembly 302 also includes the outlet 320 in fluid communication with the reservoir 310 via the outlet tubing 326. The urine collecting assembly 302 can be arranged such that a fluid can flow into the body 340 (e.g., via a urethral opening of a user's penis disposed within the body 340), collect in the reservoir 310, and flow into the outlet tubing 326 via an inlet 327, through the outlet tubing 326, and out of the outlet 320.

The body 340 has a fluid impermeable side wall 346 and a fluid impermeable end wall 348. The body 340, optionally in combination with a sealing flange, can form a cylindrical container with an open proximal end 342 and an at least partially closed distal end 344 formed and closed by the end wall 348. Thus, the reservoir 310 can be defined by at least one of the sealing flange, the side wall 346 of the body 340, and an outer surface of a shaft of a penis of a user disposed through the opening 232.

The urine collecting assembly 302 can be sized such that the reservoir 310 is capable of collecting and temporarily holding a large or small amount of urine until the urine can be removed from the reservoir 310 via the outlet 320. For example, the urine collecting assembly 302 can be sized such that the reservoir 310 is configured to hold a small amount of urine as may be released due to incontinence. In an embodiment, the urine collecting assembly 302 can be sized such that the reservoir 310 is configured to hold a large amount of urine as may be released during voiding of a full bladder. In an embodiment, the urine collecting assembly 302 can be sized such that the reservoir 310 is configured to collect and hold a small or large amount of urine while the urine is simultaneously removed via, for example, gravity and/or a pump, such as a vacuum source the same or similar to the vacuum source 170. In a condition where the flow rate of urine into the urine collecting assembly 302 via the urethral opening of a user's penis is greater than the flow rate of urine through the outlet 320, a temporary backup of urine may occur in the reservoir 310. Thus, the urine collecting assembly 302 can be sized such that the reservoir 310 can contain a volume of fluid that may temporarily accumulate due to the difference in flow rates into and out of the urine collecting assembly 302. Additionally, the urine collecting assembly 302 can be sized to accommodate anatomy of various shapes and sizes within the body 340 and via the opening 332.

As described above, the outlet tubing 326 extends through a portion of the body 340. In an embodiment, the outlet tubing 326 can extend along an inner surface of the side wall 346 of the body 340. As shown in FIG. 3B, the outlet tubing 326 can extend through the end wall 348 and out of the top of the urine collecting assembly 302 such that the outlet 320 is disposed a distance from the top of the body 340. Thus, fluid can flow from the reservoir 310, through the outlet tubing 326, and from the outlet 120. In such an embodiment, positioning the inlet 327 of the outlet tubing 326 towards the bottom of the reservoir 310 such that less or no urine can pool at the bottom of the reservoir 310 can allow for urine to be removed from the reservoir 310 more quickly and/or completely.

An external receptacle (not shown) can be coupled to the outlet 320 via a discharge line (not shown) such that fluid (e.g., urine) exiting the reservoir 310 via the outlet tubing 326 and the outlet 320 can be collected. The external receptacle and the discharge line can be the same or similar as the external receptacle 160 and the discharge line 122 described above. In an embodiment, a vacuum source (not shown), which can be the same or similar to vacuum source 170 described above, can assist and/or provide the pressure differential needed to draw fluid voided from the urethral opening of a user into the body 340 into the reservoir 310, into the inlet 327, through the outlet tubing 326, and from the outlet 320 towards and/or into the external receptacle. In an embodiment, the vacuum source can apply sufficient suction to capture all or substantially all of the urine voided by a user that is collected at the bottom of the urine collecting assembly 302 (i.e., the open proximal end 342) near the inlet 327.

Figure 3C:
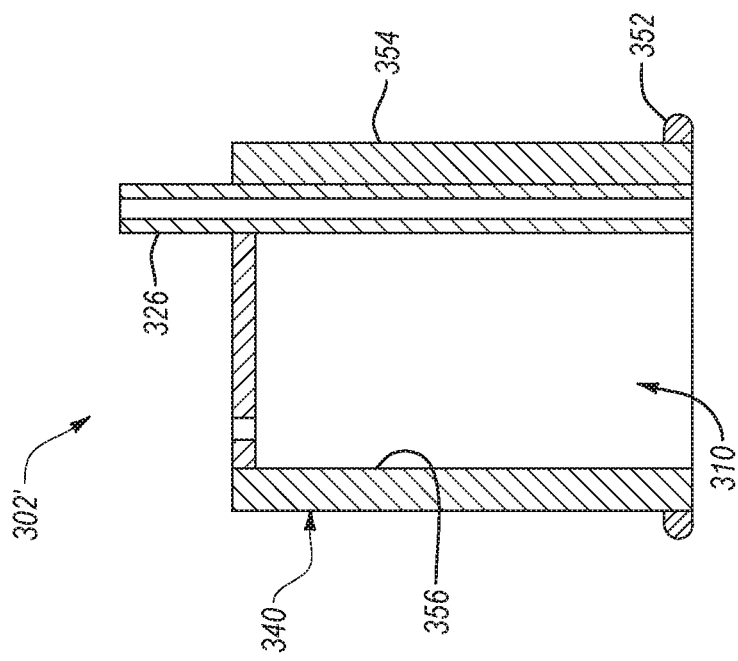
FIG. 3C is a schematic cross-sectional view of a urine collecting assembly according to another embodiment.

FIG. 3C is a schematic cross-sectional view of a urine collecting assembly 302' according to another embodiment. Except as otherwise disclosed herein, the urine collecting assembly 302' can be the same as or substantially similar to the urine collecting assembly 302 of FIGS. 3A-3B. For example, the urine collecting assembly 302' can include a body 340, a reservoir 310 at least partially defined by the body 340, and a tubing 326.

The urine collecting assembly 302' includes at least one attachment mechanism 352 that is configured to reversibly couple the urine collecting assembly 302' to a stabilization accessory (e.g., any of the stabilization accessories disclosed herein). In an embodiment, as illustrated, the attachment mechanism 352 can include at least one protrusion that extends from a surface of the body 340. The at least one protrusion can include a single protrusion (e.g., a nub), a plurality of protrusions (e.g., a plurality of nubs), a continuous annular protrusion extending around an entire circumference of the body 340, or any other suitable protrusion. The protrusion can extend from an external surface 354 of the body 340 (as shown) or can be configured to extend from an internal surface 356 of the body 340. The protrusion can be configured to interact with a feature of the stabilization accessory. For example, the protrusion can be configured to interact with a protrusion formed on a surface of the stabilization accessory (e.g., as illustrated in FIG. 8D) or be configured to be at least partially disposed in a recess formed in the stabilization accessory. As such, the protrusion can reversibly couple the urine collecting assembly 302' to the stabilization accessory by sliding the protrusion of the urine collecting assembly 302' over the protrusion of the stabilization accessory or sliding the protrusion of the urine collecting assembly 302' into the recess of the stabilization accessory. One benefit of the illustrated attachment mechanism 352 is that the protrusion can enable the urine collecting assembly 302' to rotate relative to the stabilization accessory. Further, the protrusion can prevent the urine collecting assembly 302' from being decoupled from the stabilization accessory unless the urine collecting assembly 302' is pulled from the stabilization accessory.

It is noted that the attachment mechanism 352 can include other elements instead of or in conjunction with the protrusion shown in FIG. 3C. For example, the attachment mechanism 352 can include threads that are configured to threadedly couple the urine collecting assembly 302' to the stabilization accessory. In another example, the attachment mechanism 352 can include a convexly or concavely curved surface is configured to interface with a corresponding concavely or convexly curved surface of the stabilization accessory. In another example, the attachment mechanism 352 can include a recess formed therein that is configured to at least partially receive at least one protrusion extending from a surface of the stabilization accessory. In another example, the attachment mechanism 352 can include a magnet or a magnetically attractable material that is configured to interact with a magnet or magnetically attractable material of the stabilization accessory.

Figure 4E:
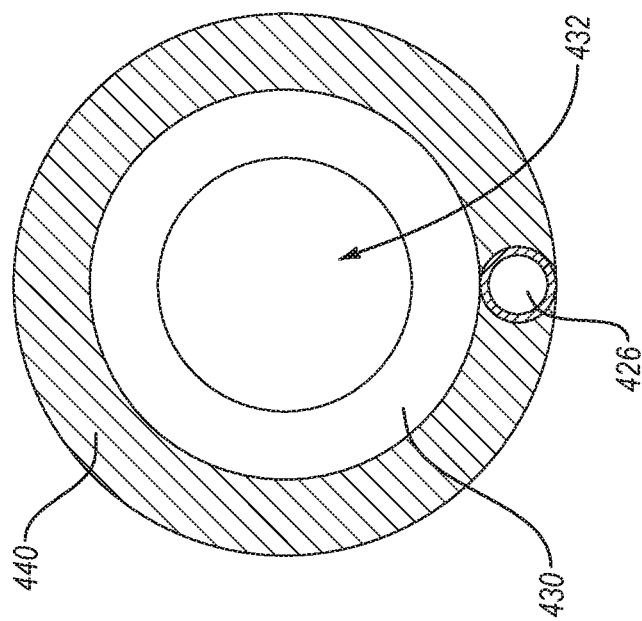
FIG. 4E is a schematic cross-sectional view taken along line 4E-4E of FIG. 4D.

FIGS. 4A-4E illustrate a urine collecting assembly 402 according to another embodiment. FIGS. 4A and 4B are top and bottom perspective views of the urine collecting assembly 402, respectively, according to an embodiment. The urine collecting assembly 402 can be the same or similar in structure and/or function to any of the urine collecting assemblies described herein, such as the urine collecting assemblies 102, 202, or 302. For example, the urine collecting assembly 402 can include at least one of a body 440, a sealing flange 430, or a reservoir 410 (best shown in FIG. 4D, which is a schematic cross-sectional view taken along line 4D-4D of FIG. 4A) within the body 440 and partially defined by the sealing flange 430. The sealing flange 430 defines an opening 432 such that the interior of the body 440 is accessible via the opening 432. A peripheral edge 434 of the opening 432 is configured to seal around a shaft of a penis of a user disposed through the opening 432. The urine collecting assembly 402 also includes an outlet 420 in fluidic communication with the reservoir 410 via outlet tubing 426 (shown in FIG. 4D). The urine collecting assembly 402 can be arranged such that a fluid can flow into the body 440 (e.g., via a urethral opening of a user's penis disposed within the body 440), collect in the reservoir 410, and flow into the outlet tubing 426 via an inlet 427, through the outlet tubing 426, and out of the outlet 420.

Figure 4D:
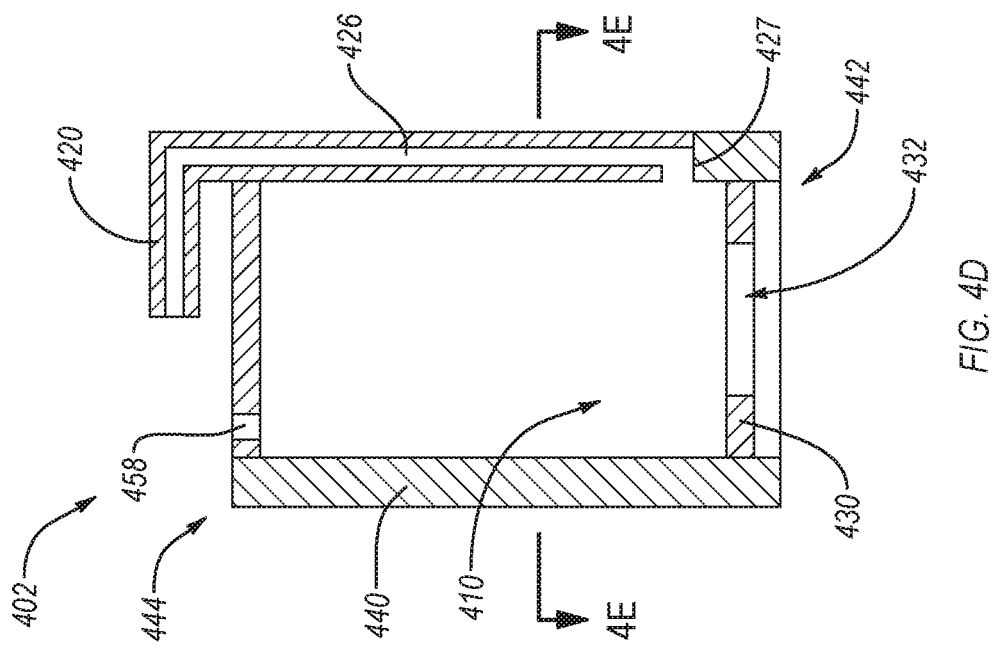
FIG. 4D is a schematic cross-sectional view taken along line 4D-4D of FIG. 4A

The body 440 has a fluid impermeable side wall 446 and a fluid impermeable end wall 448 defining one or more vacuum relief openings 458. The sealing flange 430 can be coupled to the body 440 such that the body 440 in combination with the sealing flange 430 form a cylindrical container with an open proximal end 442 formed by the sealing flange 430 defining the opening 432 to the interior of the body 440 and an at least partially closed distal end 444 formed and closed by the end wall 448. The sealing flange 430 can be flexible and elastic such that the peripheral edge 434 of the sealing flange 430 can seal around an outer surface of a shaft of a penis of a user (not shown) disposed through the opening 432 defined by the sealing flange 430. For example, the sealing flange 430 can be formed from a polymer. Thus, the reservoir 410 can be defined by the sealing flange 430, the side wall 446 of the body 440, and an outer surface of a shaft of a penis of a user disposed through the opening 432. Although sealing flange 430 is shown in FIG. 4D as being recessed from the proximal end of body 440, in other embodiments the sealing flange can be flush with the proximal end of the body.

The urine collecting assembly 402 can be sized such that the reservoir 410 is capable of collecting and temporarily holding a large or small amount of urine until the urine can be removed from the reservoir 410 via the outlet 420. For example, the urine collecting assembly 402 can be sized such that the reservoir 410 is configured to hold a small amount of urine as may be released due to incontinence. In an embodiment, the urine collecting assembly 402 can be sized such that the reservoir 410 is configured to hold a large amount of urine as may be released during voiding of a full bladder. In an embodiment, the urine collecting assembly 402 can be sized such that the reservoir 410 is configured to collect and hold a small or large amount of urine while the urine is simultaneously removed via, for example, gravity and/or a pump, such as a vacuum source the same or similar to the vacuum source 170. In a condition where the flow rate of urine into the urine collecting assembly 402 via the urethral opening of a user's penis is greater than the flow rate of urine through the outlet 420, a temporary backup of urine may occur in the reservoir 410. Thus, the urine collecting assembly 402 can be sized such that the reservoir 410 can contain a volume of fluid that may temporarily accumulate due to the difference in flow rates into and out of the urine collecting assembly 402. Additionally, the urine collecting assembly 402 can be sized to accommodate anatomy of various shapes and sizes within the body 440 and via the opening 432.

As described above, the outlet tubing 426 extends through a portion of the body 440. The side wall 446 of the body 440 includes an inner layer and an outer layer. The inner layer can include, for example, a rectangle-shaped piece of spun plastic, or open or closed cell foam. The outer layer can include, for example, adhesive tape applied to the inner layer when the inner layer has been rolled or folded from a rectangular shape to maintain a cylindrical shape. The outer layer can be any other fluid impermeable material, if the inner layer is fluid permeable. Alternatively, if the inner layer is fluid impermeable, the outer layer may be omitted.

FIG. 4C is a top view of the inner layer of the body 440 and the sealing flange 430, according to an embodiment. The inner layer of the body 440 can define an elongated opening 441. The elongated opening 441 can be shaped and sized to receive the outlet tubing 426 (as shown in FIG. 4E, which is a schematic cross-sectional view taken along line 4E-4E of FIG. 4D) such that the outlet tubing 426 extends through the body 440, through the end wall 448, and out of the top of the urine collecting assembly 402. Thus, fluid can flow from the reservoir 410, through the outlet tubing 426, and from the outlet 420. In such an embodiment, positioning the inlet 427 of the outlet tubing 426 towards the bottom of the reservoir 410 such that less or no urine can pool at the bottom of the reservoir 410 can allow for urine to be removed from the reservoir 410 more quickly and/or completely.

An external receptacle (not shown) can be coupled to the outlet 420 via a discharge line (not shown) such that fluid (e.g., urine) exiting the reservoir 410 via the outlet tubing 426 and the outlet 420 can be collected. The external receptacle and the discharge line can be the same or similar as the external receptacle 160 and the discharge line 122 described above. In an embodiment, a vacuum source (not shown), which can be the same or similar to vacuum source 170 described above, can assist and/or provide the pressure differential needed to draw fluid voided from the urethral opening of a user into the body 440 into the reservoir 410, into the inlet 427, through the outlet tubing 426, and from the outlet 420 towards and/or into the external receptacle. In an embodiment, the vacuum source can apply sufficient suction to capture all or substantially all of the urine voided by a user that is collected at the bottom of the urine collecting assembly 402 (i.e., the open proximal end 442) near the inlet 427.

Figure 5A:
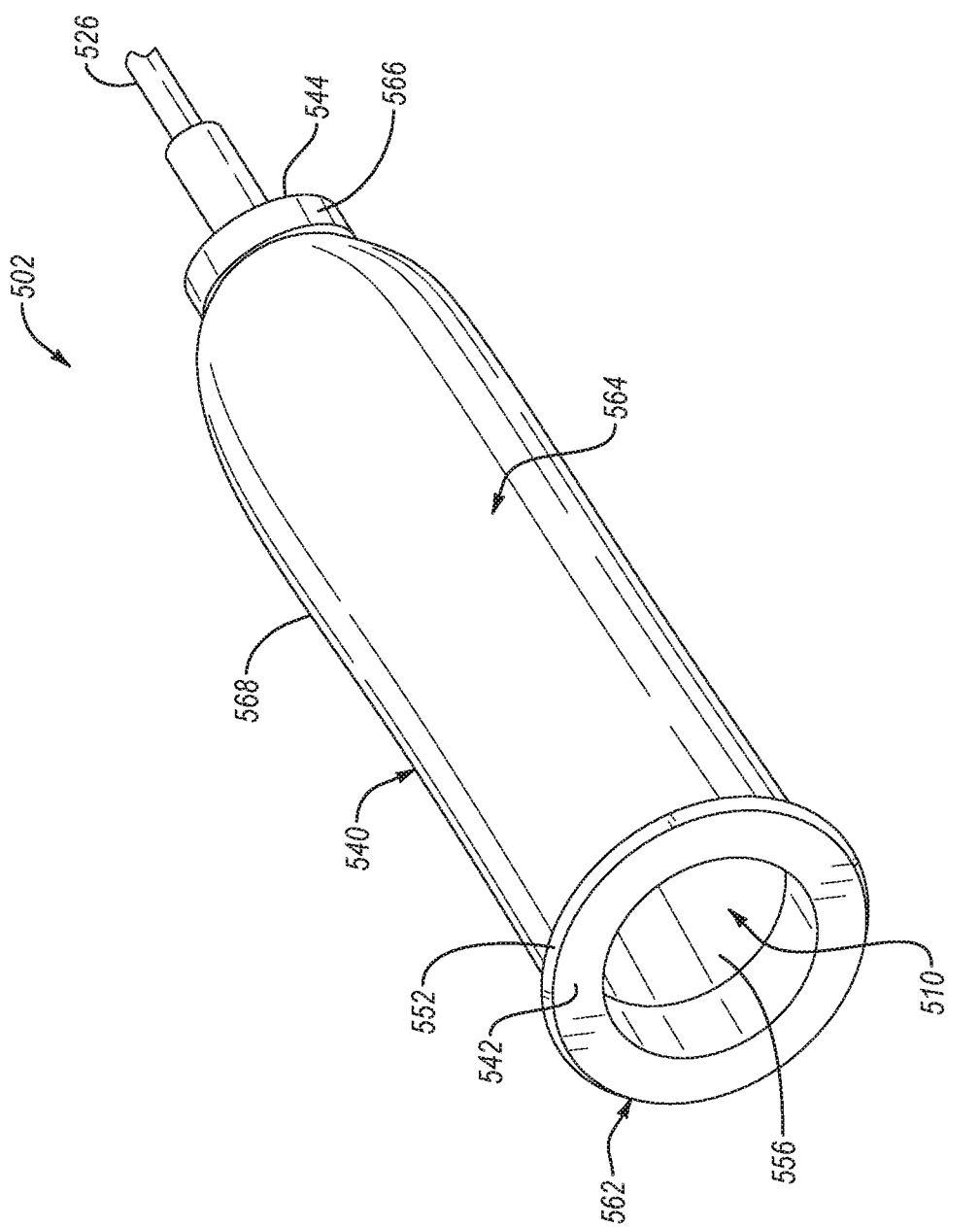
FIGS. 5A and 5B are an isometric view and a schematic cross-sectional view, respectively, of a urine collecting assembly, according to an embodiment.
Figure 5B:
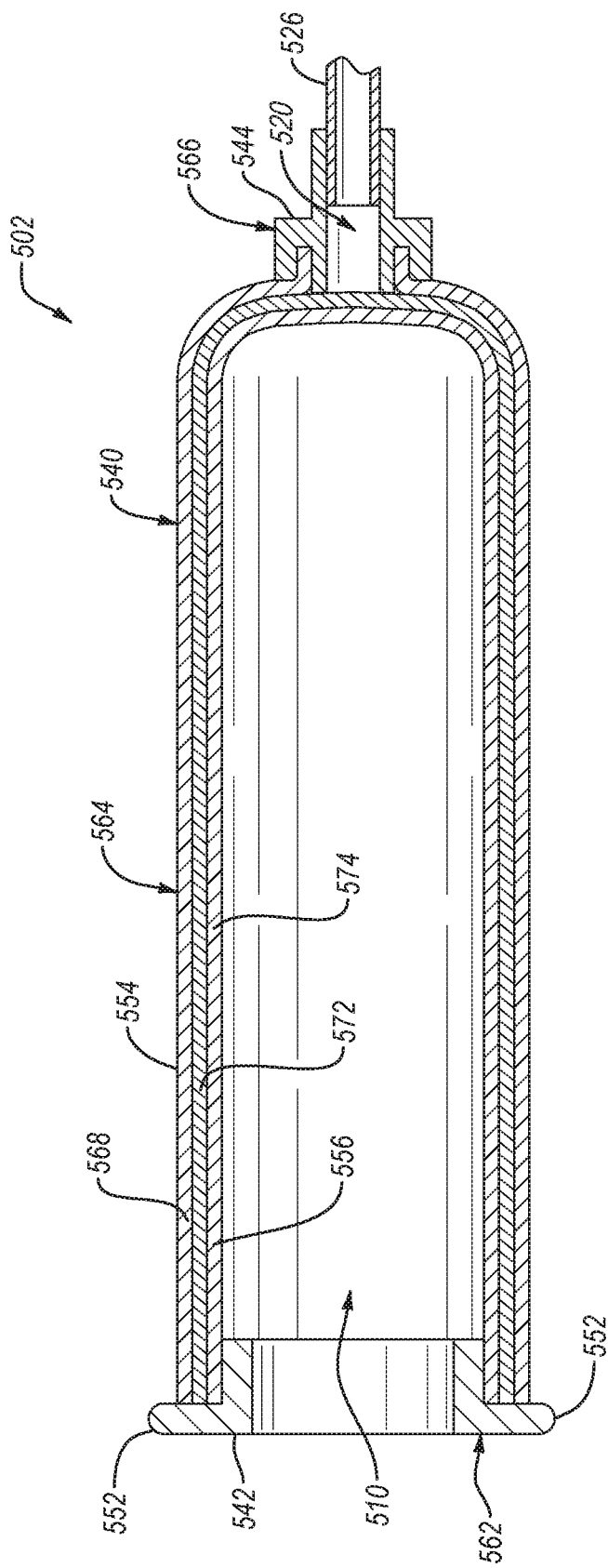

FIGS. 5A and 5B are an isometric view and a schematic cross-sectional view, respectively, of a urine collecting assembly 502, according to an embodiment. Except as otherwise disclosed herein, the urine collecting assembly 502 can be the same as or similar to any of the urine collecting assemblies disclosed herein. For example, the urine collecting assembly 502 can include a body 540 having an open proximal end 542 and an at least partially closed distal end 544, a reservoir 510 at least partially defined by the body 540, and tubing 526 fluidly coupled to the reservoir 510.

The body 540 of the urine collecting assembly 502 can include a ring 562 at or near the open proximal end 542 of the body 540, a sheath 564 extend from or near the open proximal end 542 to or near the at least partially closed distal end 544 of the body 540, and a sump 566 at the at least partially closed distal end 544 of the body 540. In an embodiment, the ring 562, the sheath 564, and the sump 566 are all distinct components from each other. In an embodiment, at least two of the ring 563, the sheath 564, or the sump 566 are integrally formed together (e.g., are formed from a single piece).

The sheath 564 is configured to prevent a fluid (e.g., urine) escaping from the reservoir 510 and to move the fluid towards the sump 566 and the tubing 526. As such, referring to FIG. 5B, the sheath 564 can include a plurality of layers that facilitate the operation of the sheath 564. For example, the sheath 564 can include a fluid impermeable layer 568, a fluid permeable layer 574 (e.g., a one-way fluid movement fabric, gauze, or cloth), and a fluid permeable support 572 positioned between the fluid permeable layer 574 and the fluid impermeable layer 568. The fluid permeable support 572 may include a porous layer (e.g., a spun polymer layer. The fluid impermeable layer 568 can form an external surface 554 of the body 540 and prevent the fluid from leaking through the sheath 564. The fluid permeable layer 574 can form an internal surface 556 of the body 540. The fluid permeable layer 574 can be configured to move the fluid from the reservoir 510 to the fluid permeable support 572 and may substantially prevent the fluid that is in the fluid permeable support 572 from flowing back into the reservoir 510. As such, the fluid permeable layer 574 can remove fluid from around a penis thereby leaving the penis dry. The fluid permeable support 572 can form an inner layer between the fluid permeable layer 574 and the fluid impermeable layer 568. The fluid permeable support 572 can enable the fluid to flow generally towards the tubing 526.

It is noted that one or more layers of the sheath 564 can be omitted. For example, the fluid permeable layer 574 can be omitted such that the fluid permeable support 572 forms the internal surface 556 of the body 540. In such an example, the sheath 564 can rely on the wicking ability of the fluid permeable support 572 and a suction force applied to the urine collecting assembly 502 to remove the fluid from the penis. In another example, the sheath 564 only include the fluid impermeable layer 568. In such an example, the sheath 564 can rely on the suction force applied to the urine collecting assembly 502 to remove the fluid from the penis. In another example, the sheath 564 only includes the fluid impermeable layer 568 and the fluid permeable layer 574. In such an example, the sheath 564 can form a channel (not shown) between the fluid impermeable layer 568 and the fluid permeable layer 574 and the channel is fluidly coupled to the tubing 526.

The fluid permeable layer 574 and/or the fluid permeable support 572 may include permeable material designed to wick or pass fluid therethrough. The permeable properties referred to herein may be wicking, capillary action, diffusion, or other similar properties or processes, and are referred to herein as "permeable" and/or "wicking." Such "wicking" may not include absorption of fluid into the wicking material. Put another way, substantially no absorption of fluid into the material may take place after the material is exposed to the fluid and removed from the fluid for a time. While no absorption is desired, the term "substantially no absorption" may allow for nominal amounts of absorption of fluid into the wicking material (e.g., absorbency), such as less than about 10 wt % of the dry weight of the wicking material, less than about 7 wt %, less than about 5 wt %, less than about 3 wt %, less than about 2 wt %, less than about 1 wt %, or less than about 0.5 wt % of the dry weight of the wicking material. Wicking material can include natural fibers. In such examples, the material may have a coating to prevent or limit absorption of fluid into the material, such as a water repellent coating.

The sheath 564 is configured to have a penis disposed therein. To facilitate fluid collection and improve comfort, the sheath 564 can be flexible thereby allowing the sheath 564 to correspond to the shape of a penis. For example, the flexible sheath 564 can at least partially collapse when the penis is not erect and at least partially expand and bend to the shape of the penis as the penis becomes erect. Forming the layers of the sheath 564 from at least one of thin layers (e.g., less than 500 μm thick, and more particularly less than 250 μm thick, less than 100 μm thick, or less than 50 μm thick), flexible layers, or fabric can allow the sheath 564 to be sufficiently flexible.

The ring 562 can be more rigid than the sheath 564. For example, the ring 562 can be formed from a flexible polymer that is at least one of thicker than the entire sheath 564 or exhibits a Young's modulus that is greater than sheath 564. As such, the ring 562 can provide some structure at or near the open proximal end 542 of the body 540. The increased rigidity of the ring 562 can cause the open proximal end 542 to remain open thereby facilitating insertion of a penis into the urine collecting assembly 502. Further, in an embodiment, the increased rigidity of the ring 562 can enable the ring 562 to act as an attachment mechanism (e.g., similar to the attachment mechanism 352 of FIG. 3C). For example, as illustrated, the ring 562 can include at least one protrusion 552 that extends from the rest of the body 540. In another example, the ring 562 can define a recess, include threads, or include any other attachment mechanism disclosed herein.

The sump 566 is configured to attach the rest of the urine collecting assembly 502 to the tube 526. For example, the sump 566 can define an outlet 520 extending through at least the fluid impermeable layer 568 thereby coupling the tubing 526 to the fluid permeable support 572 and/or the reservoir 510. Further, the sump 566 can close the at least partially closed distal end 544 of the body 540. For example, the sump 566 can bunch up the sheath 564 and close any gaps that may form.

The ring 562, the sheath 564, the sump 566, and the tubing 526 can be attached together using any suitable method. For example, at least two of the ring 562, the sheath 564, the sump 566, or the tubing 526 can be attached together using at least one of an interference fit, an adhesive, stitching, welding (e.g., ultrasonic welding), tape, any other suitable method, or combinations thereof.

Figure 5C:
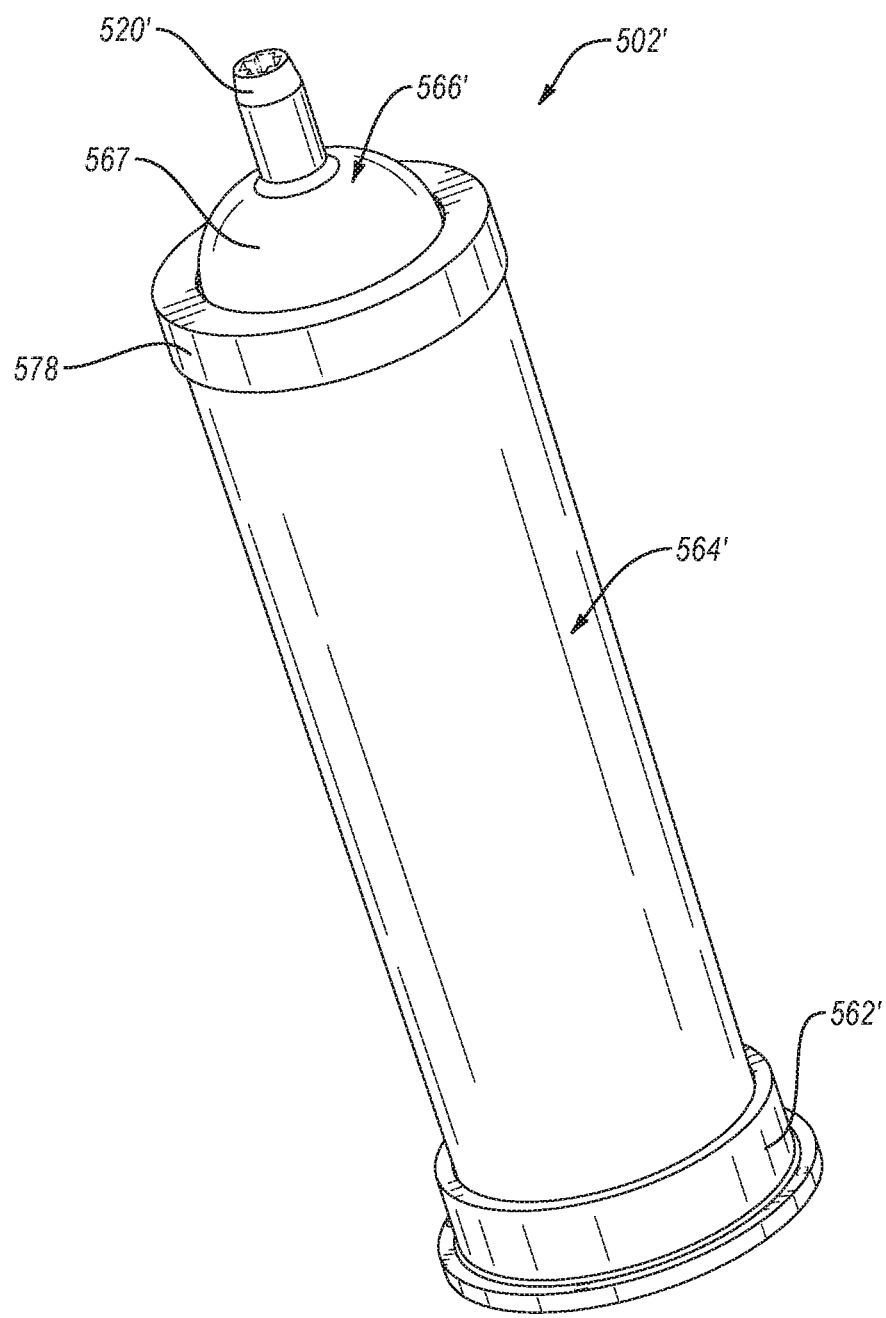
FIGS. 5C and 5D are an isometric view and a cross-sectional view, respectively, of a urine collecting assembly, according to an embodiment.
Figure 5D:
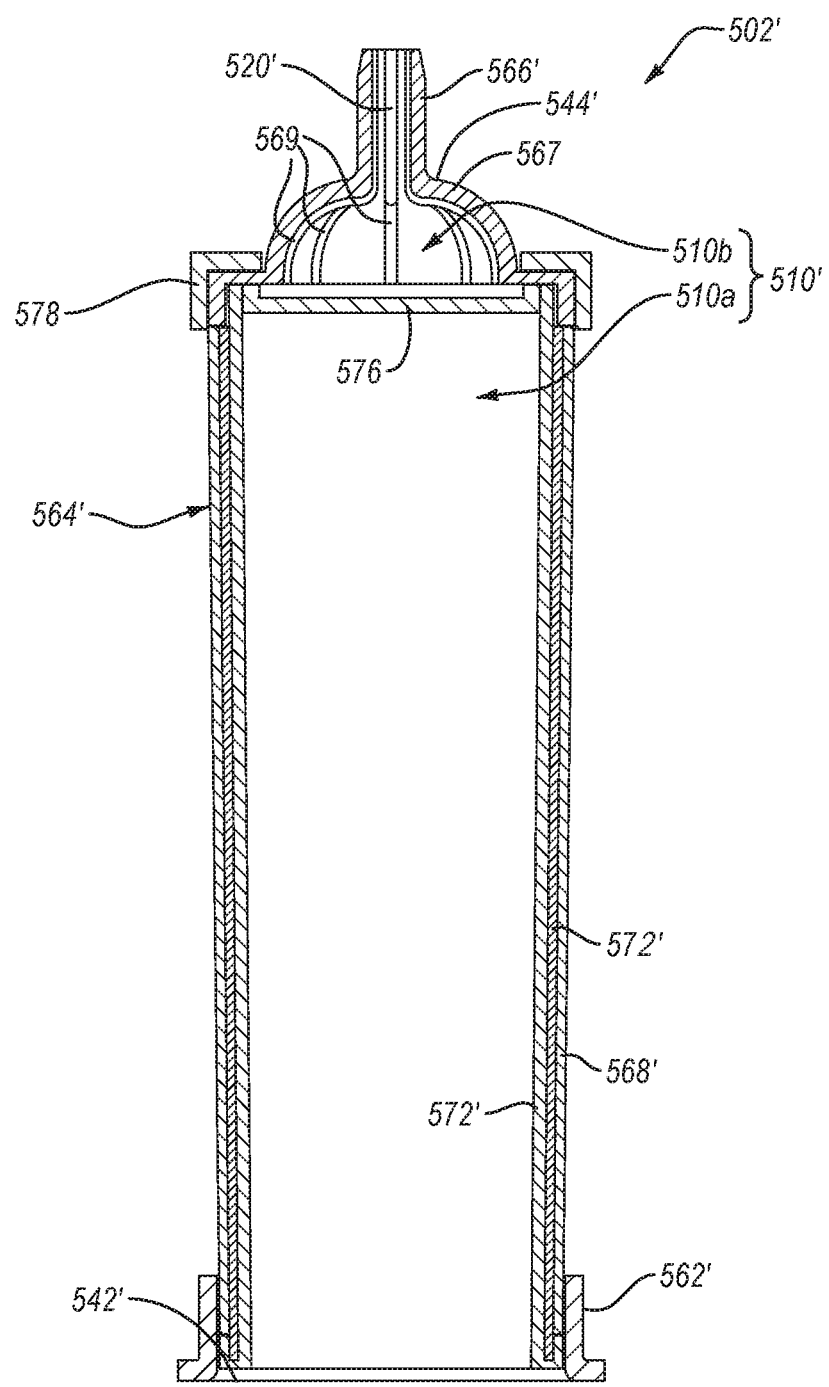

FIGS. 5C and 5D are an isometric view and a cross-sectional view, respectively, of a urine collecting assembly 502', according to an embodiment. Except as otherwise disclosed herein, the urine collecting assembly 502' may be the same as or substantially similar to any of the urine collecting assemblies disclosed herein. For example, similar to the urine collecting assembly 502 of FIGS. 5A and 5B, the urine collecting assembly 502' may include a ring 562', a sheath 564' (e.g., at least one of a fluid impermeable layer 568', a fluid permeable support 572', or a fluid permeable layer 574'), and a sump 566'.

The urine collecting assembly 502' includes a reservoir 510' that is configured to receive and at least temporarily store fluids from a user of the urine collecting system 500' therein. The reservoir 510' may include one or more sections. For example, the reservoir 510' may include a first section 510a that is defined by the sheath 564'. However, as illustrated, the reservoir 510' may include one or more additional sections that are defined by one or more additional components of the urine collecting assembly 502'. For example, sump 566' may exhibit a bulbous portion 567 extending from an outlet 520' of the sump 566' towards an open proximal end 542' of the sheath 564'. The bulbous portion 567 may define a second section 510b of the reservoir 510'. The second section 510b may provide a location to store the fluid that is spaced from a penis of a user that is partially disposed in the urine collecting assembly 502'. As such, the second section 510b may decrease the amount of fluids that contact the penis.

The sheath 564' extends from or near an open proximal end 542' of the urine collecting assembly 502' to or near an at least partially closed distal end 544' of the urine collecting assembly 502'. However, in an embodiment, the portion of the sheath 564' at or near the at least partially closed distal end 544' defines a hole (e.g., opening). In such an embodiment, the urine collecting assembly 502' may include a porous top layer 576 that at least partially covers the hole. The porous top layer 576 may separate the first section 510a of the reservoir 510' from the second section 510b of the reservoir 510'.

The porous top layer 576 may be the same as or substantially similar to any of the fluid impermeable supports or fluid permeable layers disclosed herein. For example, the porous top layer 576 may include a one-way fluid movement fabric, thereby allowing fluid to flow from the first section 510a of the reservoir 510' to the second section 510b of the reservoir 510' while preventing the fluid from flowing from the second section 510b back to the first section 510a. As such, the porous top layer 576 may decrease the amount of fluid that contacts the penis when the porous top layer 576 includes the one-way fluid movement fabric. However, it is noted that the porous top layer 576 may include gauze, other types of fabric, or any other suitable porous material instead of or in addition to the one-way fluid movement fabric.

As previously discussed, the sump 566' includes a bulbous portion 567. The sump 566' may also include one or more ridges 569 extending from or near the outlet 520' towards the open proximal end 542'. In an embodiment, the ridges 569 may direct any fluids that are in the second section 510b of the reservoir 510' towards the outlet 520. In an embodiment, the ridges 569 may provide at least some structural support to the bulbous portion 567 such that ridges 569 resist the deformation and/or collapse of the bulbous portion 567. It is noted that the bulbous portion 567 may include one or more structural elements instead of or in addition to the ridges 569. For example, the bulbous portion 567 may define one or more recesses that resist bending stresses.

The sump 566' may be exposed to the atmosphere, which allows the sump 566' to be visible, and may be exposed to an interior of the urine collecting assembly 502'. As such, the sump 566' may provide fluid communication between the atmosphere and the interior of the urine collecting assembly 502' and/or provide information. For example, the sump 566' may be formed from a porous material that is configured to assist in suction balance. In an embodiment, the sump 566' may be formed from a material that is configured to change color or state when exposed to bacteria to indicate that an individual using the urine collecting assembly 502' has an infection.

The urine collecting assembly 502' may include an upper ring 578. The upper ring 578 may be configured to be positioned adjacent to the portion of the sump 566' that is connected to the sheath 564'. In an embodiment, the upper ring 578 provides additional strength and/or rigidity to the portion of the sump 566' that is connected to the sheath 564'. For example, the sheath 564' may be flexible, thereby allowing the sheath 564' to conform to the environment as well as gravity to create a shape that conforms to the anatomy of the individual wearing the urine collecting assembly 502' thus giving the urine collecting assembly 502' an adjustable length. Meanwhile, the upper ring 578 provides some rigidity to the urine collecting assembly 502', thereby inhibiting leakage and patient injuries that the sheath 502', by itself, cannot prevent. In an embodiment, the upper ring 578 may be connected to the sheath 564'. In such an embodiment, the upper ring 578 may be connected to the sheath 564' along with the sump 566' thereby increasing the attachment strength between the sheath 564' and the sump 566' or the upper ring 578 may indirectly connect the sump 566' to the sheath 564' (e.g., only the upper ring 578 is directly connected to the sheath 564').

In an embodiment, the upper ring 578 may include a writeable area that is configured to receiving one or more markings thereon, for example, from a pencil or marker. The writeable area of the upper ring 578 may allow medical practitioners to indicate when the urine collecting assembly 502' was disposed on the individual or to indicate other useful information. In an embodiment, the upper ring 578 may include a material that exhibits a color change at or around a certain time after being exposed to air which allows the upper ring 578 to indicate how long the urine collecting assembly 502' has been in use.

In an embodiment, a stabilizer or stabilization accessory can be used to maintain any of the urine collecting assemblies described herein in a particular position relative to a user's body. For example, FIG. 6A is a schematic top view of a stabilization accessory 680, according to an embodiment. The stabilization accessory 680 can be the same or similar in structure and/or function to the stabilization accessory 180 described above with reference to FIG. 1. As shown in FIG. 6A, the stabilization accessory 680 defines an opening 682 configured to receive an urine collecting assembly 602 (shown in FIGS. 6B-6D), such as any of the urine collecting assemblies described herein. The size and shape of the opening 682 substantially corresponds to the size and shape of the urine collecting assembly 602, thereby preventing a fluid (e.g., urine) from flowing through the gap between the stabilization accessory 680 and the urine collecting assembly 602. The opening 682 can also extend completely through the stabilization accessory 680 thereby allowing a penis of a user of the stabilization accessory 680 to be fluidly coupled to a reservoir 610 (shown in FIG. 6C) of the urine collecting assembly 602. The stabilization accessory 680 can include a top surface 684 and an opposing bottom surface 686. The bottom surface 686 can be configured to contact a region about a user's penis.

The stabilization accessory 680 can be shaped and sized such that it can be disposed on a user's body (e.g., disposed about the user's penis). For example, the bottom surface 686 can exhibit a shape that substantially corresponds (e.g., substantially conforms) to a shape of region that is about the user's penis. In such an example, the bottom surface 686 can exhibit a concave curvature that substantially corresponds to the convex curvature of the region about the user's penis. In another example, at least a portion of the stabilization accessory 680 can be flexible such that the stabilization accessory 680 can be bent, flexed, or otherwise deformed to correspond to the shape of the region that is about the user's penis.

In an embodiment, the bottom surface 686 can include an adhesive (e.g., a hydrocolloid adhesive) that is configured to attach the stabilization accessory 680 to the user. The adhesive can also prevent the formation of gaps between the bottom surface 686 and the region about the user's penis when the user moves thereby preventing leaks between the region about the user's penis and the stabilization accessory 680.

The stabilization accessory 680 can maintain the urine collecting assembly 602 in a certain position and/or at a particular angle relative to a user's body (e.g., at an angle that is about 90°, less than about 90°, or greater than about 90° relative to an axis running along the length of a user lying supine). For example, in some situations of use, such as incontinence, disability that impairs mobility, restricted travel conditions (e.g., conditions experience by pilots, drivers, and/or workers in hazardous areas), monitoring, or for clinical testing, the stabilization accessory 680 can aid in maintaining the sealing engagement between the urine collecting assembly 602 and the user's penis. The stabilization accessory 680 can also enable the urine collecting assembly 602 to freely rotate within the opening 682, such as rotate in response to movement from the user. As previously discussed, allowing the urine collecting assembly 602 to rotate in the opening 682 can eliminate kinking, prevent links, and prevent pulling on the region about the user's penis while the user moves.

Figure 6B:
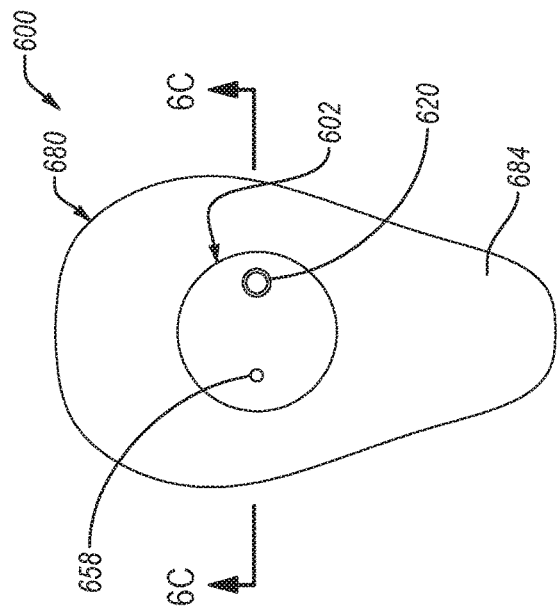
FIGS. 6B-6D show a top view, a front cross-sectional view, and a side view of a urine collecting system that includes the stabilization accessory engaged with the urine collecting assembly, according to an embodiment.
Figure 6D:
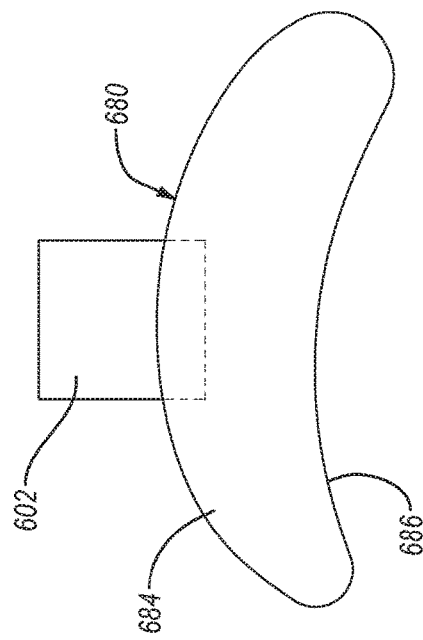
Figure 6A:
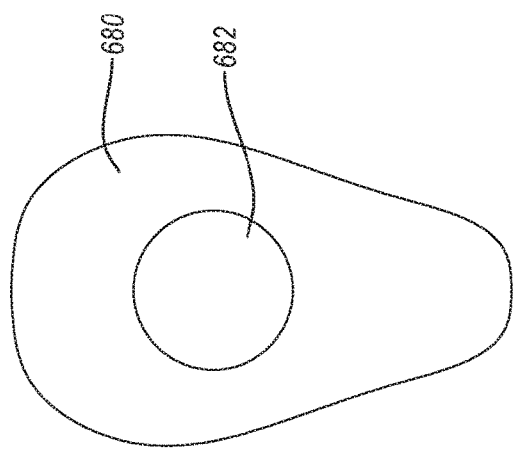
FIG. 6A is a schematic top view of a stabilization accessory, according to an embodiment.
Figure 6C:
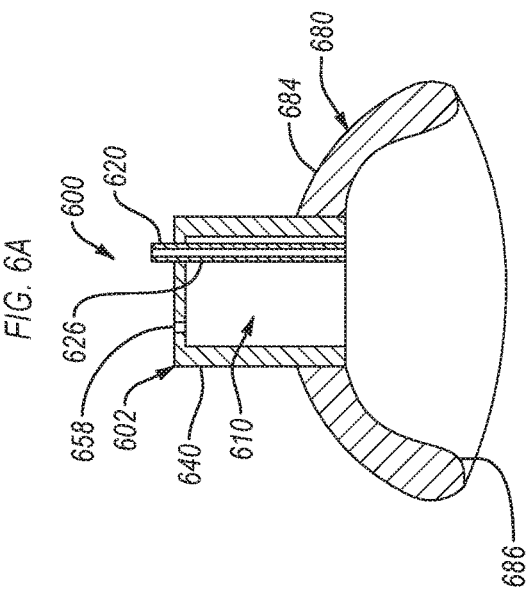

FIGS. 6B-6D show a top view, a front cross-sectional view, and a side view of a urine collecting system 600 that includes the stabilization accessory 680 engaged with the urine collecting assembly 602, according to an embodiment. The urine collecting assembly 602 can be the same or similar in structure and/or function to any of the urine collecting assemblies described herein. For example, the urine collecting assembly 602 can include a body 640 that defines a reservoir 610, an outlet 620 that can include an outlet tube 626, and one or more vacuum relief openings 658 formed in the body 640. In an embodiment, as shown in FIGS. 6B-6C, the urine collecting assembly 602 includes an outlet 620 extending from the top of the urine collecting assembly 602. In another embodiment (not shown), the urine collecting assembly 602 includes an outlet extending from the side of the urine collecting assembly 602. In such an embodiment, the stabilization accessory 680 can define a passageway through which a discharge line (not shown) can extend if the stabilization accessory 680 would otherwise at least partially obstruct the outlet.

Although shown in FIGS. 6A-6D as being a particular shape, the stabilization accessory can be any suitable shape and size. For example, FIG. 7A is a top view of a stabilization accessory 780 with an oblong shape, according to an embodiment. The stabilization accessory 780 can be the same or similar in structure and/or function to the stabilization accessory 180 or the stabilization accessory 580 described above. For example, the stabilization accessory 780 defines an opening 782 configured to receive an urine collecting assembly 702 (shown in FIG. 7B). The size and shape of the opening 782 substantially corresponds to the size and shape of the urine collecting assembly 702, thereby preventing a fluid (e.g., urine) from flowing through the gap between the stabilization accessory 780 and the urine collecting assembly 702. The opening 782 can also enable the urine collecting assembly 702 to rotate therein. In an embodiment, the stabilization accessory 780 can be secured to the user's body via, for example, adhesive tape or a hydrocolloid.

The stabilization accessory 780 can maintain the urine collecting assembly 702 in a certain position and/or at a particular angle relative to a user's body, such as an angle that is equal to, less than, or greater than about 90°. In an embodiment, maintaining the urine collecting assembly 702 in a certain position and/or a particular angle can aid in maintaining the sealing engagement between the urine collecting assembly 702 and the user's penis.

Figure 7B:
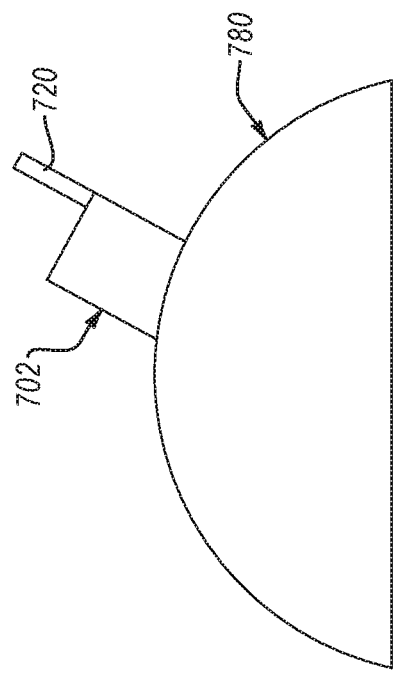
FIG. 7B is a side view of a urine collecting system that includes the stabilization accessory engaged with the urine collecting assembly, according to an embodiment.
Figure 7A:
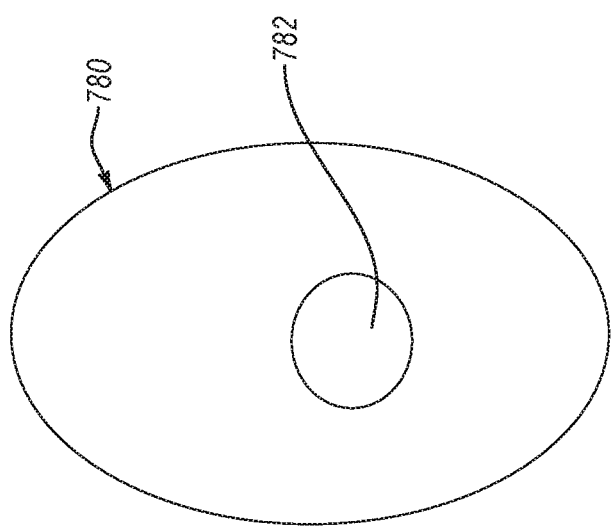
FIG. 7A is a top view of a stabilization accessory with an oblong shape, according to an embodiment.

FIG. 7B is a side view of a urine collecting system 700 that includes the stabilization accessory 780 engaged with the urine collecting assembly 702, according to an embodiment. The urine collecting assembly 702 can be the same or similar in structure and/or function to any of the urine collecting assemblies described herein. The urine collecting assembly 702 includes an outlet 720 extending from the top of the urine collecting assembly 702.

Figure 8A:
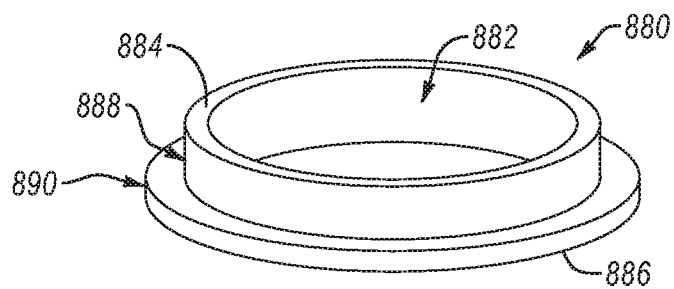
FIG. 8A is an isometric view of a stabilization accessory, according to an embodiment.

FIG. 8A is an isometric view of a stabilization accessory 880, according to an embodiment. The stabilization accessory 880 can be the same or similar in structure and/or function to any of the stabilization accessories disclosed herein. The stabilization accessory 880 includes a raised portion 888 including a top surface 884 of the stabilization accessory 880 and a base portion 890 including a bottom surface 886 of the stabilization accessory 880. The raised portion 888 can extend upwardly from the base portion 890 and can exhibit an annular generally cylindrical shape. In an embodiment, the raised portion 888 is distinct from the base portion 890. In such an embodiment, the raised portion 888 can be attached to the base portion 890. In another embodiment, at least a portion of the raised portion 888 and at least a portion of the base portion 890 are integrally formed together.

The raised portion 888 and, optionally, the base portion 890 of the stabilization accessory 880 defines an opening 882. The opening 882 is configured to receive a urine collecting assembly 802 (shown in FIG. 8B). The size and shape of the opening 882 substantially corresponds to the size and shape of the urine collecting assembly 802 thereby preventing a fluid (e.g., urine) from flowing through a gap between the stabilization accessory 880 (e.g., the raised portion 888 and/or the base portion 890) and the urine collecting assembly 802. The opening 882 is also configured to enable the urine collecting assembly 802 to freely rotate therein.

The stabilization accessory 880 can be shaped and sized such that it can be disposed on a user's body (e.g., disposed about the user's penis). In an embodiment, the bottom surface 886 of the base portion 890 can exhibit a shape that corresponds to the region about the user's penis. In an embodiment, the base portion 890 can be flexible, thereby allowing the base portion 890 to be deformed such that the bottom surface 886 exhibits a shape that corresponds to the region about the user's penis. In an embodiment, the bottom surface 886 of the base portion 890 may exhibit a size (e.g., surface area) that allows the stabilization accessory 880 to be securely attached to the region about the user's penis. In an example, the bottom surface 886 may exhibit a surface area of at least about 5 cm$^2$ to about 10 cm$^2$, about 7.5 cm$^2$ to about 15 cm$^2$, about 10 cm$^2$ to about 20 cm$^2$, about 15 cm$^2$ to about 25 cm$^2$, about 20 cm$^2$ to about 30 cm$^2$, about 25 cm$^2$ to about 35 cm$^2$, about 30 cm$^2$ to about 40 cm$^2$, about 35 cm$^2$ to about 45 cm$^2$, about 40 cm$^2$ to about 50 cm$^2$, about 45 cm$^2$ to about 60 cm$^2$, about 50 cm$^2$ to about 70 cm$^2$, about 60 cm$^2$ to about 80 cm$^2$, about 70 cm$^2$ to about 90 cm$^2$, about 80 cm$^2$ to about100 cm$^2$, about 90 cm$^2$ to about 120 cm$^2$, about 110 cm$^2$ to about 140 cm$^2$, about 130 cm$^2$ to about 160 cm$^2$, about 150 cm$^2$ to about 200 cm$^2$, or greater than about 200 cm$^2$. In an example, the bottom surface 886 may exhibit an dimension (e.g., diameter) of at most about 30 cm, at most about 25 cm, at most about 20 cm, at most about 15 cm, at most about 10 cm, or in ranges of about 10 cm to about 20 cm, about 15 cm to about 25 cm, or about 20 cm to about 30 cm. In an embodiment, the bottom surface 886 may exhibit a minimum width measured from an inner periphery of the bottom surface 886 to an outer periphery of the bottom surface 886 that is at most about 7.5 cm, at most about 5 cm, at most about 2.5 cm, at most about 1 cm, or in ranges of about 1 cm to about 3 cm, about 2 cm to about 4 cm, about 3 cm about 5 cm, about 4 cm to about 6 cm, or about 5 cm to about 7.5 cm. The size of the bottom surface 886 may depend on, for example, the strength of the attachment between the base portion 890 and the region about the users since increasing the size of the bottom surface 886 generally increases the attachment strength between the bottom surface 886 and the region about the user's penis.

The bottom surface 886 can include an adhesive that is configured to couple the stabilization accessory 880 to the region of the user about the user's penis. The adhesive can prevent the formation of gaps between the bottom surface 886 and the region about the user's penis even when the user moves. In other words, the base portion 890 can form an at least substantially fluid tight seal against the region about the user's penis. In an embodiment, the base portion 890 of the can include (e.g., consist of) a patch that includes the adhesive. For example, the base portion 890 can include a DuoDERM® patch or another suitable hydrocolloid patch.

Figure 8B:
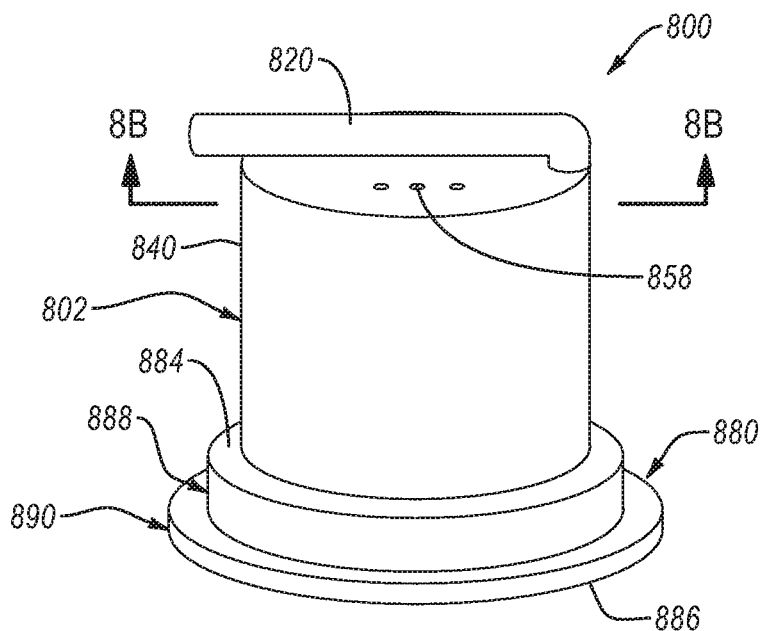
FIGS. 8B and 8C is an isometric view and a schematic cross-sectional view, respectively, of a urine collecting system that includes the stabilization accessory engaged with an urine collecting assembly, according to an embodiment.
Figure 8C:
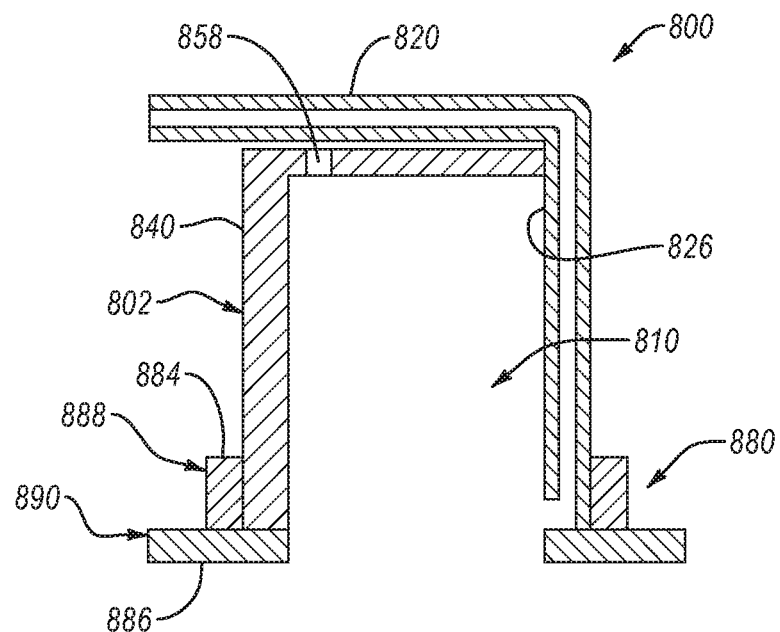
Figure 8D:
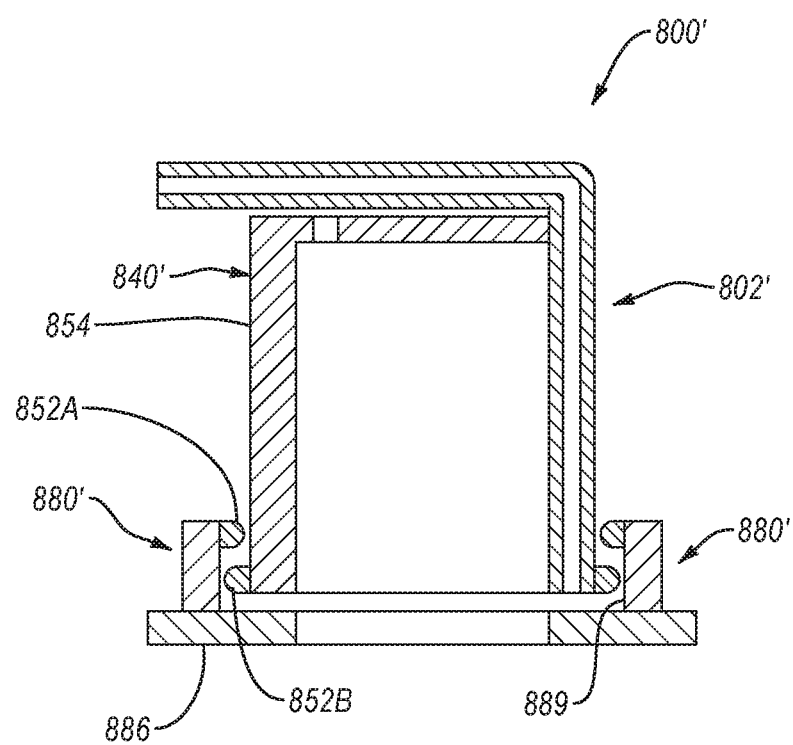
FIG. 8D is a schematic cross-sectional view of a urine collecting system that includes a stabilization accessory engaged with a urine collecting assembly, according to an embodiment.

FIGS. 8B and 8C is an isometric view and a schematic cross-sectional view, respectively, of a urine collecting system 800 that includes the stabilization accessory 880 engaged with an urine collecting assembly 802, according to an embodiment. The urine collecting assembly 802 can be the same or similar in structure and/or function to any of the urine collecting assemblies described herein. For example, the urine collecting assembly 802 can include a body 840 that defines a reservoir 810, and outlet 820 that includes an outlet tube 826, and one or more vacuum relief openings 858 formed in the body 840.

In an embodiment, as shown, the urine collecting assembly 802 does not include a sealing flange. Instead, the stabilization accessory 880 can form an at least substantially fluid tight seal against the region about the user's penis, thereby preventing urine from leaking from the system 800. The at least substantially fluid tight seal can enable urine that is discharged from the user's penis to pool at an intersection between the stabilization accessory 880 and the region about the user's penis substantially without leaking the urine from the urine collecting system 800 without contacting the penis. This allows the system 800 to be used with a penis that exhibit a diameter or a length that is insufficient to be used with the sealing flange. Further, the stabilization accessory 880 can also stabilize the urine collecting assembly 802 (e.g., maintain the correct position of the urine collecting assembly 802 relative to the penis) without contacting the penis. However, it is noted that the urine collecting assembly 802 can include a sealing flange thereby forming an additional mechanism to prevent urine from leaking from the system 800.

FIG. 8D is a schematic cross-sectional view of a urine collecting system 800' that includes a stabilization accessory 880' engaged with a urine collecting assembly 802', according to an embodiment. Except as otherwise disclosed herein, the stabilization accessory 880' can be the same as or similar to the stabilization accessory 880 of FIGS. 8A-8C and the urine collecting assembly 802' is the same as or similar to the urine collecting accessory 880' of FIGS. 8B-8C.

The stabilization accessory 880' includes a first attachment mechanism 852A and the urine collecting assembly 802' includes a second attachment mechanism 852B. The first attachment mechanism 852A and the second attachment mechanism 852B interact with each other in a manner that allows the urine collecting assembly 802' to be securablely and reversibly coupled to the stabilization accessory 880'. In an embodiment, as illustrated, the first attachment mechanism 852A includes at least one protrusion extending from an internal surface 889 of the stabilization accessory 880'. Similarly, the second attachment mechanism 852B includes a protrusion extending from an external surface 854 of the body 840'. The first and second attachment mechanisms 852A, 852B reversibly couple the urine collecting assembly 802' to the stabilization accessory 880' because the first attachment mechanism 852A defines an internal diameter of the stabilization accessory 880' that is smaller than an external diameter of the urine collecting assembly 802' defined by the second attachment mechanism 852B. As such, coupling and decoupling the urine collecting assembly 802' from the stabilization accessory 880' can require an external force applied thereto before the second attachment mechanism 852B slides over the first attachment mechanism 852A.

It is noted that at least one of the first or second attachment mechanism 852A, 852B can be include any of the attachment mechanisms disclosed herein. For example, one of the first or second attachment mechanism 852A, 852B can include at least one protrusion and the other of the first or second attachment mechanism 852A, 852B can include at least one recess that is configured to receive the protrusion. In another example, the first and second attachment mechanisms 852A, 852B can include threads. In an embodiment, at least one of the first or second attachment mechanism 852A, 852B may be omitted from the stabilization accessory 880', as shown in FIG. 8C. In such an embodiment, the urine collecting assembly 802' may be maintained in the stabilization accessory 880' via friction.

The stabilization accessories disclosed herein, up to this point, exhibit a single piece construction or are formed of two or more pieces that are permanently coupled together. However, in some embodiments, any of the stabilization accessories disclosed herein can be formed from two or more pieces, such as a first piece and a second piece, that are reversibly coupled together. Forming the stabilization accessories from two or more pieces has several benefits. For example, one of the two or more pieces (e.g., the first piece) can be semi-permanently coupled to a user and another of the two or more pieces (e.g., the second piece) can be temporarily coupled to the user via the first piece. This allows portions of the stabilization accessory to be decoupled from the user to examine underlying anatomy, be disposed of, replaced the when damaged, etc. In another example, forming the stabilization accessory from two or more pieces can allow portions of the stabilization accessory to be removed when a fluid is not actively being removed from the individual thereby decreasing the profile of the stabilization accessory and allowing a user to wear portions of the stabilization accessory more discretely.

Figure 9A:
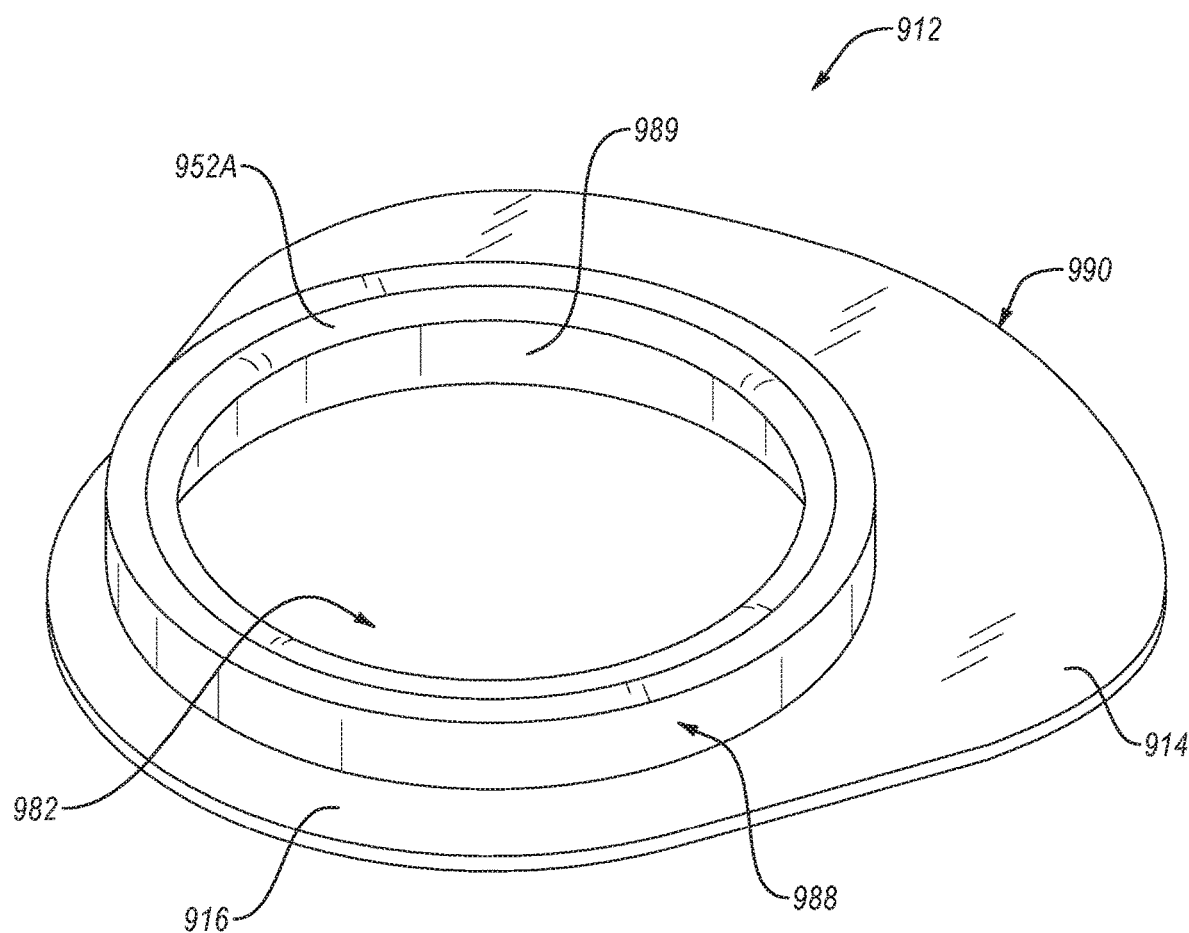
FIG. 9A is an isometric view of a first piece of a stabilization accessory (shown assembled in FIG. 9C), according to an embodiment.

FIG. 9A is an isometric view of a first piece 912 of a stabilization accessory 980 (shown assembled in FIG. 9C), according to an embodiment. The first piece 912 includes a base portion 990 defining an opening 982 and a raised portion 988 extending from a portion of the base portion 990 defining the opening 982. Except as otherwise disclosed herein, the first piece 912 can be formed of any of the same or similar materials as, exhibit any of the same or similar properties of, or exhibit any of the elements of any of the stabilization accessories disclosed herein. For example, the first portion 912 can be formed of a flexible material, can include an adhesive on a bottom surface 986 (shown in FIG. 9C), etc.

The base portion 990 can exhibit any suitable shape. In an embodiment, the base portion 990 exhibits a rounded generally triangular shape, as shown in FIG. 9A. The opening 982 can be located on one side of the base portion 990 near one of the vertices of the base portion 990. This causes the base portion 990 to exhibit a primary attachment portion 914 that is on the side of the base portion 990 that is opposite the opening 982 and a secondary attachment portion 916 that surrounds the opening 982. The primary attachment portion 914 exhibits a surface area that is significantly larger than the secondary attachment portion 916. As such, the primary attachment portion 914 can be configured to couple the base portion to less sensitive regions of the user (e.g., a public mound) while the secondary attachment portion 914 can be configured to be coupled to more sensitive regions of the user (e.g., around the penis, the scrotum, or the perineal region). It is noted that any of the stabilization accessories disclosed herein can exhibit the rounded generally triangular shape of the base portion 990 and/or the openings thereof can be off centered thereby forming a primary and second attachment portions.

Figure 9B:
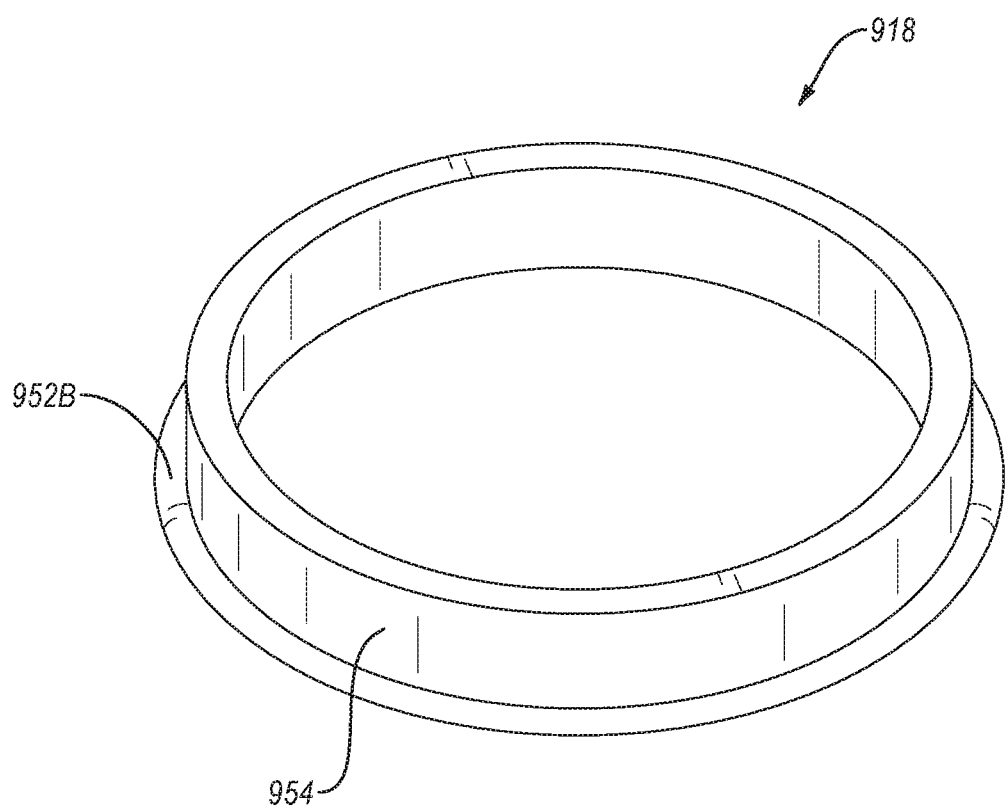
FIG. 9B is an isometric view of the second piece of the stabilization accessory (shown assembled in FIG. 9C), according to an embodiment.
Figure 9C:
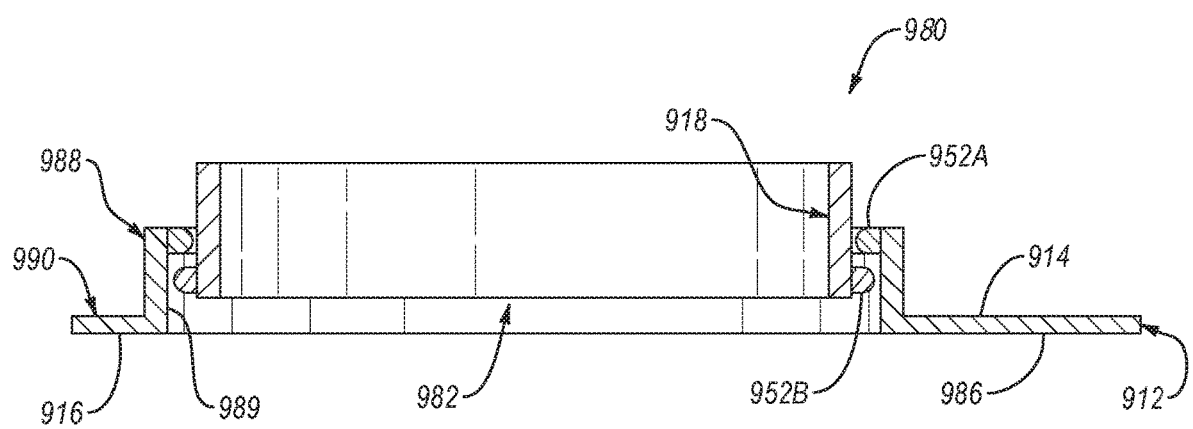
FIG. 9C is a schematic cross-sectional view of the assembled stabilization accessory, according to an embodiment.

The raised portion 988 can be configured to be reversibly coupled to a second piece 918 (shown in FIGS. 9B and 9C). For example, the raised portion 988 can include at least one first attachment mechanism 952A on an internal surface 989 thereof. The first attachment mechanism 952A can include any of the attachment mechanisms 952A disclosed herein, such as at least one protrusion.

FIG. 9B is an isometric view of the second piece 918 of the stabilization accessory 980 (shown assembled in FIG. 9C), according to an embodiment. Except as otherwise disclosed herein, the second piece 918 can be formed of any of the same or similar materials as, exhibit any of the same or similar properties of, or exhibit any of the elements of any of the stabilization accessories disclosed herein.

The second piece 918 exhibits a shape that substantially corresponds to the shape of the raised portion 988 of the first piece 912. The second piece 918 also exhibits a cross-sectional dimension (e.g., diameter) that is slightly smaller than a cross-sectional dimension of the opening 982 of the second piece 912. As such, the shape and the cross-sectional dimension of the second piece 918 allows the second piece 918 to fit within the first piece 912. However, the second piece 918 can exhibit a height measured perpendicularly to the cross-sectional dimension that is greater than the raised portion 988 of the first piece 912. The larger height of the second piece 918 can allow the second piece 918 to extend above the raised portion 988 of the first piece 912.

The second piece 918 also include a second attachment mechanism 952B on an external surface 954 thereof. The second attachment mechanism 952B is configured to interact with the first attachment mechanism 952B of the first piece 918, thereby allowing the second piece 918 to be reversibly coupled to the first piece 912. The second attachment mechanism 952B can include any of the attachment mechanisms disclosed herein. For example, as illustrated, the second attachment mechanism 952B can include at least one protrusion. In an embodiment, the first and second attachment mechanisms 952A, 952B are configured to allow the second piece 918 to rotate relative to the first piece 918.

FIG. 9C is a schematic cross-sectional view of the assembled stabilization accessory 980, according to an embodiment. As illustrated, the second piece 918 can be disposed within the raised portion 988 of the second piece 912. However, the second piece 918 exhibits a height that is greater than the raised portion 988 of the first piece 912 thereby allowing the second piece 918 to extend above the raised portion 988. The first and second attachment mechanisms 952A, 952B also reversibly couple the first and second pieces 912, 918 together. However, the first and second attachment mechanisms 952A, 952B can allow the first and second pieces 912, 918 to be decoupled from each other when a force is applied thereto that is sufficient to elastically deform the first and second pieces 912, 918 to an extent that allows the first and second pieces 912, 918 to be decoupled.

It is noted that the second piece 918 can be configured to have any of the urine collecting assemblies disclosed herein disposed therein. For example, the second piece 918 can include an additional attachment mechanism that is configured to reversibly couple one of the urine collecting assemblies therein (as shown in FIG. 10B).

Figure 10A:
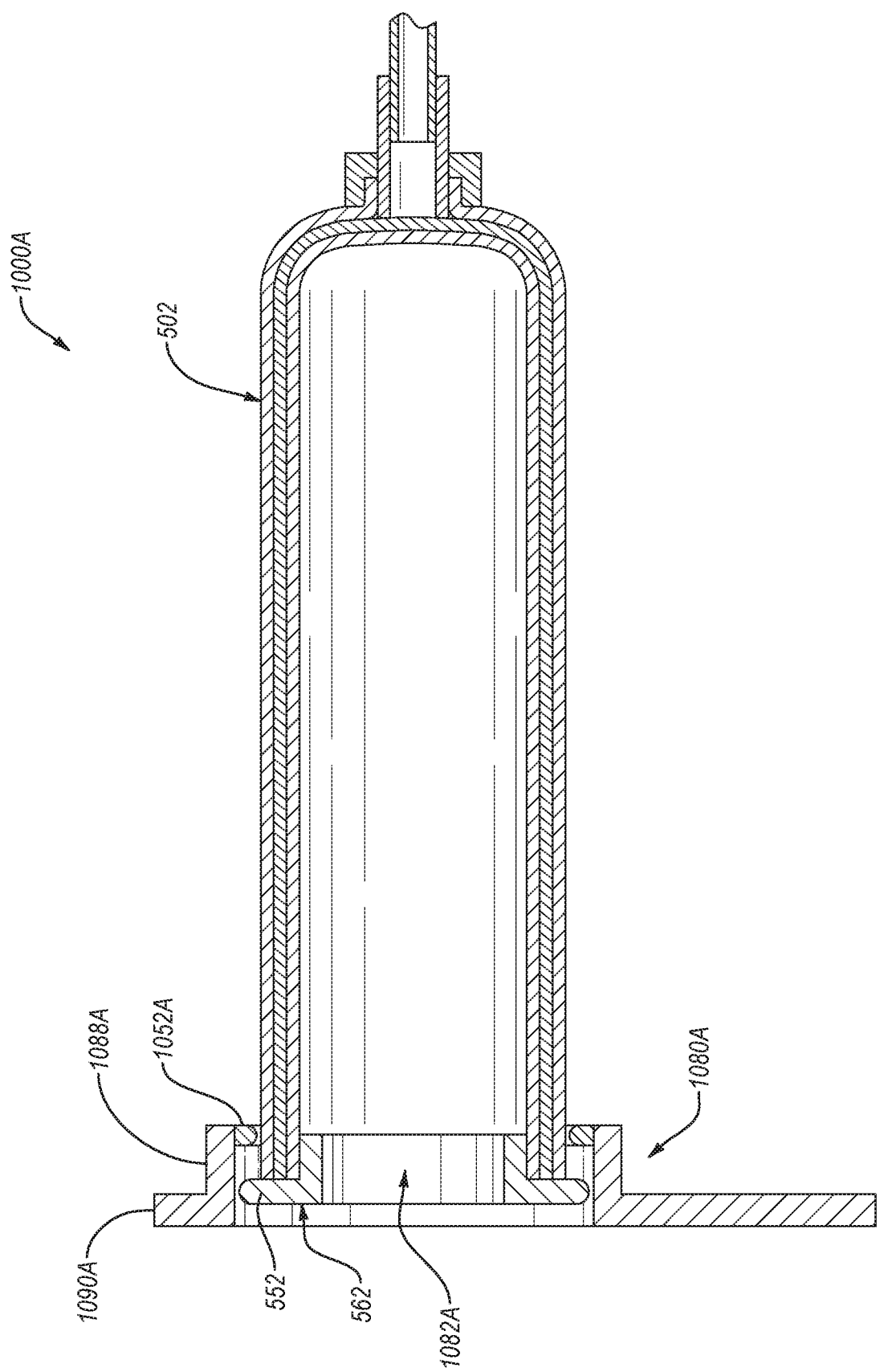
FIG. 10A is a schematic cross-sectional view of a system that includes the urine collecting assembly of FIGS. 5A-5B disposed in a stabilization accessory, according to an embodiment.

The stabilization accessories disclosed herein can also be configured to have the urine collecting assembly of FIGS. 5A-5B disposed therein. For example, FIG. 10A is a schematic cross-sectional view of a system 1000A that includes the urine collecting assembly 502 of FIGS. 5A-5B disposed in a stabilization accessory 1080A, according to an embodiment. The stabilization accessory 1080A can include any of the stabilization accessories disclosed herein. For example, the stabilization accessory 1080A can include a base portion 1090A defining an opening 1082A and a raised portion 1088A. The opening 1082A can be off centered similar to the opening 982 of FIG. 9A. In an embodiment, the stabilization accessory 1080A can also include an attachment mechanism 1052A that is configured to interact with the ring 562 of the urine collecting assembly 502 (e.g., a protrusion of the ring 562), thereby reversibly coupling the urine collecting assembly 502 with the stabilization accessory 1080A. However, at least one of the attachment mechanism 1052A can be omitted from the stabilization accessory 1080A or the protrusion can be omitted from the ring 562.

Figure 10B:
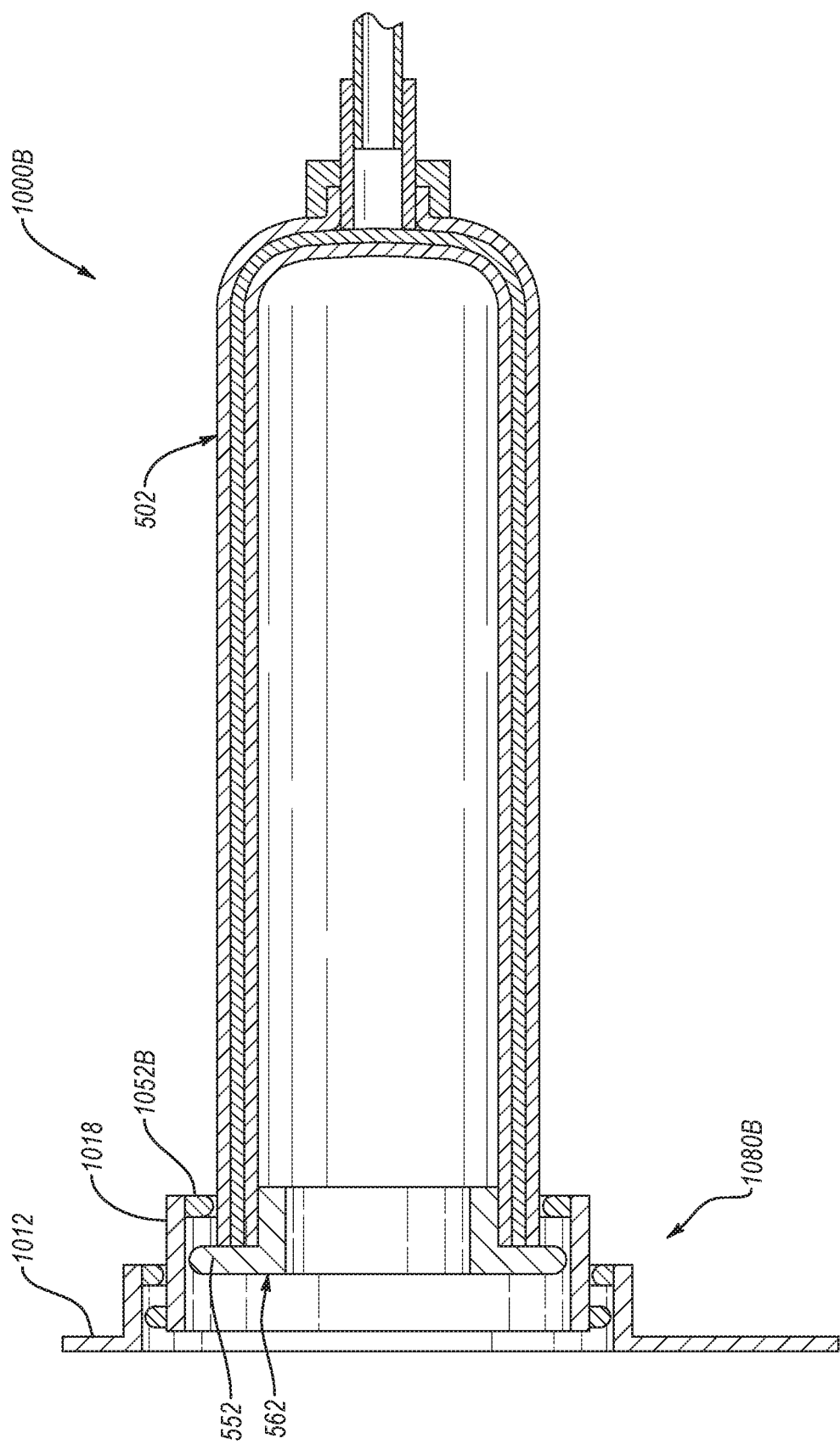
FIG. 10B is a schematic cross-sectional view of a system that include the urine collecting assembly of FIGS. 5A-5B disposed in a stabilization accessory, according to an embodiment.

FIG. 10B is a schematic cross-sectional view of a system 1000B that include the urine collecting assembly 502 of FIGS. 5A-5B disposed in a stabilization accessory 1080B, according to an embodiment. Except as otherwise disclosed herein, the stabilization accessory 1080B can be the same as or similar to the stabilization accessory 980 of FIG. 9C. For example, the stabilization accessory 1080B includes a first piece 1012 and a second piece 1018 reversibly coupled together. However, the second piece 1018 includes an attachment mechanism 1052B that is configured to interact with the ring 562 of the urine collecting assembly 502 thereby reversibly coupling the urine collecting assembly 502 with the stabilization accessory 1080B. However, at least one of the attachment mechanism 1052B can be omitted from the second piece 1018 or the protrusion can be omitted from the ring 562.

It is noted that, in an embodiment, the system 1000B can include any of the urine collecting assemblies disclosed herein instead of the urine collecting assembly 502.

Figure 11A:
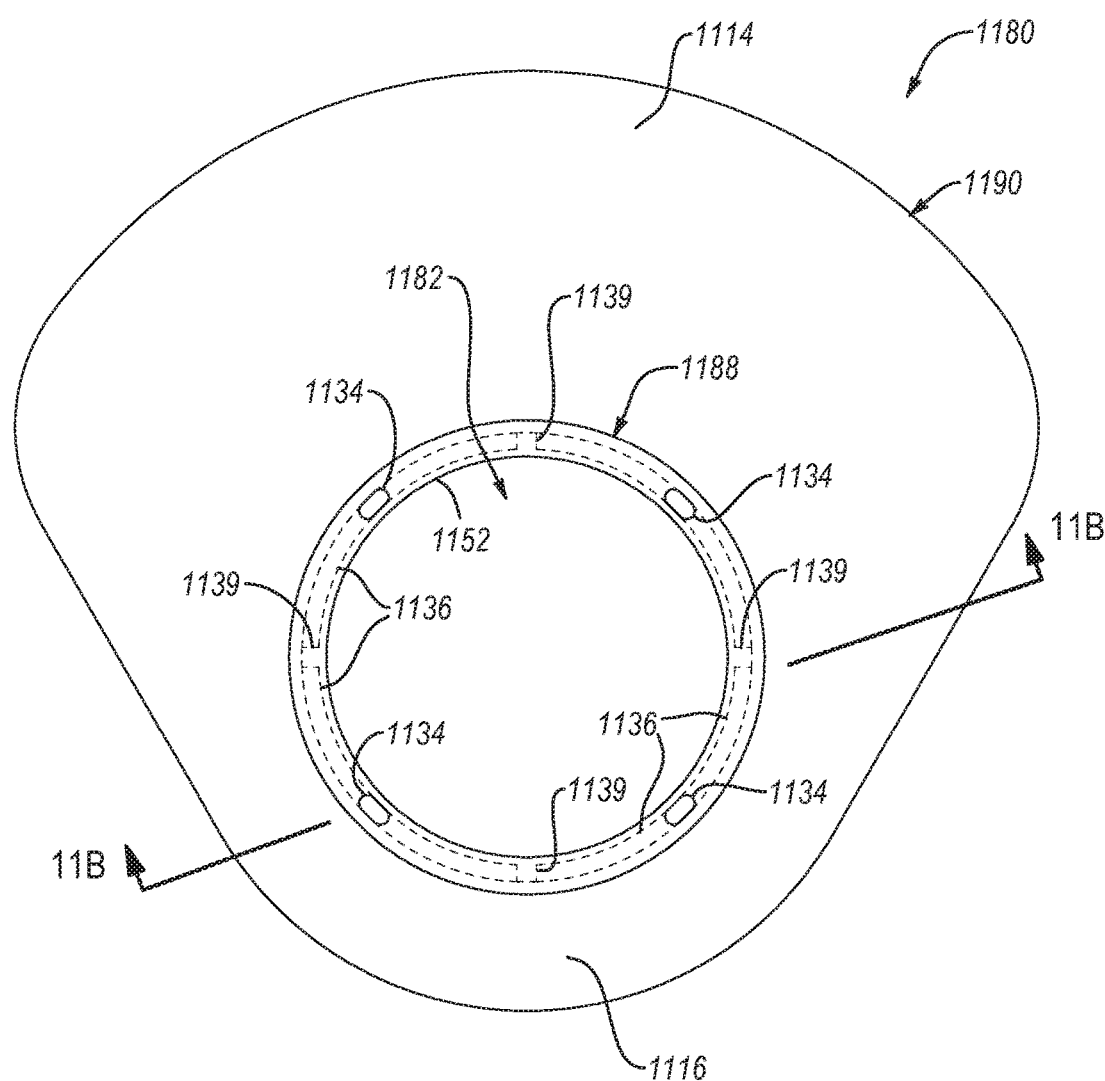
FIGS. 11A and 11B are a top plan view and a cross-sectional view, respectively, of a stabilization accessory, according to an embodiment.
Figure 11B:
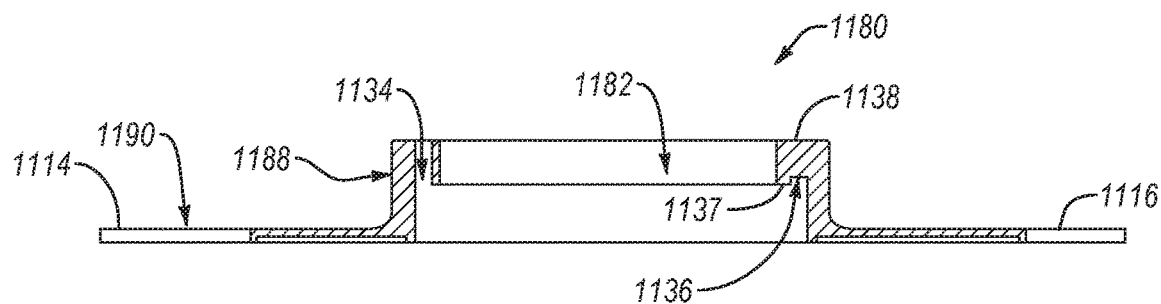

FIGS. 11A and 11B are a top plan view and a cross-sectional view, respectively, of a stabilization accessory 1180, according to an embodiment. Except as otherwise disclosed herein, the stabilization accessory 1180 may be the same as or substantially similar to any of the stabilization accessories disclosed herein. For example, the stabilization accessory 1180 may include a base portion 1190 and a raised portion 1188. The base portion 1190 may include a primary attachment portion 1114 and a secondary attachment portion 1116. The raised portion 1118 may include a first attachment mechanism 1152 (e.g., protrusion) extending circumferentially inwardly relative to the rest of the raised portion 1118. The first attachment mechanism 1152 may be integrally formed with the rest of the raised portion 1118 (as shown) or may be separate and distinct from the rest of the raised portion 1118 (as shown in FIG. 8D).

The stabilization accessory 1180 defines one or more vents 1134 extending therethrough. The vents 1134 may allow air to flow through the stabilization accessory 1180 which may reduce discomfort and/or bruises (e.g., hickies) caused by a vacuum source. For example, during operation, the vents 1134 may allow the air to flow from an exterior of a urine collecting system that includes the stabilization accessory 1180 and into the reservoir of the urine collecting system.

In an embodiment, as illustrated, the vents 1134 may be formed in and extend through the first attachment mechanism 1152. Forming the vents 1134 in the first attachment mechanism 1152 may limit bodily fluid flow through the vents 1134 since any bodily fluid reaching the vents 1134 would have to flow in a tortuous path (e.g., flow between an interior surface 1189 of the stabilization accessory and an exterior surface of the urine collecting assembly) and against the air flow flowing through the tortuous path.

Figure 11C:
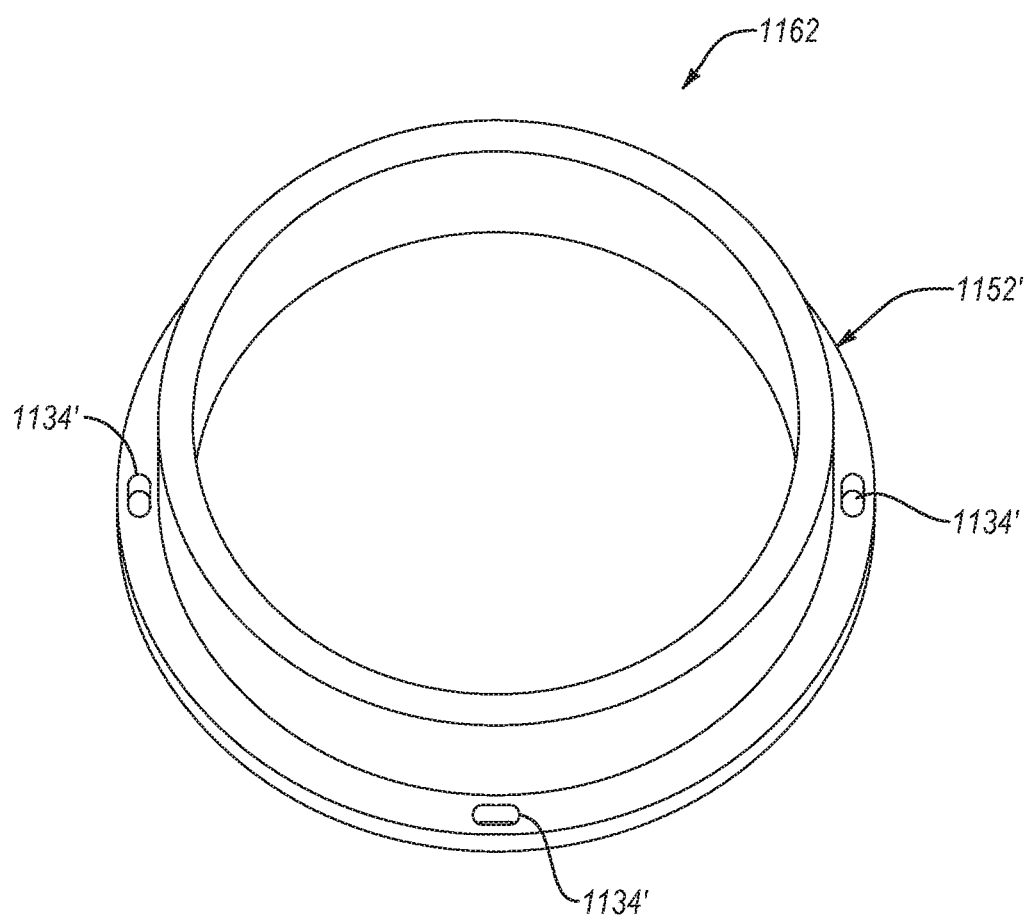
FIG. 11C is an isometric view of a second attachment mechanism of a urine collecting assembly that is configured to be used in conjunction with the stabilization accessory of FIGS. 11A and 11B, according to an embodiment.

When the vents 1134 are formed in the first attachment mechanism 1152 of the stabilization accessory 1180, the vents 1134 may be at least partially covered by a corresponding second attachment mechanism 1152' of the urine collecting assembly (shown in FIG. 11C). To prevent the corresponding second attachment mechanism 1152' of the urine collecting assembly from covering and obstructing the flow of air through the vents 1134, the raised portion 1188 may define at least one recess 1136 therein. The recess 1136 is shown are shown in FIG. 11A using dashed lines and in FIG. 11B.

Referring to FIG. 11B, which shows a vent 1134 on one side of the opening 1182 of the stabilization accessory 1180 and a recess 1136 on the other side of the opening 1182, the recess 1136 may extend inwardly from a bottom surface 1137 of the first attachment mechanism 1152 towards a top surface 1137 of the first attachment mechanism 1152 for a distance that is less than the thickness of the first attachment mechanism 1152 (e.g., measured from the bottom surface 1137 to an opposing top surface 1138 of the first attachment mechanism 1152). For example, the recess 1136 may extend for a distance that less than half the thickness of the first attachment mechanism 1152 since limiting the distance that the recess 1136 extends into the first attachment mechanism 1152 may limit the amount of bodily fluid that may flow therethrough Referring to FIG. 11A, in an embodiment, the recess 1134 may include a plurality of recesses 1134. In such an embodiment, the recess 1134 may include one or more transverse supports 1139 (shown with dashed lines) that at least partially separate each of the plurality of recesses 1134 from each other. The transverse supports 1139 are portions of the first attachment mechanism 1152 circumferentially between the recesses 1136 that exhibit a thickness that is greater than a thickness of portions of the first attachment mechanism 1152 measured between the recesses 1134 and the top surface 1138. The transverse supports 1139 may at least one of improve the strength of the first attachment mechanism 1152 (e.g., prevent folding of the attachment mechanism along the plurality of recesses 1134) or prevent bodily fluid that reach one of the recesses 1134 from leaking into another one of the recesses 1134, thereby limiting bodily fluid leaks through multiple vents 1134.

FIG. 11C is an isometric view of a second attachment mechanism 1152' of a urine collecting assembly (not shown for clarity) that is configured to be used in conjunction with the stabilization accessory 1180 of FIGS. 11A and 11B, according to an embodiment. Except as otherwise disclosed herein, the second attachment mechanism 1152' may be the same or substantially similar to any of the attachment mechanisms of the urine collecting assemblies disclosed herein. For example, the second attachment mechanism 1152' may form part of a ring 1162 (as illustrated), a second piece (e.g., second piece 912), or a body (e.g., body 840').

The second attachment mechanism 1152' defines one or more vents 1134' extending therethrough. The vents 1134' may allow the air to flow through the second attachment mechanism 1152' and reach the vents 1134 of the first attachment mechanism 1152 when, for example, the gap between the second attachment mechanism 1152' and the raised portion 1188 of the stabilization accessory 1180 is sufficiently small to inhibit sufficient air flow therethrough.

In an embodiment, the second attachment mechanism 1152' may include the same number of vents 1134' that are positioned to correspond to the location of the vents 1134 of the first attachment mechanism 1152. However, in another embodiment, the second attachment mechanism 1152' may include a different number of vents 1134' than the first attachment mechanism 1152 and/or the vents 1134' may not be positioned to correspond to the vents 1134 of the first attachment mechanism 1152.

Figure 12:
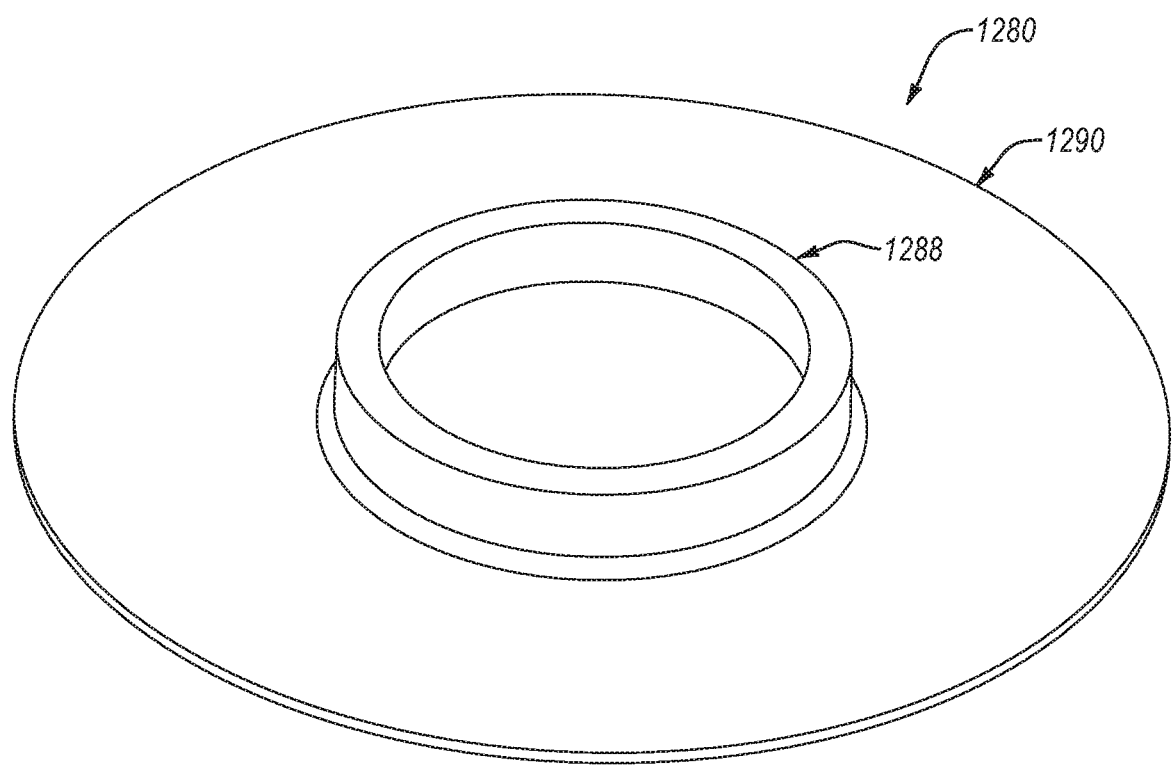
FIG. 12 is a top plan view of a stabilization accessory, according to an embodiment.

FIG. 12 is a top plan view of a stabilization accessory 1280, according to an embodiment. Except as otherwise disclosed herein, the stabilization accessory 1280 may be the same or substantially similar to any of the stabilization accessories disclosed herein. For example, the stabilization accessory 1280 may include a raised portion 1288 and a base portion 1290.

Unlike some of the stabilization accessories disclosed herein, the raised portion 1288 is centrally located on the base portion 1290. Further, the base portion 1290 may extend radially equidistantly from the raised portion 1288. As such, the stabilization accessory 1280 may be disposed on a user without regard to properly rotating the stabilization accessory 1280 relative to the user. For example, the stabilization accessory 1180 illustrated in FIG. 11A may need to be properly rotated relative to the user such that the primary attachment portion 1114 contacts the pubic region (e.g., the lower part of the abdomen just above the penis) of the user to effectively attach the stabilization accessory 1180 to the user. Meanwhile, referring back to FIG. 12, the stabilization accessory 1280 has no such requirement. However, the size (e.g., surface area) of the base portion 1290 may be limited by the distance between the penis and the hip of the user and, as such, the base portion 1290 may exhibit a size that is less than the size of the base portion 1190 of the stabilization accessory 1190 illustrated in FIG. 11A.

Figure 13A:
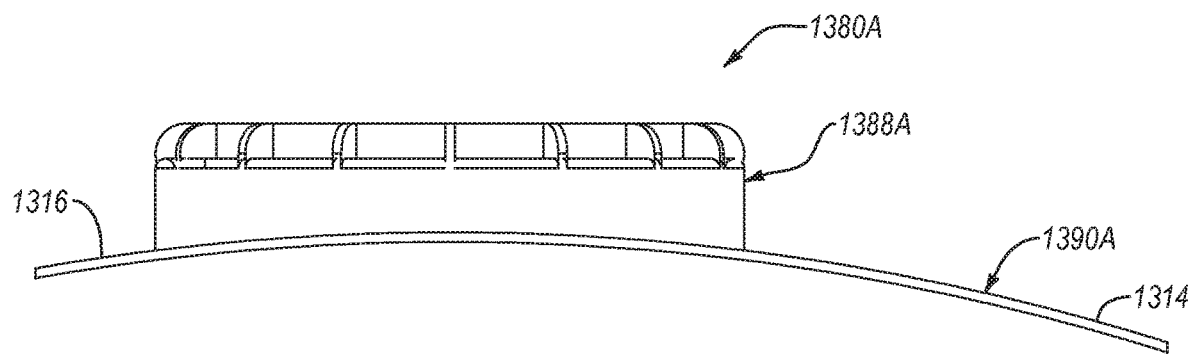
FIG. 13A is a side plan view of a stabilization accessory, according to an embodiment.

FIG. 13A is a side plan view of a stabilization accessory 1380A, according to an embodiment. Except as otherwise disclosed herein, the stabilization accessory 1380A may be the same as or substantially similar to any of the stabilization accessories disclosed herein. For example, the stabilization accessory 1380A may include a raised portion 1388A and a base portion 1390A.

The base portion 1390A may exhibit a contour (e.g., curve) along a single axis. The single axis may extend, for example, longitudinally from the primary attachment portion 1314 to a secondary attachment portion 1316, wherein the single axis may extend radially across an opening (not shown, obscured) of the stabilization accessory 1380A. Contouring the base portion 1390A may facilitate attachment of the base portion 1390A to a user since the area around the penis of the user exhibits some curvature. Further, contouring the base portion 1390A may improve the comfort of wearing the stabilization accessory 1380A since the stabilization accessory 1380A may pull less on the regions about the penis of the user than a substantially similar stabilization accessory 1380A that includes a planar base portion.

Figure 13B:
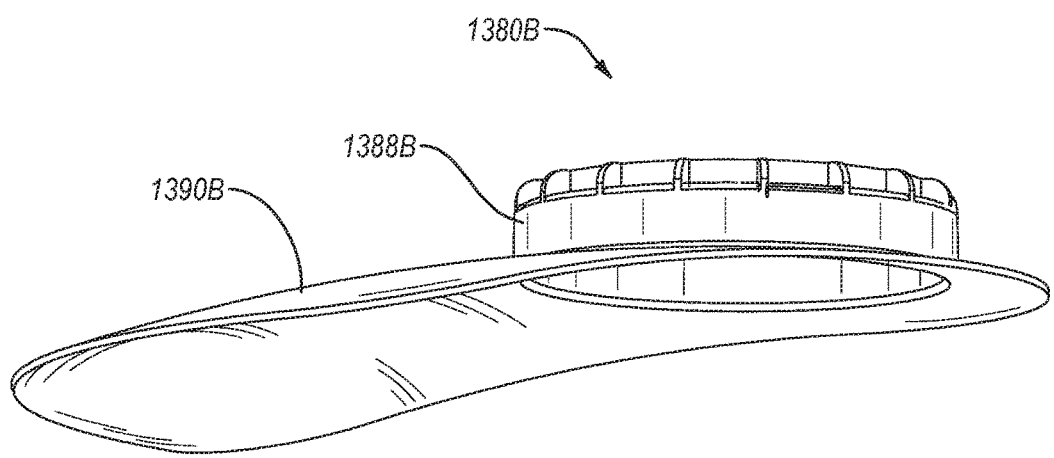
FIG. 13B is a side plan view of a stabilization accessory, according to an embodiment.

FIG. 13B is a side plan view of a stabilization accessory 1380B, according to an embodiment. Except as otherwise disclosed herein, the stabilization accessory 1380B may be the same as or substantially similar to any of the stabilization accessories disclosed herein. For example, the stabilization accessory 1380B may include a raised portion 1388B and a base portion 1390B.

The base portion 1390B may exhibit a first contour (e.g., curve) along a first axis similar to the base portion 1390A of FIG. 13A exhibiting a contour along the single axis. However, the base portion 1390B may also exhibit at least one addition contour (e.g., a second contour) along at least one addition axis (e.g., a second axis) that is transverse (e.g., perpendicular or obliquely angled) relative to the first axis. Contouring the base portion 1390B along the first axis and the at least one additional axis may allow the base portion 1390B to more closely conform to the shape of the regions about the penis of the user than a substantially similar stabilization accessory that includes a planar base portion or a base portion that is contoured along a single access. The more closely the base portion 1390B conforms to the region about the penis of the user may better facilitate attachment and/or improve comfort of wearing the stabilization accessory 1380B.

Figure 14:
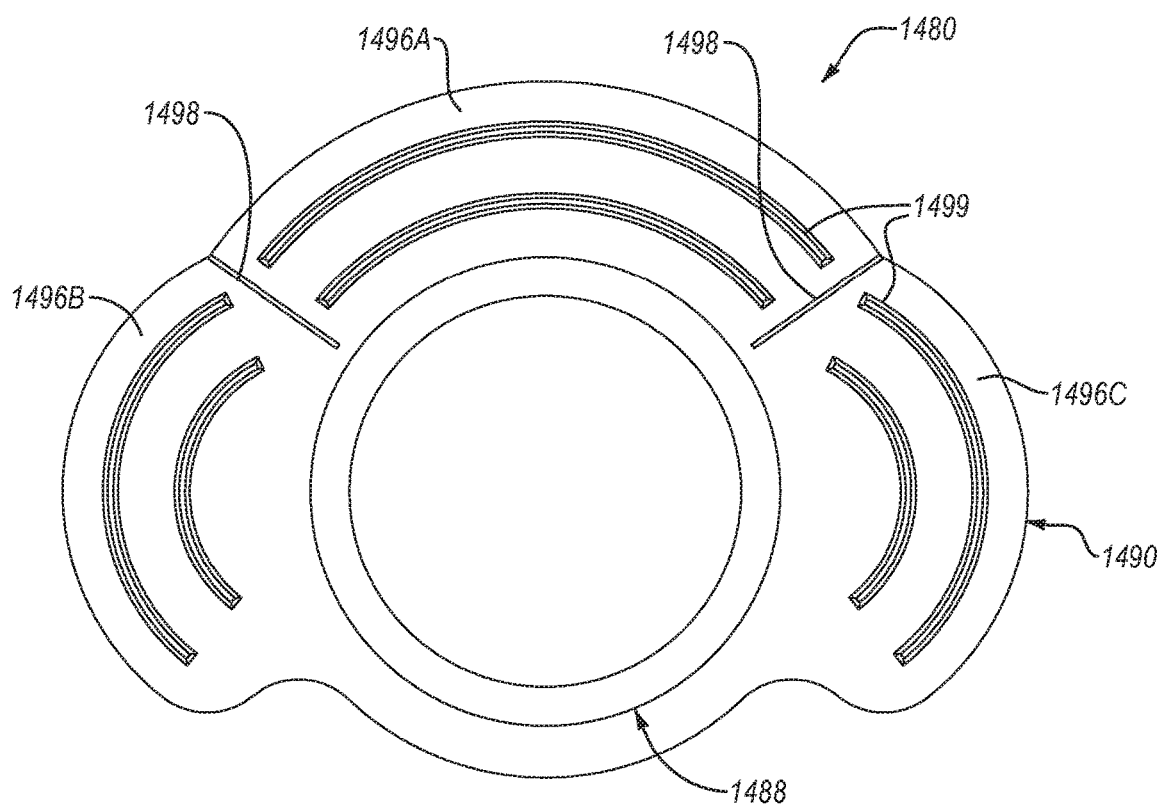
FIG. 14 is a top plan view of a stabilization accessory, according to an embodiment.

FIG. 14 is a top plan view of a stabilization accessory 1480, according to an embodiment. Except as otherwise disclosed herein, the stabilization accessory 1480 may be the same or substantially similar to any of the stabilization accessories disclosed herein. For example, the stabilization accessory 1480 may include a raised portion 1488 and a base portion 1490.

The base portion 1488 includes a plurality of sections that are configured to attach to different regions of the user. Since each of the plurality of sections are configured to be attached to different regions of the user, at least one of the plurality of sections may exhibit different shapes than another one of the plurality of regions. The different shapes of the plurality of sections may cause the base portion 1488 to exhibit an irregular shape. For example, as illustrated, the base portion 1488 may include a first portion 1496A, a second portion 1496B, and a third portion 1496C. The first portion 1496A may be configured to be attached to a pubic region of a user while the second and third portions 1496B and 1496C may be configured to be attached to the hips and/or a region of the user extending from the penis to the hips of the user. As such, the first portion 1496A may exhibit a first shape and the second and third portions 1496B and 1496C may exhibit a second shape that is different than the first shape. For example, each of the first, second, and third portions 1496A, 1496B, and 1496C may exhibit generally arcuate shapes. However, the arcuate shape of the first portion 1496A may exhibit a larger radius than the arcuate shape of the second and third portions 1496B and 1496C.

In an embodiment, as illustrated, the first, second, and third portions 1496A, 1496B, and 1496C may be separated from each other by a slit 1498 which may allow the first, second, and third portions 1496A, 1496B, and 1496C to bend independently from each other. However, it is noted that the base portion 1490 may include a flexible and/or elastic material between the first, second, and third portions 1496A, 1496B, and 1496C which allows the first, second, and third portions 1496A, 1496B, and 1496C to bend independently from each other or the first, second, and third portions 1496A, 1496B, and 1496C may be integrally formed with each other.

In an embodiment, at least one of the first, second, or third portions 1496A, 1496B, or 1496C may include one or more ridges 1499 formed thereon. The ridges 1499 may facilitate gripping of the first, second, or third portions 1496A, 1496B, or 1496C which may facilitate bending of the first, second, or third portions 1496A, 1496B, or 1496C.

Figure 15:
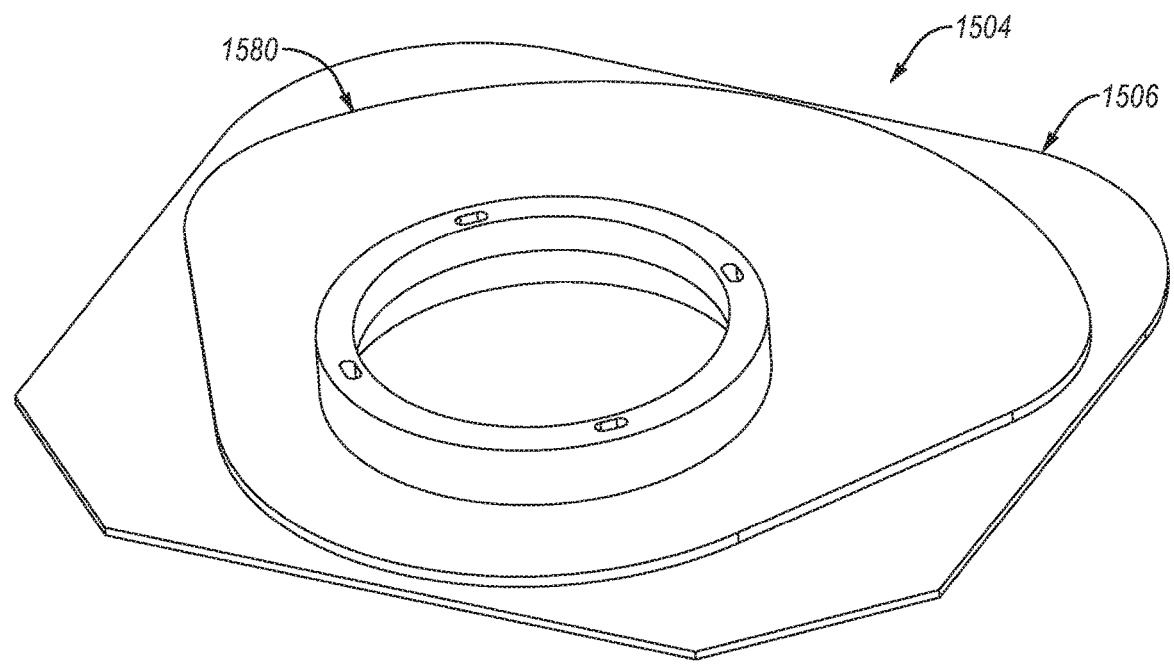
FIG. 15 is an isometric view of packaging that includes a stabilization accessory that is configured to be adhesively attached to an individual and a pad, according to an embodiment

The stabilization accessories disclosed herein may be attached to an individual using any suitable method. In an embodiment, the stabilization accessories disclosed herein may include an adhesive (e.g., hydrogel) on a bottom surface thereof that is configured to attach the stabilization accessory to the user. FIG. 15 is an isometric view of packaging 1504 that includes a stabilization accessory 1580 that is configured to be adhesively attached to an individual and a pad 1506, according to an embodiment. The stabilization accessory 1580 may include any of the stabilization accessories disclosed herein. The stabilization accessory 1580 may be attached to the pad 1506 using an adhesive (not shown). The stabilization accessory 1580 and the pad 1506 may be configured such that the stabilization accessory 1580 may be easily remove from the pad 1506 when the stabilization accessory 1580 is attached to the user.

Figure 16B:
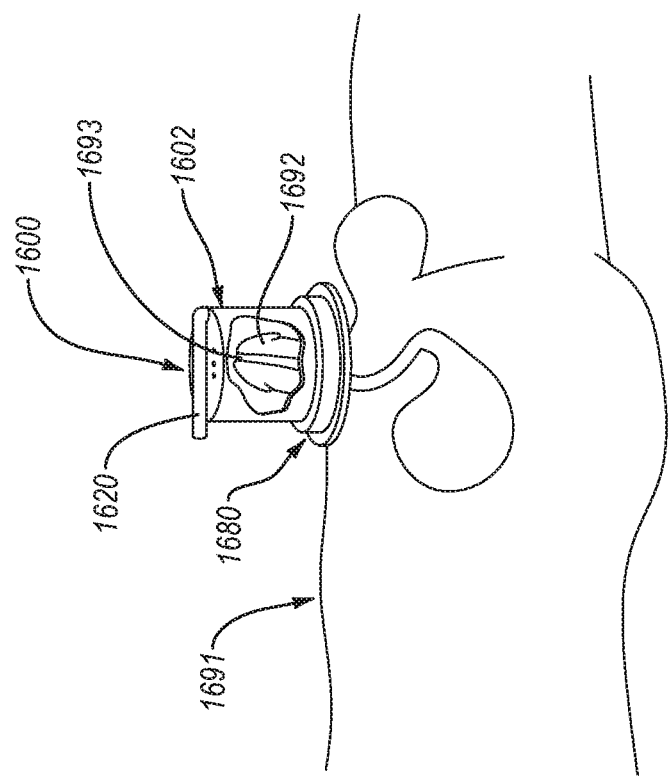
FIGS. 16A and 16B are a schematic view and a schematic cut-away view, respectively, of a urine collecting system disposed on a user in a position for use, according to an embodiment.
Figure 16A:
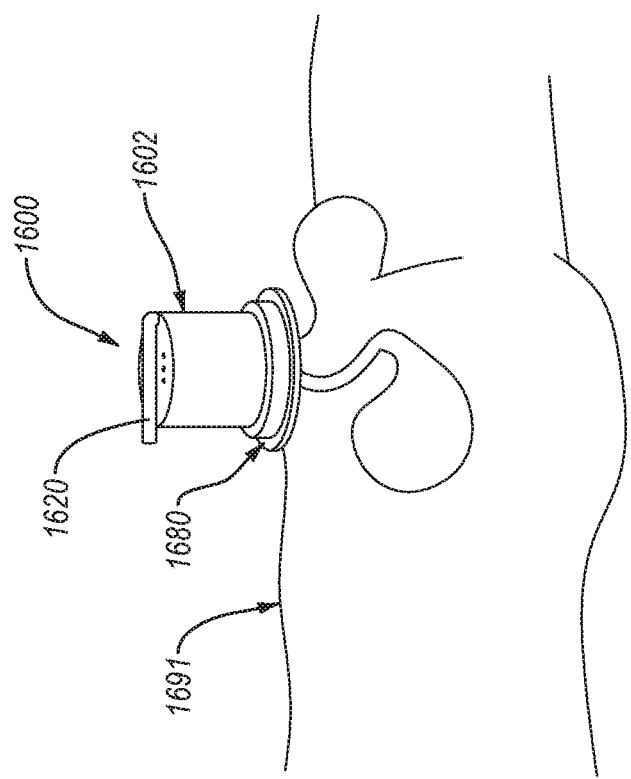

FIGS. 16A and 16B are a schematic view and a schematic cut-away view, respectively of a urine collecting system 1600 disposed on a user 1691 in a position for use, according to an embodiment. The urine collecting system 1600 can be the same or similar in structure and/or function to any of the urine collecting systems disclosed herein. For example, the urine collecting system 1600 can include a urine collecting assembly 1602 and a stabilization accessory 1680 that is the same or similar in structure and/or function to any of the urine collecting assemblies and stabilization accessories, respectively, disclosed herein. For example, the urine collecting assembly 1602 includes an outlet 1620.

In use, as shown in FIGS. 16A and 16B, the urine collecting system 1600 can be positioned such that the urine collecting assembly 1602 encloses a portion of the penis 1692 of the user 1691. For example, the urine collecting assembly 1602 can be positioned such that the urethral opening 1693 of the user 1691 is within a body of the urine collecting assembly 1602 and, optionally, a sealing flange (not shown) of the urine collecting assembly 1602 sealingly engages a shaft of the user's penis 1692. In such a position, urine can exit the urethral opening 1693 of the penis 1692 and collect in a reservoir (due to gravity) defined by at least a portion of the user 1691 (e.g., the outer surface of the shaft of the penis 1692) and a side wall of the urine collecting assembly 1602. A vacuum source (e.g., vacuum source 170) can be used to draw the collected urine from the outlet 1620. In urine collecting assemblies having an outlet positioned near the bottom of the urine collecting assembly, gravity and/or a vacuum source can cause or assist the travel of urine from the urine collecting assembly 1602 via the outlet. The vacuum source can be fluidly coupled to an external receptacle via a vacuum line such that gaseous fluid is drawn from the external receptacle via the vacuum line. As a result of the decrease in pressure within the external receptacle caused by the drawing of gaseous fluid out of the external receptacle, liquid and/or gaseous fluid can be drawn from the reservoir, through the outlet 1620, through a discharge line, and into the external receptacle.

Figure 17:
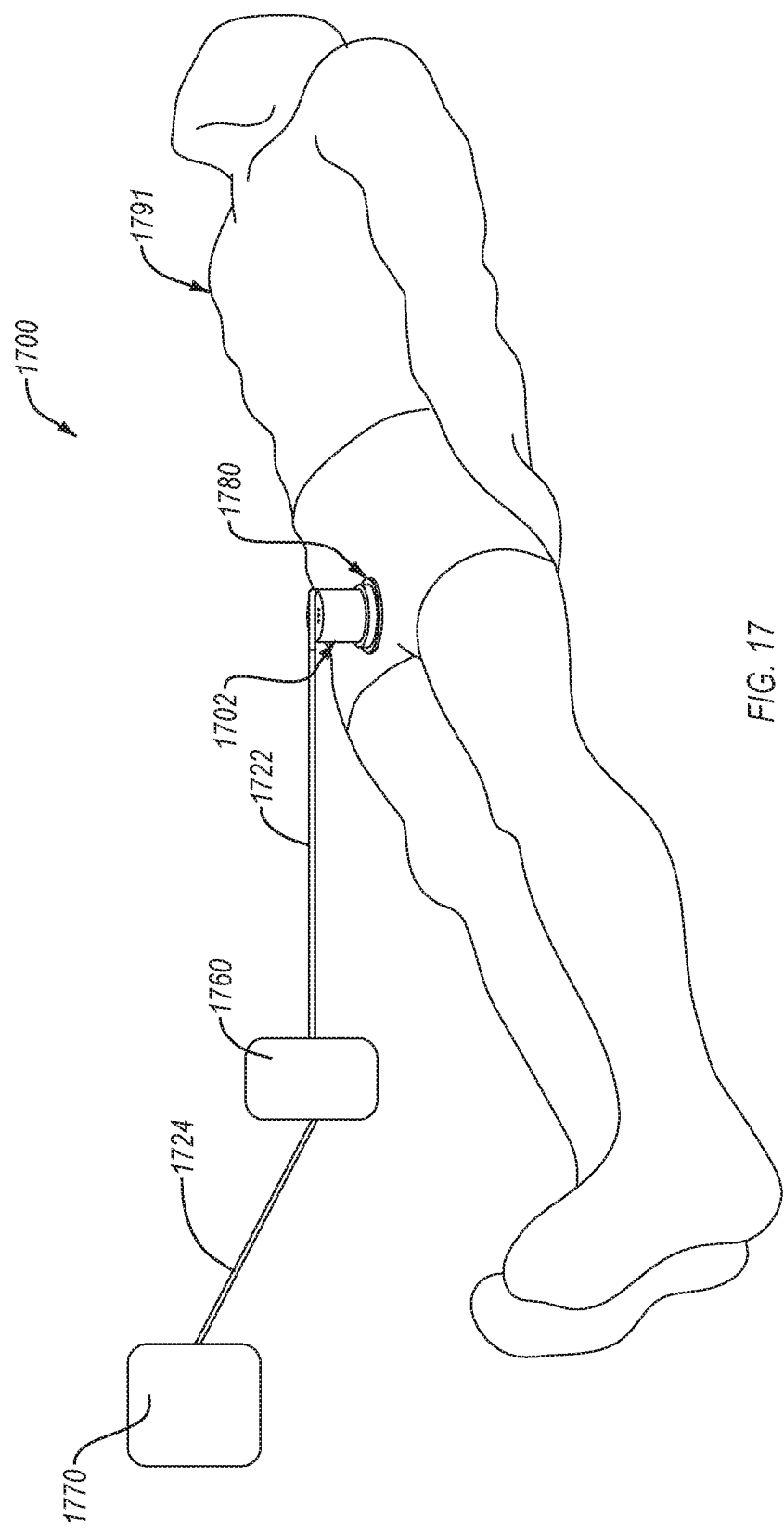
FIG. 17 is a schematic illustration of a urine collecting system disposed on the body of a user, according to an embodiment.

FIG. 17 is a schematic illustration of a urine collecting system 1700 disposed on the body of a user 1791, according to an embodiment. The urine collecting system 1700 can be the same or similar in structure and/or function to any of the urine collecting systems disclosed herein. The urine collecting system 1700 includes an urine collecting assembly 1702 and a stabilization accessory 1780 that can be the same or similar in structure and/or function to any of the urine collecting assemblies and stabilization accessories, respectively, described herein The urine collecting system 1700 can include an external receptacle 1760 and a vacuum source 1770. The external receptacle 1760 can be the same or similar in structure and/or function as the external receptacle 160 described above. The vacuum source 1770 can be the same or similar in structure and/or function as the vacuum source 170 described above. The urine collecting assembly 1702 can be fluidly coupled to the external receptacle 1760 via a discharge line 1722. The external receptacle 1760 can be coupled to the vacuum source 1770 via a vacuum line 1724.

In use, as shown in FIG. 17, the urine collecting system 1700 can be positioned such that the urine collecting assembly 1702 encloses a portion of the penis of the user 1781. For example, the urine collecting assembly 1702 can be positioned such that the urethral opening of the user 1791 is within a body of the urine collecting assembly 1702 and, optionally, a sealing flange of the urine collecting assembly 1702 sealingly engages a shaft of the user's penis. In such a position, urine can exit the urethral opening of the penis and collect in a reservoir (due to gravity) defined by user 1791 and a side wall of the urine collecting assembly 1702.

Similarly as described above with reference to urine collecting system 100, the vacuum source 1770 can assist and/or provide the pressure differential needed to draw fluid (e.g., urine) voided from the urethral opening into the reservoir of the urine collecting assembly 1702 from the reservoir, through the discharge line 1722, and into the external receptacle 1760. More specifically, the vacuum source 1770 can be fluidly coupled to the external receptacle 1760 via the vacuum line 1724 such that gaseous fluid can be drawn from the external receptacle 1760 via the vacuum line 1724. As a result of the decrease in pressure within the external receptacle 1760 caused by the drawing of gaseous fluid out of the external receptacle 1760, liquid and/or gaseous fluid can be drawn from the reservoir of the urine collecting assembly 1702, through the outlet 1720, through the discharge line 1722, and into the external receptacle 1760.

Figure 18:
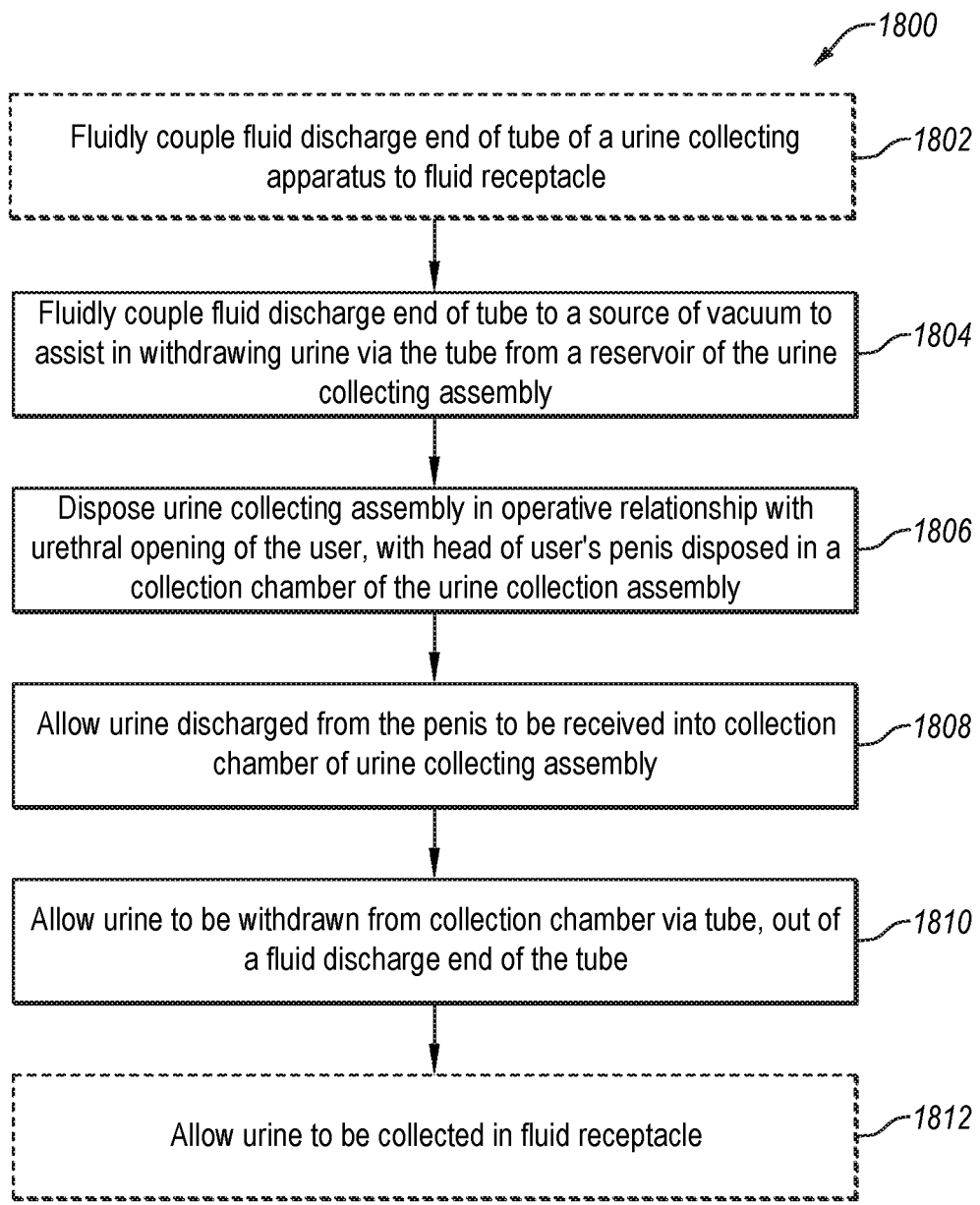
FIG. 18 is a flowchart illustrating a method of using an urine collecting assembly to collect urine from a user, according to an embodiment.

FIG. 18 is a flowchart illustrating a method 1800 of using a urine collecting assembly to collect urine from a user, according to an embodiment. The method 1800 can include at least some of acts 1802, 1804, 1806, 1808, 1810, or 1812. The method 1800 is for illustrative purposes and, as such, at least one of the acts 1802, 1804, 1806, 1808, 1810, or 1812 can be performed in a different order, split into multiple acts, modified, supplemented, combined, or omitted.

The method 1800 optionally includes, at act 1802, fluidly coupling a discharge end of a tube of a urine collecting assembly to a fluid receptacle. Method 1800 optionally further includes, at act 1804, fluidly coupling the discharge end of the tube of the urine collecting urine collecting assembly to a source of vacuum.

Method 1800 further includes, at act 1806, disposing the urine collecting urine collecting assembly in operative relationship with the urethral opening of the user, with a head of a penis of a male user (e.g. human or animal) disposed in a reservoir of the urine collecting assembly (e.g., through a sealing flange). The urine collecting assembly can be the same or similar in structure and/or function to any of the urine collecting assemblies described herein. For example, the urine collecting assembly can include at least one of a body, a sealing flange, or a reservoir within the body and partially defined by the sealing flange. The sealing flange can define an opening such that the interior of the body is accessible via the opening. A peripheral edge of the opening can be configured to seal around a shaft of a penis of a user disposed through the opening. The urine collecting assembly can also include an outlet in fluid communication with the reservoir. The urine collecting assembly can be arranged such that a fluid can flow into the body from the urethral opening of the user's penis, collect in the reservoir, and flow out of the outlet.

In an embodiment, the urine collecting assembly forms part of a urine collecting urine collecting system that includes a stabilization accessory. The stabilization accessory can be the same or similar in structure and/or function to any of the stabilization accessories disclosed herein. For example, the stabilization accessory can define an opening that is configured to receive the urine collecting assembly and allow the urine collecting assembly to rotate therein. In such an embodiment, act 1806 can include disposing the stabilization accessory on a region about the user's penis and disposing the urine collecting assembly in the opening of the stabilization accessory. In an embodiment, disposing the stabilization accessory on a region about the user's penis includes attaching (e.g., using an adhesive) a bottom surface of the stabilization accessory to the region about the user's penis.

The method 1800 also includes, at 1808, allowing urine discharged from the penis to be received into the reservoir of the urine collecting assembly.

The method 1800 also includes, at act 1810, allowing the received urine to be withdrawn from the reservoir via the tube and out of the fluid discharge end of the tube.

The method 1800 optionally includes, at act 1812, removing the urine collecting assembly from the penis of the user.

The method 1800 optionally includes disposing a second urine collecting assembly in operative relationship with the urethral opening of the user, with the head of the penis of the user disposed through the sealing flange and into the reservoir of the urine collecting assembly.

In an embodiment, the user can move while the urine collecting assembly and the stabilization accessory is disposed around the user's penis. In such an embodiment, the method 1800 can include rotating the urine collecting assembly in the opening of the stabilization accessory responsive to the movement of the user.

While various embodiments of the urine collecting system, methods and devices have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. In addition, the specific configurations of the various components can also be varied. For example, the size and specific shape of the various components can be different than the embodiments shown, while still providing the functions as described herein.

The invention claimed is:

1. A urine collecting assembly, comprising:
 a body including an open proximal end and an at least partially closed distal end, the body including:
 a ring at or near the open proximal end, the ring including an annular cylindrical wall and a protrusion, the annular wall defining an opening, the protrusion extending laterally from the annular wall and the annular wall extending from the protrusion towards the distal end, the protrusion only extending from a proximal end of the annular wall;
 at least one porous material extending from the open proximal end to and into the distal end, the at least one porous material configured to receive and wick bodily fluids away from a penis, a portion of the at least one porous material adjacent to the open proximal end positioned between an open at least one fluid impermeable layer and an additional material that is distinct and separate from the at least one porous material;
 a sheath distinct and separate from the ring, the sheath extending from or near the open proximal end to or near the at least partially closed distal end, the sheath including the at least one fluid impermeable layer, the sheath at least partially defining a reservoir;
 a connector connecting the annular wall of the ring to the sheath; and
 a sump at the at least partially closed distal end of the body, the sump defining an outlet, the sump is distinct and separate from the at least one fluid impermeable layer, the sump attached to the at least one fluid impermeable layer; and
 wherein the annular wall is attached to and positioned radially within the fluid impermeable layer of the sheath; and
 wherein a first portion of the reservoir is defined by internal volume of the sump and the at least one porous material and a second portion of the reservoir defined by the fluid impermeable layer and the at least one porous material, such that the porous material forms a fluid path between the first opening and the first portion of the reservoir.

2. The urine collecting assembly of claim 1, wherein the body includes an attachment mechanism that defines one or more vents extending therethrough.

3. The urine collecting assembly of claim 1, wherein a portion of the sheath at or near the at least partially closed distal end defines a hole; and wherein the at least one porous material comprises a top porous layer that at least partially covers the hole.

4. The urine collecting assembly of claim 3, wherein the reservoir includes a first section at least partially defined by the sheath and a second section, and wherein the top porous layer separates the first section of the reservoir from the second section of the reservoir.

5. The urine collecting assembly of claim 4, wherein the sump includes a bulbous portion extending from the outlet towards the open proximal end, and wherein the bulbous portion at least partially defines the second section of reservoir.

6. The urine collecting assembly of claim 1, further comprising an upper ring positioned adjacent to the sump.

7. A urine collecting system, comprising:
 a urine collecting assembly including a body, the body including a proximal end and an at least partially closed distal end, the body defining a first opening at or near the proximal end, the body including:
 a sheath extending from or near the proximal end to or near the at least partially closed distal end, the sheath including at least one fluid impermeable layer, the sheath at least partially defining a reservoir;
 a sump at the at least partially closed distal end of the body, the sump defining an outlet, the sump is distinct and separate from the at least one fluid impermeable layer, the sump attached to the at least one fluid impermeable layer; and
 at least one porous material extending at least from the proximal end to and into the distal end, the at least one porous material adjacent to the fluid impermeable layer;
 a stabilization accessory configured to attach the urine collecting assembly to a user, the stabilization accessory defining a second opening therethrough configured to receive a penis of the user, the stabilization accessory comprising:
 a base portion including a bottom surface that is configured to abut one or more regions about the penis of the user, the base surface including an adhesive disposed on the bottom surface thereof, the base portion including a primary attachment portion and a secondary attachment portion wherein the primary attachment portion is a region of the base portion configured to be attached to a pubic mound of the user and the secondary attachment portion is a region of the base portion configured to be attached to at least regions of the user on lateral sides of the penis and the scrotum of the user, the base portion exhibits a maximum length measured parallel to a longitudinal axis of the body and a maximum width measured perpendicular to the longitudinal axis of the body, the maximum length is measured perpendicular to and is greater than the maximum width, and wherein the primary attachment portion includes at least a portion of the maximum width, wherein the secondary attachment portion includes an apex forming the minimum width of the stabilization accessory and the minimum width is spaced from and on an opposite side of the second opening from at least a portion of the primary portion including the maximum width; and a first attachment mechanism distinct from the bottom surface, the first attachment mechanism configured to attach the stabilization accessory to the body; and wherein a first portion of the reservoir is defined by internal volume of the sump and the at least one porous material and a second portion of the reservoir defined by the fluid impermeable layer and the at least one porous material, such that the porous material forms a fluid path between the first opening and the first portion of the reservoir.

8. The urine collecting system of claim 7, wherein the first attachment mechanism defines one or more first vents extending therethrough and a second attachment mechanism of the body defines one or more second vents extending therethrough.

9. The urine collecting system of claim 7, wherein a portion of the sheath at or near the at least partially closed distal end defines a hole; and wherein the urine collecting assembly further comprises a top porous layer that at least partially covers the hole.

10. The urine collecting system of claim 9, wherein the reservoir includes a first section at least partially defined by the sheath and a second section, and wherein the top porous layer separates the first section of the reservoir from the second section of the reservoir.

11. The urine collecting system of claim 10, wherein the sump includes a bulbous portion extending from the outlets towards the proximal end, and wherein the bulbous portion at least partially defines the second section of reservoir.

12. The urine collecting system of claim 9, further comprising an upper ring positioned adjacent to the sump.

13. The urine collecting assembly of claim 1, wherein the ring abuts an inner surface of a fluid permeable layer disposed in the reservoir.

14. The urine collecting assembly of claim 1, wherein the annular wall of the ring abuts the fluid impermeable layer.

15. The urine collecting assembly of claim 1, wherein the ring exhibits at least one of a Young's modulus or thickness that is greater than the sheath.

16. The urine collecting assembly of claim 1, wherein the connector includes at least one of an interference fit, an adhesive, stitching, welding, or tape.

17. The urine collection assembly of claim 1, wherein the sump includes one or more ridges extending from or near the outlet towards the open proximal end.

18. The urine collection assembly of claim 2, wherein the one or more vents includes a plurality of vents, each of the plurality of vents are spaced from each other.

19. The urine collection assembly of claim 1, wherein the at least one porous material has a first side and a second side opposite the first side, the at least one porous material positioned in the sheath to have a first unoccupied spaced adjacent to at least a portion of the first side of the at least one porous material and a second unoccupied space adjacent to at least a portion of the second side of the at least one porous material.

20. The urine collecting system of claim 7, wherein the base portion is flexible.

21. The urine collection assembly of claim 7, wherein a width of the base portion tapers from the maximum width to the minimum width.

22. The urine collection assembly of claim 1, wherein only the sump includes one or more ridges extending from or near the outlet towards the open proximal end.

23. The urine collection assembly of claim 1, wherein the sump is distinct and separate from the at least one fluid impermeable layer.

24. The urine collection assembly of claim 7, wherein the sump is distinct and separate from the at least one fluid impermeable layer.

25. The urine collection assembly of claim 24, wherein the sump defines one or more recesses.

26. The urine collection assembly of claim 24, wherein the sump is welded to the fluid impermeable layer.

27. The urine collection assembly of claim 7, wherein an outer periphery of at least a portion of the secondary attachment portion exhibits a shape that corresponds to a shape of the second opening.

28. The urine collection assembly of claim 1, wherein the protrusion includes a single protrusion.

* * * * *